(12) United States Patent
Yang

(10) Patent No.: US 12,058,145 B2
(45) Date of Patent: Aug. 6, 2024

(54) DEVICE CONTROL METHOD AND DEVICE

(71) Applicant: Huawei Technologies Co., Ltd., Shenzhen (CN)

(72) Inventor: Yixuan Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 290 days.

(21) Appl. No.: 17/563,565

(22) Filed: Dec. 28, 2021

(65) Prior Publication Data

US 2022/0124100 A1    Apr. 21, 2022

Related U.S. Application Data

(63) Continuation of application No. PCT/CN2020/098679, filed on Jun. 29, 2020.

(30) Foreign Application Priority Data

Jun. 29, 2019 (CN) .......................... 201910581511.X

(51) Int. Cl.
*H04L 9/40* (2022.01)
*H04L 12/28* (2006.01)
(Continued)

(52) U.S. Cl.
CPC ........ *H04L 63/123* (2013.01); *H04L 12/2812* (2013.01); *H04L 41/0879* (2013.01);
(Continued)

(58) Field of Classification Search
USPC ............ 726/2, 4, 21, 36; 713/150, 163, 181; 380/255, 264, 276
See application file for complete search history.

(56) References Cited

U.S. PATENT DOCUMENTS

| 809 | A | * | 6/1838 | Walkly | ................... | H02K 25/00 |
| | | | | | | 310/46 |
| 916 | A | * | 9/1838 | Guyon | ................... | B62B 19/02 |
| | | | | | | 280/13 |

(Continued)

FOREIGN PATENT DOCUMENTS

| CN | 103903319 A | 7/2014 |
| CN | 104243250 A | 12/2014 |

(Continued)

OTHER PUBLICATIONS

Wang Yafeng, "Design and Implementation of Smart Home Service Platform Based on Cloud," Beijing Jiaotong University, 2018, with an English Abstract, 110 pages.

(Continued)

*Primary Examiner* — Sharif E Ullah
(74) *Attorney, Agent, or Firm* — Conley Rose, P.C.

(57) ABSTRACT

A device control method includes a first electronic device that configures a network for a home device using a first home application logged in using a first account, sends, in response to a first user operation, an authorization request to a device server, and receives a first authorization code; the home device receives the first authorization code; the first electronic device outputs the first authorization code; the device server stores second personal information corresponding to the second account; a second electronic device sends account information of the second account and a second authorization code to the home device, wherein a second home application is installed on the second electronic device and is logged in using a second account; the home device performs verification on the second authorization code based on the first authorization code, and when the verification succeeds, stores the account information of the second account.

20 Claims, 24 Drawing Sheets

(51) Int. Cl.
*H04L 41/08* (2022.01)
*H04W 4/80* (2018.01)
*H04W 76/19* (2018.01)
*G06F 21/62* (2013.01)

(52) U.S. Cl.
CPC ............ *H04W 4/80* (2018.02); *H04W 76/19* (2018.02); *G06F 21/6245* (2013.01); *H04L 2012/2841* (2013.01)

(56) References Cited

U.S. PATENT DOCUMENTS

| | | | | |
|---|---|---|---|---|
| 12,014 | A * | 11/1854 | Boynton | D05B 29/06 112/151 |
| 12,019 | A * | 12/1854 | Clark | F22B 37/428 236/103 |
| 32,007 | A * | 4/1861 | Shaw | D05B 73/12 192/41 R |
| 32,014 | A * | 4/1861 | Taylor | A61F 5/028 602/19 |
| 32,020 | A * | 4/1861 | Willmot | E05F 5/06 16/86 A |
| 52,018 | A * | 1/1866 | Blinn | E06B 9/24 160/133 |
| 61,998 | A * | 2/1867 | Bushman | A63C 1/30 280/11.12 |
| 62,004 | A * | 2/1867 | Children | A01B 35/08 172/333 |
| 62,005 | A * | 2/1867 | Clark | F23H 9/00 126/171 |
| 62,018 | A * | 2/1867 | De La Mar | A42C 1/04 223/13 |
| 72,017 | A * | 12/1867 | Gleason | B29C 33/62 264/130 |
| 82,011 | A * | 9/1868 | Lindsley | B07B 1/46 209/315 |
| 82,016 | A * | 9/1868 | McFarland et al. | E05G 1/14 109/29 |
| 82,017 | A * | 9/1868 | McNeil | B21D 1/06 72/482.94 |
| 102,014 | A * | 4/1870 | Kennedy | A46B 15/00 15/105 |
| 5,764,765 | A * | 6/1998 | Phoenix | H04L 9/0858 380/256 |
| 6,748,083 | B2 * | 6/2004 | Hughes | H04L 9/0858 380/278 |
| 7,437,081 | B2 * | 10/2008 | Mitchell | H04B 10/70 398/154 |
| 7,995,765 | B2 * | 8/2011 | Schneider | H04L 9/085 380/278 |
| 8,855,316 | B2 * | 10/2014 | Wiseman | H04L 9/0855 380/278 |
| 9,942,229 | B2 * | 4/2018 | Hein | H04L 63/102 |
| 9,960,465 | B2 * | 5/2018 | Dudley | H01M 50/204 |
| 10,057,058 | B2 * | 8/2018 | Murakami | H04L 9/0858 |
| 2005/0138352 | A1 * | 6/2005 | Gauvreau | H04L 9/3247 713/153 |
| 2007/0065154 | A1 * | 3/2007 | Luo | H04J 14/0282 398/141 |
| 2007/0076884 | A1 * | 4/2007 | Wellbrock | H04L 9/0855 380/263 |
| 2007/0195774 | A1 * | 8/2007 | Sherman | H04L 69/16 370/392 |
| 2010/0046739 | A1 * | 2/2010 | Schneider | H04L 9/085 380/28 |
| 2011/0206204 | A1 * | 8/2011 | Sychev | H04J 14/0273 380/256 |
| 2011/0213979 | A1 * | 9/2011 | Wiseman | H04L 9/0844 713/171 |
| 2014/0010234 | A1 * | 1/2014 | Patel | H04L 45/74 370/392 |
| 2014/0068765 | A1 * | 3/2014 | Choi | H04L 63/1416 726/23 |
| 2014/0133652 | A1 * | 5/2014 | Oshida | H04L 9/0897 380/255 |
| 2015/0236908 | A1 * | 8/2015 | Kim | H04L 12/2825 709/221 |
| 2016/0241396 | A1 * | 8/2016 | Fu | H04L 9/0836 |
| 2016/0359626 | A1 * | 12/2016 | Fu | H04L 9/0858 |
| 2016/0366094 | A1 * | 12/2016 | Mason | H04L 61/5038 |
| 2017/0214525 | A1 * | 7/2017 | Zhao | H04W 12/0431 |
| 2017/0230173 | A1 * | 8/2017 | Choi | H04L 9/0861 |
| 2017/0242557 | A1 * | 8/2017 | Rotschield | H04L 41/22 |
| 2018/0176091 | A1 * | 6/2018 | Yoon | H04L 43/0888 |
| 2018/0255057 | A1 * | 9/2018 | Hein | H04L 67/02 |
| 2019/0036821 | A1 * | 1/2019 | Levy | G06F 12/0868 |
| 2019/0349392 | A1 * | 11/2019 | Wetterwald | H04L 43/0852 |
| 2020/0084222 | A1 * | 3/2020 | William | H04L 63/12 |
| 2020/0336309 | A1 * | 10/2020 | Wang | G06F 21/33 |
| 2021/0407507 | A1 * | 12/2021 | Zhou | G06F 3/167 |
| 2022/0124100 | A1 * | 4/2022 | Yang | H04W 12/50 |

FOREIGN PATENT DOCUMENTS

| | | | |
|---|---|---|---|
| CN | 105511273 A | 4/2016 | |
| CN | 105577494 A | 5/2016 | |
| CN | 105743841 A | 7/2016 | |
| CN | 105897668 A | 8/2016 | |
| CN | 106209800 A | 12/2016 | |
| CN | 107172570 A | 9/2017 | |
| CN | 107819740 A | 3/2018 | |
| CN | 107995215 A | 5/2018 | |
| CN | 108462619 A | 8/2018 | |
| CN | 108513365 A | 9/2018 | |
| CN | 108513365 A * | 9/2018 | ............ H04W 12/06 |
| CN | 108768799 A | 11/2018 | |
| CN | 109743598 A | 5/2019 | |
| CN | 110336720 A | 10/2019 | |
| IN | 109584879 A | 4/2019 | |
| WO | 2015061787 A2 | 4/2015 | |
| WO | 2017004090 A1 | 1/2017 | |
| WO | 2019079928 A1 | 5/2019 | |

OTHER PUBLICATIONS

ITU-T H.264, Apr. 2017, "Series H: Audiovisual and Multimedia Systems, Infrastructure of audiovisual services—Coding of moving video, Advanced video coding for generic audiovisual services," 812 pages.

Emin Huseynov et al, "Enhancing RADIUS based multifactor-factor authentication systems with RESTful API for self-service enrolment," 2017 IEEE 11th International Conference on Application of Information and Communication Technologies (AICT), Sep. 2017, 4 pages.

* cited by examiner

DEVICE CONTROL METHOD AND DEVICE

CROSS-REFERENCE TO RELATED APPLICATIONS

This is a continuation of International Patent Application No. PCT/CN2020/098679 filed on Jun. 29, 2020, which claims priority to Chinese Patent Application No. 201910581511.X filed on Jun. 29, 2019. The disclosures of the aforementioned applications are hereby incorporated by reference in their entireties.

TECHNICAL FIELD

This application relates to the field of electronic technologies, and in particular, to a device control method and a device.

BACKGROUND

As Internet of Things technologies continuously develop, smart home devices are increasingly popular. More and more public places such as hotels provide smart home devices such as smart speakers and smart televisions (TVs) for users.

In a home application on a mobile phone, a user may configure a network for a smart home device in the user's home, and set personal information corresponding to a login account on the home application. The user may request the smart home device in the user's home to provide a service by using the foregoing personal information. For example, the user requests a smart speaker in the user's home to make a call by using an address book. If the user wants to use the foregoing personal information on a smart home device provided by a hotel, the user needs to configure a network for the smart home device provided by the hotel on the home application on the mobile phone. When the user leaves the hotel, the user needs to delete account-related information stored on the smart home device provided by the hotel, to avoid the personal information being used by another person.

However, in the foregoing process of using the personal information on the smart home device provided by the hotel, the user needs to manually configure a network for the smart home device provided by the hotel, and when leaving the hotel, deletes the account-related information stored on the smart home device provided by the hotel. Operations are complex for the user, and the user may forget to delete the account-related information when leaving the hotel, causing leakage of the personal information of the user.

SUMMARY

This application discloses a device control method and an electronic device, so that a second user neither need to configure a network for a home device on an application installed on an electronic device, nor need to set personal information in an interface of the home application, to reduce user operations, and improve convenience of using the home device by the second user.

According to a first aspect, an embodiment of this application provides a device control method. The method includes that a first electronic device configures a network for a home device by using a first home application, where the first home application used to control the home device is installed on the first electronic device, and the first home application is logged in by using a first account. The first electronic device receives a first user operation, and in response to the first user operation, the first electronic device sends an authorization request to a device server, where the authorization request is used to request to generate an authorization code of the home device. The first electronic device receives a first authorization code, and the home device receives the first authorization code, where the first authorization code is an authorization code of the home device that is generated by the device server according to the authorization request. The first electronic device outputs the first authorization code. A second electronic device receives a second authorization code entered by a user, where a second home application is installed on the second electronic device, the second home application is logged in by using a second account, and the device server stores second personal information corresponding to the second account. The second electronic device sends account information of the second account and the second authorization code to the home device, which performs verification on the second authorization code based on the first authorization code, and if the verification succeeds, the home device stores the account information of the second account, so that the home device can request, by using the account information of the second account, to provide a service by using the second personal information.

In the foregoing device control method, a first user may authorize, by using the first home application on the first electronic device, another electronic device to use the home device. A second user may perform authorization verification by using the second home application on the second electronic device, and after the verification succeeds, the second user may request, by using the account information of the second account by using which the second home application on the second electronic device is logged in, to provide a service by using the personal information corresponding to the second account. The second user neither needs to configure a network for the home device in an application interface of the second electronic device, nor needs to set personal information such as an address book and a very important person (VIP) account in the application interface of the second electronic device, so that user operations are reduced, and the second user uses the home device conveniently.

If the home device is, for example, a smart speaker, the first home application is a speaker application installed on the first electronic device, and the second home application is a speaker application installed on the second electronic device.

The account information of the second account is, for example, an account token of the second account. The first electronic device may display the received first authorization code.

With reference to the first aspect, in some embodiments, before the first electronic device receives the first user operation, the method further includes that the first electronic device displays a first user interface, where the first user interface includes an indicator of the home device and an OK control. In response to a second user operation, the first electronic device displays the indicator of the home device in a selected state. The first user operation is a touch operation on the OK control. The second user operation is a selection operation on the indicator of the home device.

The first user interface may be an interface for authorizing another person.

With reference to the first aspect, in some embodiments, before the first electronic device receives the first user operation, the method further includes that the first electronic device receives authorization time entered by the user, where the authorization request further includes the authorization time, and the authorization time is sent by the device server to the home device. After the home device stores the account information of the second account, the method further includes that the home device deletes the account information of the second account when detecting that the authorization time expires.

The account information of the second account is stored only within the authorization time, and the account information of the second account is cleared after the authorization time expires, to avoid leakage of the personal information corresponding to the second account.

The authorization time may be set by the first user. The first user interface further includes a time setting area. In response to a third user operation, the first electronic device displays the authorization time in the time setting area. The third user operation is an operation of entering the authorization time. The authorization request carries the authorization time, and the first authorization code is valid within the authorization time.

With reference to the first aspect, in some embodiments, before the first electronic device receives the first user operation, the method further includes that the first electronic device receives an authorized account entered by the user, where the authorized account is sent by the device server to the home device. That the home device performs verification on the second authorization code based on the first authorization code, and if the verification succeeds, the home device stores the account information of the second account includes that the home device performs verification on the second authorization code based on the first authorization code, and performs verification on the authorized account based on the account information of the second account, and if the second authorization code is verified and the authorized account is verified, the home device stores the account information of the second account.

In addition to the authorization code, the home device may also perform verification on the authorized account. Therefore, only authorization of the second electronic device on which login is performed by using the specific second account is allowed to be verified, to improve security of an authorization process and an authorization verification process.

The authorized account may be set by the first user. The first user interface further includes a first input box. In response to a fourth user operation, the first electronic device displays the second account in the first input box. The fourth user operation is an operation of entering the authorized account. The authorization request carries the second account, and the authorization request is used to request to generate an authorization code of the home device for the second account. The first authorization code is used by the home device to perform verification on the second authorization code and perform verification on the second account. When the second authorization code is verified and the second account is verified, the home device stores the account information of the second account.

With reference to the first aspect, in some embodiments, the first user interface includes an authorization record control, and in response to a touch operation performed by the user on the authorization record control, the first electronic device displays an authorization record. The authorization record may include at least one of the following: authorization time, an authorized account, and an authorization code.

With reference to the first aspect, in some embodiments, before the second electronic device receives the second authorization code entered by the user, the method further includes that the second electronic device displays a second user interface, where the second user interface includes a second input box and an OK control, and a second account is used for login on the second electronic device, in response to a fifth user operation, the second electronic device displays a second authorization code in the second input box, where the fifth user operation is an input operation in the second input box, and in response to an operation on the OK control, the second electronic device sends the account information of the second account and the second authorization code to the home device. The home device performs verification on the second authorization code based on the stored first authorization code, and stores the account information of the second account when the verification succeeds.

The second user interface may be an authorization code input interface.

In some embodiments, before the second electronic device displays the second user interface, the method further includes that the second electronic device detects whether a short-distance wireless connection to the home device has been established, when detecting that the second electronic device has no short-distance wireless connection to the home device, the second electronic device displays a first connect portal in the second user interface, and in response to a touch operation on the first connect portal, the second electronic device displays a third user interface, where the third user interface is used to establish a short-distance wireless connection between the second electronic device and the home device.

With reference to the first aspect, in some embodiments, the account information of the second account and the second authorization code are sent through the short-distance wireless connection between the second electronic device and the home device.

The short-distance wireless connection is a WI-FI connection. The third user interface may be a WI-FI connection interface.

With reference to the first aspect, in some embodiments, when detecting that the short-distance wireless connection to the home device has been established, in response to a touch operation on the OK control, the second electronic device sends the account information of the second account and the second authorization code to the home device through the short-distance wireless connection.

With reference to the first aspect, in some embodiments, when detecting that the second electronic device has no short-distance wireless connection to the home device, in response to a touch operation on the OK control, the second electronic device stores the second authorization code, and displays a fourth user interface, where the fourth user interface may be a connection prompting interface, including a second connect portal. In response to a touch operation on the second connect portal, the second electronic device displays the third user interface. When detecting that the short-distance wireless connection to the home device has been established, the second electronic device sends the account information of the second account and the second authorization code to the home device.

With reference to the first aspect, in some embodiments, after the home device stores the account information of the second account, the method further includes that the second electronic device periodically sends connection confirmation information to the home device through the short-distance wireless connection in a periodicity of a first time threshold, and the home device deletes the account information of the second account when the connection confirmation information is not received after a second time threshold expires, where the second time threshold is greater than or equal to the first time threshold.

After the short-distance communication connection (for example, the WI-FI connection) between the home device and the second electronic device is disconnected, the home device may delete the account information of the second account. After receiving a voice signal, the home device cannot access, by using the device server, the personal information corresponding to the second account. The home device deletes the account information of the second account, to ensure that another person cannot use the personal information of the second user after the second user leaves an area in which the home device is located. This can avoid leakage of the personal information of the second user, and ensure security of the second account.

With reference to the first aspect, in some embodiments, after the home device deletes the account information of the second account, the home device further stores a connection record of the short-distance wireless connection to the second electronic device, and the connection record is used by the home device to re-establish a short-distance wireless connection to the second electronic device. The method further includes, when detecting that the home device re-establishes a short-distance wireless connection to the second electronic device by using the connection record, the second electronic device sends the account information of the second account to the home device through the short-distance wireless connection, and the home device stores the account information of the second account. After restoring the WI-FI connection to the second electronic device by using the connection record, the home device does not need to perform verification on the authorization code again, and this provides operation convenience for the second user.

The connection confirmation information may be in either of the following cases:

(1) The connection confirmation information is the account information of the second account.

The account information of the second account may not only be used to update the account information of the second account on the home device, but also be used to ensure security of the personal information of the second user.

(2) The connection confirmation information is generated by the home device based on the account information of the second account and is sent to the second electronic device. Further, after the home device stores the account information of the second account, and before the second electronic device periodically sends the connection confirmation information to the home device through the short-distance wireless connection in a periodicity of the first time threshold, the method further includes that the home device generates first information based on the account information of the second account, where the first information one-to-one corresponds to the account information of the second account, and the home device sends the first information to the second electronic device, where the connection confirmation information is the first information.

The first information may be a character string, and the character string one-to-one corresponds to the account information of the second account.

Optionally, a connection record of the short-distance wireless connection may be cleared by the home device after the authorization time expires, to ensure security of the account information of the second account.

Optionally, if the account information of the second account is stored on the home device for more than preset duration (for example, 30 minutes), the account information of the second account is invalid or cleared, to further ensure security of the account information of the second account.

With reference to the first aspect, in some embodiments, after the second electronic device sends the account information of the second account and the second authorization code to the home device, the method further includes that the second electronic device receives updated account information of the second account from an account server, the second electronic device sends the updated account information of the second account to the home device, and the home device stores the updated account information of the second account. The account server periodically updates the account information, to avoid the account information of the second account being stolen by another person. This improves security and reduces a leakage risk of the account information.

With reference to the first aspect, in some embodiments, after the first electronic device receives the first authorization code, the home device may still store account information of the first account. In addition, the first user may still perform an operation, for example, deleting or authorizing another person, on the home device by using an interface of the speaker application on the first electronic device.

If the first user re-requests a new authorization code from the device server by using the first electronic device within the authorization time, the device server sends the new authorization code to the home device, and the home device may delete the first authorization code, and delete the account information of the second account. After deleting the account information of the second account, the home device cannot provide a service in response to a voice signal of the second user. The second user needs to re-enter a new authorization code by using the second electronic device and perform authorization verification by using the home device again. The home device can store the account information of the second account only after the verification succeeds again.

According to a second aspect, an embodiment of this application provides a device control method, and the method is performed by a home device. The method includes that the home device receives an authorization instruction from a device server, where the authorization instruction includes a first authorization code, and the device server stores second personal information corresponding to a second account. The home device receives a second authorization code and account information of the second account from a second electronic device, and verifies whether the second authorization code is the same as the first authorization code, where the second account is used for login on the second electronic device. The home device stores the account information of the second account when the second authorization code is the same as the first authorization code, so that the home device can request, by using the account information of the second account, to provide a service by using the second personal information.

In the foregoing device control method, another electronic device may be authorized, by using a first home application on a first electronic device, to use the home device. Only after authorization verification by using the home device succeeds, the home device may request, by using the account information of the second account, to provide a service by using the personal information corresponding to the second account. A second user neither needs to configure a network for the home device in an application interface of the second electronic device, nor needs to set personal information such as an address book and a VIP account in the application interface of the second electronic device, so that user operations are reduced, and the second user uses the home device conveniently.

With reference to the second aspect, in some embodiments, after the home device stores the account information of the second account, the method further includes that the home device receives a voice signal. The home device sends a service request to the device server, where the service request carries the account information of the second account and voice data of the voice signal, and the account information of the second account is used by the device server to provide a service for the home device based on the second personal information and the voice data of the voice signal.

With reference to the second aspect, in some embodiments, the authorization instruction further includes authorization time, and after the home device stores the account information of the second account, the method further includes that the home device deletes the account information of the second account when detecting that the authorization time expires. The account information of the second account is stored only within the authorization time, and the account information of the second account is cleared after the authorization time expires, to avoid leakage of the personal information corresponding to the second account.

With reference to the second aspect, in some embodiments, after the home device stores the account information of the second account, the method further includes that the home device receives connection confirmation information from the second electronic device through a short-distance wireless connection, where the connection confirmation information is periodically sent by the second electronic device in a periodicity of a first time threshold. The home device deletes the account information of the second account when the connection confirmation information is not received after a second time threshold expires, where the second time threshold is greater than or equal to the first time threshold.

After the short-distance communication connection (for example, a WI-FI connection) between the home device and the second electronic device is disconnected, the home device may delete the account information of the second account. After receiving a voice signal, the home device cannot access, by using the device server, the personal information corresponding to the second account. The home device deletes the account information of the second account, to ensure that another person cannot use the personal information of the second user after the second user leaves an area in which the home device is located. This can avoid leakage of the personal information of the second user, and ensure security of the second account.

The connection confirmation information may be in either of the following cases:

(1) The connection confirmation information is the account information of the second account.

The account information of the second account may not only be used to update the account information of the second account on the home device, but also be used to ensure security of the personal information of the second user.

(2) The connection confirmation information is generated by the home device based on the account information of the second account and is sent to the second electronic device. Further, after the home device stores the account information of the second account, and before the second electronic device periodically sends the connection confirmation information to the home device through the short-distance wireless connection in a periodicity of the first time threshold, the method further includes that the home device generates first information based on the account information of the second account, where the first information one-to-one corresponds to the account information of the second account, and the home device sends the first information to the second electronic device, where the connection confirmation information is the first information.

The first information may be a character string, and the character string one-to-one corresponds to the account information of the second account.

Optionally, a connection record of the short-distance wireless connection may be cleared by the home device after the authorization time expires, to ensure security of the account information of the second account.

Optionally, if the account information of the second account is stored on the home device for more than preset duration (for example, 30 minutes), the account information of the second account is invalid or cleared, to further ensure security of the account information of the second account.

With reference to the second aspect, in some embodiments, after the home device deletes the account information of the second account, the home device further stores a connection record of the short-distance wireless connection to the second electronic device, and the connection record is used by the home device to re-establish a short-distance wireless connection to the second electronic device. The method further includes, when detecting that the home device re-establishes a short-distance wireless connection to the second electronic device by using the connection record, the home device receives the account information of the second account from the second electronic device through the short-distance wireless connection, and stores the account information of the second account.

With reference to the second aspect, in some embodiments, the authorization instruction further includes an authorized account, and after the home device verifies whether the second authorization code is the same as the first authorization code, the method further includes that the home device performs verification on the authorized account based on the account information of the second account. That the home device stores the account information of the second account when the first authorization code is the same as the second authorization code includes, when the first authorization code is the same as the second authorization code and the authorized account is verified, the home device stores the account information of the second account.

According to a third aspect, an embodiment of this application provides a device control method, and the method is performed by a first electronic device. The method includes that the first electronic device configures a network for a home device by using a first home application, where the first home application used to control the home device is installed on the first electronic device, and the first home application is logged in by using a first account. The first electronic device receives a first user operation, and in response to the first user operation, the first electronic device sends an authorization request to a device server, where the authorization request is used to request to generate an authorization code of the home device. The first electronic device receives a first authorization code, where the first authorization code is an authorization code of the home device that is generated by the device server according to the authorization request, and the first authorization code is used by the home device to perform verification on a second authorization code from a second electronic device. The first electronic device outputs the first authorization code. The home device is, for example, a smart speaker, and the first home application is a speaker application that corresponds to the smart speaker and that is installed on the first electronic device. The home device may alternatively be a smart TV, and the first home application is a TV application that corresponds to the smart TV and that is installed on the first electronic device.

In the foregoing device control method, a first user may authorize, by using the application on the first electronic device, another electronic device to use the home device. A second user may perform authorization verification by using an application on the second electronic device, and after the verification succeeds, the second user may request, by using account information of a second account, to provide a service by using personal information corresponding to the second account. Authorization is performed by using the speaker application on the first electronic device. The second user neither needs to configure a network for the home device in an application interface of the electronic device, nor needs to set personal information such as an address book and a VIP account by using the application interface, so that user operations are reduced, and the second user uses the home device conveniently.

With reference to the third aspect, in some embodiments, before the first electronic device receives the first user operation, the method further includes that the first electronic device displays a first user interface, where the first user interface includes an indicator of the home device and an OK control, and in response to a second user operation, the first electronic device displays the indicator of the home device in a selected state. The first user operation is a touch operation on the OK control.

The first user interface may be an interface for authorizing another person.

With reference to the third aspect, in some embodiments, the first user interface further includes a time setting area. In response to a third user operation, the first electronic device displays authorization time in the time setting area, where the authorization request carries the authorization time, and the first authorization code is valid within the authorization time. The first authorization code is used by the home device to perform verification on the second authorization code, and detect whether the authorization time expires. When the second authorization code is verified and the authorization time does not expire, the home device stores the account information of the second account.

The account information of the second account is stored only within the authorization time, and the account information of the second account is cleared after the authorization time expires, to avoid leakage of the personal information corresponding to the second account.

In a management scenario in a hotel, the first user is, for example, a hotel administrator, and the second user is, for example, a guest. The hotel administrator may authorize the guest to use a home device in a hotel room for a period of time (for example, a rental period).

With reference to the third aspect, in some embodiments, an authorized account may be set by the first user. The first user interface further includes a first input box. In response to a fourth user operation, the first electronic device displays the second account in the first input box. The authorization request carries the second account, and the authorization request is used to request to generate an authorization code of the home device for the second account. The first authorization code is used by the home device to perform verification on the second authorization code and perform verification on the second account. When the second authorization code is verified and the second account is verified, the home device stores the account information of the second account.

With reference to the third aspect, in some embodiments, there are one or more home devices, and the first authorization code is used by each home device to perform verification on the second authorization code from the second electronic device.

With reference to the third aspect, in some embodiments, the first user interface includes an authorization record control, and in response to a touch operation performed by the user on the authorization record control, the first electronic device displays an authorization record. The authorization record may include at least one of the following: authorization time, an authorized account, and an authorization code.

According to a fourth aspect, an embodiment of this application provides a device control method, and the method is performed by a second electronic device. The method includes that the second electronic device displays a second user interface, where the second user interface includes a second input box and an OK control, and a second account is used for login on the second electronic device. In response to a fifth user operation, the second electronic device displays a second authorization code in the second input box, and in response to a touch operation on the OK control, the second electronic device sends account information of the second account and the second authorization code to a home device through a short-distance wireless connection. The home device performs verification on the second authorization code based on a stored first authorization code, and stores the account information of the second account when the verification succeeds.

In the foregoing device control method, a first user may authorize, by using an application on a first electronic device, another electronic device to use the home device. A second user may perform authorization verification by using an application on the second electronic device, and after the verification succeeds, the second user may request, by using the account information of the second account, to provide a service by using personal information corresponding to the second account. Authorization verification is performed by using a speaker application on the second electronic device. The second user neither needs to configure a network for the home device in an application interface of the electronic device, nor needs to set personal information such as an address book and a VIP account by using the application interface, so that user operations are reduced, and the second user uses the home device conveniently.

With reference to the fourth aspect, in some embodiments, before the second electronic device displays the second user interface, the method further includes that the second electronic device detects whether a short-distance wireless connection to the home device has been established. When detecting that the second electronic device has no short-distance wireless connection to the home device, the second electronic device displays a first connect portal in the second user interface, and in response to a touch operation on the first connect portal, the second electronic device displays a third user interface, where the third user interface is used to establish a short-distance wireless connection between the second electronic device and the home device.

With reference to the fourth aspect, in some embodiments, that in response to a touch operation on the OK control, the second electronic device sends account information of the second account and the second authorization code to a home device through a short-distance wireless connection includes, when detecting that the short-distance wireless connection has been established to the home device, in response to the touch operation on the OK control, the second electronic device sends the account information of the second account and the second authorization code to the home device through the short-distance wireless connection.

With reference to the fourth aspect, in some embodiments, the method further includes, when detecting that the second electronic device has no short-distance wireless connection to the home device, in response to the touch operation on the OK control, the second electronic device stores the second authorization code, and displays a fourth user interface, where the fourth user interface includes a second connect portal. In response to a touch operation on the second connect portal, the second electronic device displays the third user interface, and when detecting that the short-distance wireless connection to the home device has been established, the second electronic device sends the account information of the second account and the second authorization code to the home device.

With reference to the fourth aspect, in some embodiments, after the second electronic device sends the account information of the second account and the second authorization code to the home device through the short-distance wireless connection, the method further includes that the second electronic device periodically sends connection confirmation information to the home device through the short-distance wireless connection, where the connection confirmation information is used by the home device to delete the account information of the second account when the home device does not receive the connection confirmation information after a first time threshold expires.

With reference to the fourth aspect, in some embodiments, the connection confirmation information is the account information of the second account.

With reference to the fourth aspect, in some embodiments, after the second electronic device sends the account information of the second account and the second authorization code to the home device through the short-distance wireless connection, the method further includes that the second electronic device receives updated account information of the second account from an account server, and the second electronic device sends the updated account information of the second account to the home device, so that the home device updates the account information of the second account.

According to a fifth aspect, an embodiment of this application provides a device control method, and the method is performed by a device server. The method includes that the device server receives an authorization request sent by a first electronic device, where the authorization request is used to request to generate an authorization code of a home device. The server generates a first authorization code, and sends the first authorization code to the home device and the first electronic device, where the first authorization code is used by the home device to perform verification on a second authorization code from a second electronic device. When the verification succeeds, the home device stores account information of a second account used for login on the second electronic device, so that a service is provided for the home device based on the account information of the second account.

In this embodiment of this application, the device server may store personal information corresponding to the account information of the second account, and may further store personal information corresponding to account information of a first account.

Optionally, the device server may further store the personal information corresponding to the second account, and may further store the personal information corresponding to the first account. The device server may request the account information of the second account from an account server based on the second account.

The device server may further provide a service for the home device based on a recognition result of voice data and the personal information corresponding to the second account.

For example, if the recognition result of the audio data is "call Xiao Ming", the device server may find a phone number corresponding to Xiao Ming from an address book corresponding to the second account, and then provide, for the home device, a function of dialing the phone number corresponding to Xiao Ming.

For another example, the recognition result of the audio data is "play 'My heart will go on'". If the song "My heart will go on" is a VIP song (that is, only a music play VIP account has the permission to play the song), the device server obtains a music play VIP account corresponding to the second account. Then, the device server sends audio data corresponding to the song "My heart will go on" to the home device based on the music play VIP account, so that the home device plays the song.

In this embodiment of this application, the account server may perform verification on the account according to a request of the home device. Further, the home device may send, to the account server by using the device server, a request used to obtain an account corresponding to the account information of the second account. The account server obtains a corresponding third account based on the account information of the second account. The account server may store each account and corresponding account information. The account server may obtain, based on a correspondence between an account and account information, the third account corresponding to the account information of the second account. The account server sends the third account to the home device by using the device server. The home device determines, through comparison, whether the second account is the same as the third account, and when a comparison result is that the second account is the same as the third account, account verification succeeds.

According to a sixth aspect, an embodiment of this application provides a device control system. The system includes a first electronic device, a home device, and a second electronic device. The first electronic device has configured a network for the home device by using a first home application, where the first home application used to control the home device is installed on the first electronic device, and the first home application is logged in by using a first account. A second home application is installed on the second electronic device, the second home application is logged in by using a second account, and a device server stores second personal information corresponding to the second account. The second electronic device establishes a connection to the home device. In the device control system, the device control method according to any one of the first aspect or the possible implementations of the first aspect is performed.

According to a seventh aspect, an embodiment of this application provides a home device, including one or more processors and a memory. The memory is coupled to the one or more processors, the memory is configured to store computer program code, and the computer program code includes computer instructions. When the one or more processors execute the computer instructions, the home device is enabled to perform the method according to any one of the second aspect or the possible implementations of the second aspect.

According to an eighth aspect, an embodiment of this application provides an electronic device, including one or more processors, a memory, and a display. The memory and the display are coupled to the one or more processors, the memory is configured to store computer program code, and the computer program code includes computer instructions. When the one or more processors execute the computer instructions, the electronic device is enabled to perform the method according to any one of the third aspect, the fourth aspect, the possible implementations of the third aspect, or the possible implementations of the fourth aspect.

According to a ninth aspect, an embodiment of this application provides a device server, including one or more processors and a memory. The memory is coupled to the one or more processors, the memory is configured to store computer program code, and the computer program code includes computer instructions. When the one or more processors execute the computer instructions, the device server is enabled to perform the method according to any one of the fifth aspect or the possible implementations of the fifth aspect.

According to a tenth aspect, this application provides a computer storage medium, including computer instructions. When the computer instructions are run on an electronic device, the electronic device is enabled to perform the method according to any one of the first aspect, the second aspect, the third aspect, the fourth aspect, the fifth aspect, the possible implementations of the first aspect, the possible implementations of the second aspect, the possible implementations of the third aspect, the possible implementations of the fourth aspect, or the possible implementations of the fifth aspect.

According to an eleventh aspect, an embodiment of this application provides a computer program product. When the computer program product is run on a computer, the computer is enabled to perform the method according to any one of the first aspect, the second aspect, the third aspect, the fourth aspect, the fifth aspect, the possible implementations of the first aspect, the possible implementations of the second aspect, the possible implementations of the third aspect, the possible implementations of the fourth aspect, or the possible implementations of the fifth aspect.

It may be understood that the system according to the sixth aspect, the home device according to the seventh aspect, the electronic device according to the eighth aspect, the device server according to the ninth aspect, the computer storage medium according to the tenth aspect, or the computer program product according to the eleventh aspect are all configured to perform the device control method provided in the embodiments of this application. Therefore, for beneficial effects that can be achieved, refer to the beneficial effects in the corresponding method. Details are not described herein again.

BRIEF DESCRIPTION OF DRAWINGS

The following describes accompanying drawings used in embodiments of this application.

DESCRIPTION OF EMBODIMENTS

The following describes the embodiments of this application with reference to the accompanying drawings in the embodiments of this application. Terms used in implementations of the embodiments of this application are merely intended to explain specific embodiments of this application, and are not intended to limit this application.

First, application scenarios related to the embodiments of this application are described. The following uses a scenario of using a smart home device in a hotel as an example. If a user has configured a network for a smart home device by using an electronic device in the user's home, and sets personal information (for example, an address book used for dialing in a smart speaker, and a VIP account corresponding to a smart TV) corresponding to a login account (for example, a HUAWEI account) by using a speaker application on the electronic device, the user can use the above personal information on the smart home device in the hotel after authorization verification succeeds. For example, the user uses the personal address book to make a call on a smart speaker in the hotel or use the VIP account to play a VIP video on a smart TV in the hotel. After detecting that the user leaves the hotel with the electronic device, the smart home device in the hotel may clear information related to the personal information of the user, to avoid leakage of the personal information of the user and avoid the personal information of the user being used by another person.

In another scenario of using smart home device at home, authorization verification on a plurality of users at home may be performed by using a same smart home device, and if the verification succeeds, each of the plurality of users may use personal information of the user on the smart home device. For example, for a smart speaker, each user may set an address book of the user by using a login account of a speaker application on a mobile phone of the user, and make a call on the smart speaker by using the address book of the user. When detecting an approaching mobile phone, the smart speaker may make a call by using an address book corresponding to a login account of a speaker application on the approaching mobile phone. Therefore, each of the plurality of users can make a call on the smart speaker by using the address book of the user.

Figure 1:
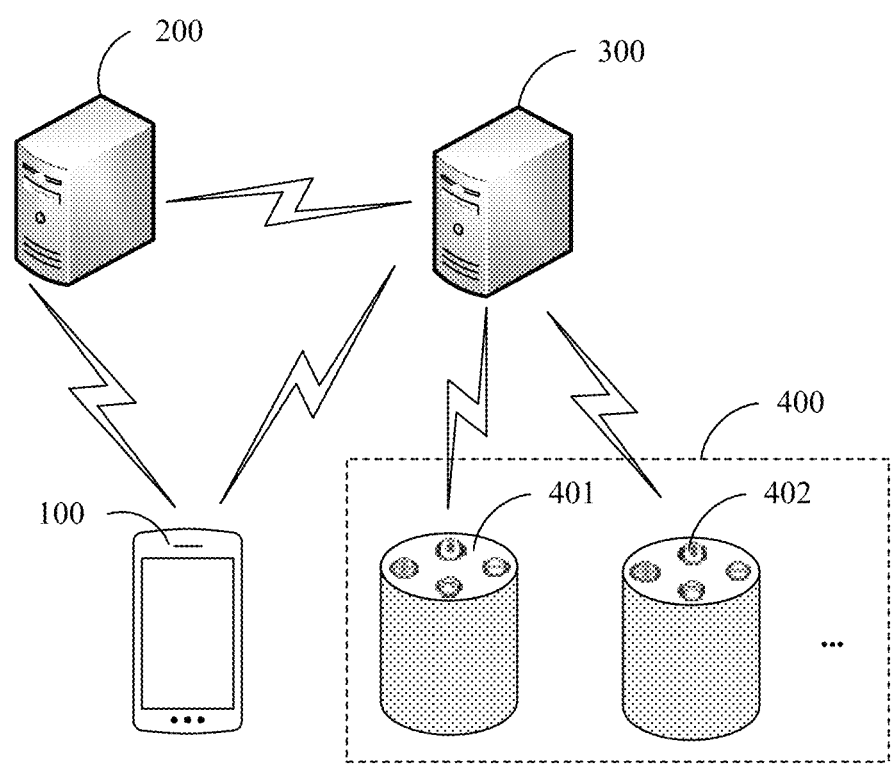
FIG. 1 is a schematic diagram of a network architecture of a smart home system according to an embodiment of this application.

The following describes a system architecture in the embodiments of this application. FIG. 1 is a schematic diagram of a network architecture of a smart home system according to an embodiment of this application. The smart home system is described by using an example in which there is a smart speaker in each of a plurality of rooms in a hotel. It may be understood that the smart home system may also be applied to another scenario. This is not limited in the embodiments of this application.

As shown in FIG. 1, the smart home system may include an electronic device 100, an account server 200, a device server 300, and smart home devices 400. The smart home devices 400 may include a plurality of smart speakers: a smart speaker 401, a smart speaker 402, etc.

For example, in a smart home device scenario in the hotel, each of the plurality of smart speakers corresponds to a setting area (for example, a room indicated by a room number). For example, a setting area corresponding to the smart speaker 401 is a room 101, and a setting area corresponding to the smart speaker 402 is a room 102. It may be understood that a smart speaker is used as an example in the embodiments of this application. However, the embodiments of this application are not limited to the smart speaker. The smart home devices 400 may further include, for example, a smart TV, or a smart air conditioner.

A speaker application on the electronic device 100 is logged in by using a first account, and the first account corresponds to the account server 200. The electronic device 100 may establish a communication connection to the account server 200. The first account is, for example, a HUAWEI account.

The following describes an example of a process in which the speaker application on the electronic device 100 is logged in by using the first account. A user may register the first account with the account server 200 by using the electronic device 100, and may further set a login password corresponding to the first account during registration. After the registration, the user may enter the first account and the corresponding login password in an application interface of the speaker application on the electronic device 100, to request to log in to the account server 200. After receiving the request, the account server 200 performs verification on the first account and the corresponding login password, and allows to log in to the speaker application on the electronic device 100 by using the first account after the verification succeeds. The account server 200 may send a token of a verification success to the electronic device 100. The token is, for example, an account token. The account server 200 may periodically update the token corresponding to the first account, and send an updated token to the electronic device 100.

In the embodiments of this application, the account server 200 may establish a communication connection to the device server 300. The device server 300 may be configured to store personal information corresponding to the first account. The personal information may include an address book used by the smart speaker for dialing, a music play VIP account, and the like. When the smart home device 400 includes a smart TV, the personal information includes, for example, a video play VIP account.

The device server 300 may further establish a communication connection to the smart speaker 401. The device server 300 may receive a service request (which may carry an account token) from the smart speaker 401, and the device server 300 may further request the account server 200 to verify whether the account token from the smart speaker 401 is valid. For example, the service request may be used to request the device server 300 to dial based on the stored address book. The device server 300 further establishes a communication connection to the smart speaker 402. For details, refer to the communication connection between the device server 300 and the smart speaker 401.

The device server 300 may further establish a communication connection to the electronic device 100. In response to a user operation, the electronic device 100 may request the device server 300 to authorize another person to use the smart speaker 401. For details, refer to the example in FIG. 7.

The electronic device 100 and the electronic device 500 in the following in the embodiments of this application may be a mobile phone, a tablet computer, a desktop computer, a laptop computer, a notebook computer, an ultra-mobile personal computer (UMPC), a handheld computer, a netbook, a personal digital assistant (PDA), a wearable electronic device, a virtual reality device, and the like.

As shown in FIG. 1, an example in which the smart home device includes a plurality of smart speakers is used for description in the embodiments of this application. However, the smart home device is not limited in the embodiments of this application. The smart home device may further include a smart light, a smart TV, a smart air conditioner, an anti-theft door lock, a smart speaker, a robotic vacuum cleaner, a smart socket, a smart body fat scale, a smart lamp, an air purifier, a smart refrigerator, a smart washing machine, a smart water heater, a smart microwave oven, a smart rice cooker, a smart curtain, a smart fan, a smart set-top box, a smart door and window, and the like.

The following describes an electronic device in the embodiments of this application.

Figure 2:
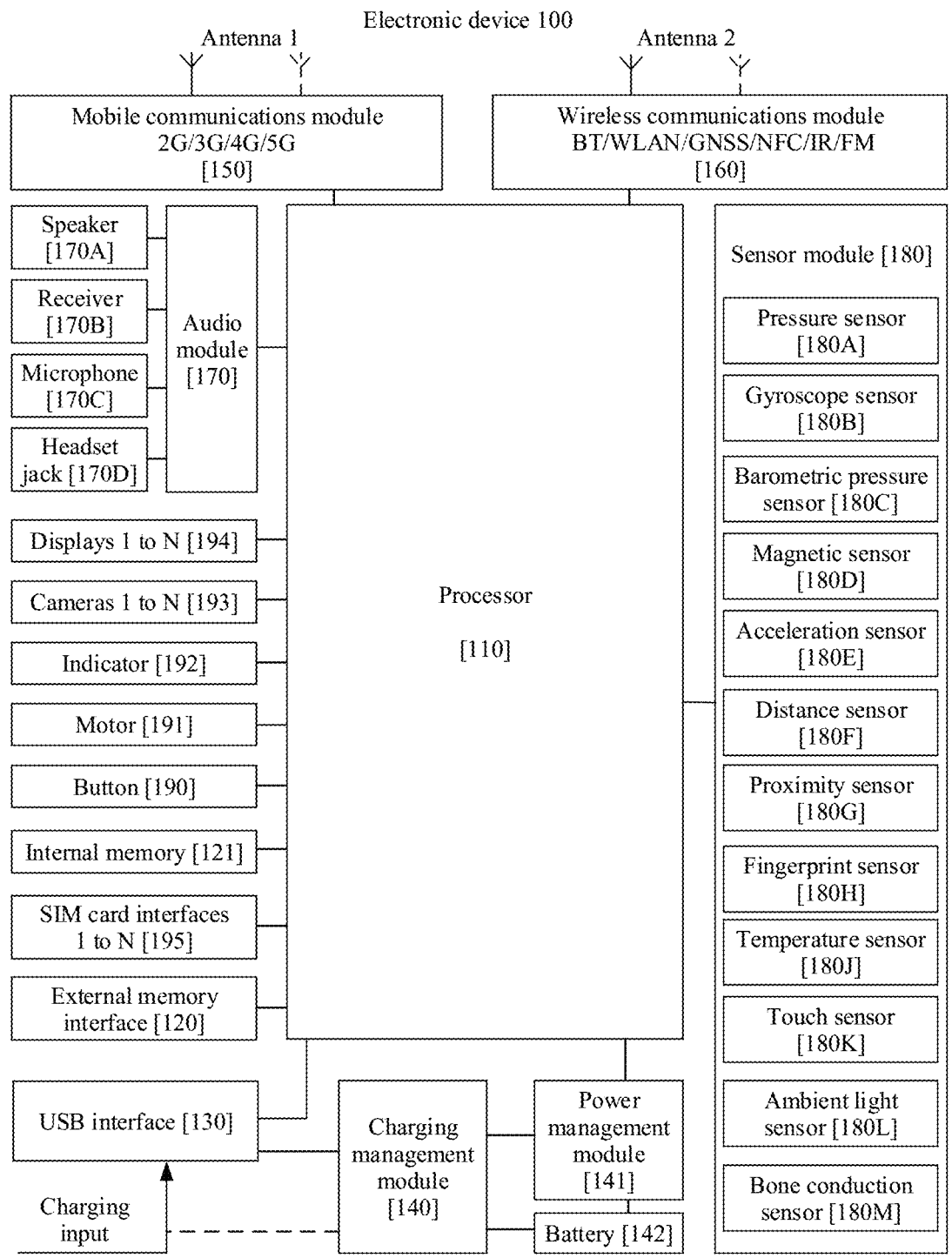
FIG. 2 is a schematic diagram of a structure of an electronic device according to an embodiment of this application.

FIG. 2 is a schematic diagram of a structure of an electronic device 100 according to an embodiment of this application.

The electronic device 100 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that a structure shown in the embodiments of the present disclosure does not constitute a specific limitation on the electronic device 100. In some other embodiments of this application, the electronic device 100 may include more or fewer components than those shown in the figure, or some components may be combined, or some components may be split, or there may be a different component layout. The components in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors.

The controller may be a nerve center and a command center of the electronic device 100. The controller may generate an operation control signal based on instruction operation code and a time sequence signal, to control to read instructions and execute instructions.

A memory may be further disposed in the processor 110, and is configured to store instructions and data. In some embodiments, the memory in the processor 110 is a cache memory. The memory may store an instruction or data that has just been used or is periodically used by the processor 110. If the processor 110 needs to use the instructions or the data again, the processor 110 may directly invoke the instructions or the data from the memory, to avoid repeated access. This reduces a waiting time of the processor 110, and improves system efficiency.

In some embodiments, the processor 110 may include one or more interfaces. The interface may include an inter-integrated circuit (I2C) interface, an I2C sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a USB interface, and/or the like.

The I2C interface is a two-way synchronization serial bus, and includes a serial data line (SDA) and a serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a BLUETOOTH headset.

The PCM interface may also be configured to perform audio communication, and sample, quantize, and code an analog signal. In some embodiments, the audio module 170 may be coupled to the wireless communications module 160 through a PCM bus interface. In some embodiments, the audio module 170 may alternatively transmit an audio signal to the wireless communications module 160 through the PCM interface, to implement a function of answering a call by using the BLUETOOTH headset. Both the I2S interface and the PCM interface may be configured to perform audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect the processor 110 to the wireless communications module 160. For example, the processor 110 communicates with a BLUETOOTH module in the wireless communications module 160 through the UART interface, to implement a BLUETOOTH function. In some embodiments, the audio module 170 may transmit an audio signal to the wireless communications module 160 through the UART interface, to implement a function of playing music by using the BLUETOOTH headset.

The MIPI interface may be configured to connect the processor 110 to a peripheral component such as the display 194 or the camera 193. The MIPI interface includes a camera serial interface (CSI), a display serial interface (DSI), or the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured by using software. The GPIO interface may be configured as a control signal or a data signal. In some embodiments, the GPIO interface may be configured to connect the processor 110 to the camera 193, the display 194, the wireless communications module 160, the audio module 170, the sensor module 180, and the like. The GPIO interface may alternatively be configured as the I2C interface, the I2S interface, the UART interface, the MIPI interface, or the like.

The USB interface 130 is an interface that complies with a USB standard specification, and may be further a mini USB interface, a micro USB interface, a USB Type-C interface, or the like. The USB interface 130 may be configured to connect to a charger to charge the electronic device 100, or may be configured to transmit data between the electronic device 100 and a peripheral device, or may be configured to connect to a headset to play audio by using the headset, or may be configured to connect to another electronic device such as an augmented reality (AR) device.

It can be understood that an interface connection relationship between the modules shown in the embodiments of the present disclosure is merely an example for description, and does not constitute a limitation on the structure of the electronic device 100. In some other embodiments of this application, the electronic device 100 may alternatively use an interface connection mode different from that in the foregoing embodiment, or use a combination of a plurality of interface connection modes.

The charging management module 140 is configured to receive a charging input from the charger. The charger may be a wireless charger or a wired charger. In some embodiments in which wired charging is used, the charging management module 140 may receive a charging input from the wired charger through the USB interface 130. In some embodiments of wireless charging, the charging management module 140 may receive a wireless charging input through a wireless charging coil of the electronic device 100. The charging management module 140 may further supply power to the electronic device by using the power management module 141 when the battery 142 is charged.

The power management module 141 is configured to connect the battery 142 and the charging management module 140 to the processor 110. The power management module 141 receives an input of the battery 142 and/or an input of the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same component.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may further be multiplexed to improve antenna utilization. For example, the antenna 1 may be multiplexed as a diversity antenna in a wireless local area network. In some other embodiments, the antenna may be used in combination with a tuning switch.

The mobile communications module 150 can provide a solution, applied to the electronic device 100, to wireless communication including second generation (2G)/third generation (3G)/fourth generation (4G)/fifth generation (5G), and the like. The mobile communications module 150 may include at least one filter, a switch, a power amplifier, a low-noise amplifier (LNA), and the like. The mobile communications module 150 may receive an electromagnetic wave through the antenna 1, perform processing such as filtering and amplification on the received electromagnetic wave, and transmit the processed electromagnetic wave to the modem processor for demodulation. The mobile communications module 150 may further amplify a signal modulated by the modem processor, and convert an amplified signal into an electromagnetic wave through the antenna 1 for radiation. In some embodiments, at least some functional modules of the mobile communications module 150 may be disposed in the processor 110. In some embodiments, at least some functional modules in the mobile communications module 150 may be disposed in a same device as at least some modules in the processor 110.

The modem processor may include a modulator and a demodulator. The modulator is configured to modulate a to-be-sent low-frequency baseband signal into a medium or high-frequency signal. The demodulator is configured to demodulate a received electromagnetic wave signal into a low frequency baseband signal. Then, the demodulator transmits the low-frequency baseband signal obtained through the demodulation to the baseband processor for processing. The low-frequency baseband signal is processed by the baseband processor, and then transmitted to the application processor. The application processor outputs a sound signal by using an audio device (which is not limited to the speaker 170A, the receiver 170B, or the like), or displays an image or a video by using the display 194. In some embodiments, the modem processor may be an independent component. In some other embodiments, the modem processor may be independent of the processor 110, and is disposed in a same device as the mobile communications module 150 or another function module.

The wireless communications module 160 may provide a wireless communication solution that is applied to the electronic device 100 and that includes a wireless local area network (WLAN) (for example, a WI-FI network), BLUETOOTH (BT), a global navigation satellite system (GNSS), frequency modulation (FM), a near-field communication (NFC) technology, and an infrared (IR) technology. The wireless communications module 160 may be one or more devices integrating at least one communications processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave through the antenna 2 for radiation.

In some embodiments, in the electronic device 100, the antenna 1 and the mobile communications module 150 are coupled, and the antenna 2 and the wireless communications module 160 are coupled, so that the electronic device 100 can communicate with a network and another device by using a wireless communications technology. The wireless communications technology may include a global system for mobile communications (GSM), a General Packet Radio Service (GPRS), code-division multiple access (CDMA), wideband CDMA (WCDMA), time-division CDMA (TD-CDMA), Long-Term Evolution (LTE), BT, a GNSS, a WLAN, NFC, FM, an IR technology, and/or the like. The GNSS may include a global positioning system (GPS), a global navigation satellite system (GLONASS), a BEIDOU navigation satellite system (BDS), a quasi-zenith satellite system (QZSS), and/or a satellite-based augmentation system (SBAS).

The electronic device 100 implements a display function by using the GPU, the display 194, the application processor, and the like. The GPU is a microprocessor for image processing, and is connected to the display 194 and the application processor. The GPU is configured to perform mathematical and geometric calculation, and perform graphics rendering. The processor 110 may include one or more GPUs that execute program instructions to generate or change display information.

The display 194 is configured to display an image, a video, and the like. The display 194 includes a display panel. The display panel may use a liquid-crystal display (LCD), an organic light-emitting diode (LED) (orOLED), an active-matrix OLED (AMOLED), a flexible LED (FLED), a mini-LED, a micro-LED, a micro-OLED, a quantum dot LED (QLED), or the like. In some embodiments, the electronic device 100 may include one or N displays 194, where N is a positive integer greater than 1.

The electronic device 100 may implement a photographing function through the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens. The photosensitive element of the camera converts an optical signal into an electrical signal, and transmits the electrical signal to the ISP for processing. The ISP converts the electrical signal into an image that is perceptible to the eye. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge-coupled device (CCD) or a complementary metal-oxide-semiconductor (CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as a red, green, and blue (RGB) format or a luma, blue projection, and red projection (YUV) format. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform on frequency energy.

The video codec is configured to compress or decompress a digital video. The electronic device 100 may support one or more video codecs. In this way, the electronic device 100 can play or record videos in a plurality of coding formats, for example, moving picture experts group (MPEG)-1, MPEG-2, MPEG-3, and MPEG-4.

The NPU is a neural-network (NN) computing processor. The NPU quickly processes input information with reference to a structure of a biological neural network, for example, a transfer mode between human brain neurons, and may further continuously perform self-learning. The electronic device 100 may implement intelligent cognition such as image recognition, facial recognition, speech recognition, and text understanding through the NPU.

The external memory interface 120 may be configured to connect to an external memory card, for example, a micro secure digital (SD) card, to extend a storage capability of the electronic device 100. The external storage card communicates with the processor 110 through the external memory interface 120, to implement a data storage function. For example, files such as music and a video are stored in the external storage card.

The internal memory 121 may be configured to store computer-executable program code, and the executable program code includes an instruction. The processor 110 runs the instructions stored in the internal memory 121, to perform various function applications of the electronic device 100 and data processing. The internal memory 121 may include a program storage area and a data storage area. The program storage area may store an operating system, an application required by at least one function (for example, a sound playing function or an image playing function), and the like. The data storage area may store data (such as audio data and an address book) created during use of the electronic device 100, and the like. In addition, the internal memory 121 may include a high-speed random-access memory (RAM), and may further include a non-volatile memory such as at least one magnetic disk storage device, a flash memory, or a universal flash storage (UFS).

The electronic device 100 may implement audio functions such as music playing and recording functions through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to code and decode an audio signal. In some embodiments, the audio module 170 may be disposed in the processor 110, or some functional modules of the audio module 170 are disposed in the processor 110.

The speaker 170A, also referred to as a "horn", is configured to convert an audio electrical signal into a sound signal. The electronic device 100 may listen to music or answer a hands-free call by using the speaker 170A.

The receiver 170B, also referred to as an "earpiece", is configured to convert an audio electrical signal to a sound signal. When a call is answered or a voice message is listened to by using the electronic device 100, the receiver 170B may be put close to a human ear to listen to a voice.

The microphone 170C, also referred to as a "mike" or a "microphone", is configured to convert a sound signal into an electrical signal. When making a call or sending a voice message, a user may make a sound near the microphone 170C by the mouth of the user, to input the sound signal to the microphone 170C. At least one microphone 170C may be disposed in the electronic device 100. In some other embodiments, two microphones 170C may be disposed in the electronic device 100, to implement a noise reduction function, in addition to collecting a sound signal. In some other embodiments, three, four, or more microphones 170C may alternatively be disposed in the electronic device 100, to collect a sound signal, implement noise reduction, and identify a sound source, to implement a directional recording function and the like.

The headset interface 170D is configured to connect to a wired headset. The headset jack 170D may be the USB interface 130, or may be a 3.5 mm open mobile terminal platform (OMTP) standard interface, or a cellular telecommunications industry association of the United States of America (USA) (or CTIA) standard interface.

The pressure sensor 180A is configured to sense a pressure signal, and may convert the pressure signal into an electrical signal. In some embodiments, the pressure sensor 180A may be disposed on the display 194. There is a plurality of types of pressure sensors 180A, for example, a resistive pressure sensor, an inductive pressure sensor, a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a change of the capacitance. When a touch operation is performed on the display 194, the electronic device 100 detects intensity of the touch operation by using the pressure sensor 180A. The electronic device 100 may calculate a touch location based on a detection signal of the pressure sensor 180A. In some embodiments, touch operations that are performed in a same touch position but have different touch operation intensity may correspond to different operation instructions. For example, when a touch operation whose touch operation strength is less than a first pressure threshold is performed on an icon of Messages, an instruction for viewing a short message service (SMS) message is executed. When a touch operation whose touch operation strength is greater than or equal to the first pressure threshold is performed on the icon of messages, an instruction for creating a new SMS message is executed.

The gyroscope sensor 180B may be configured to determine a motion posture of the electronic device 100. In some embodiments, an angular velocity of the electronic device 100 around three axes (namely, axes x, y, and z) may be determined by using the gyroscope sensor 180B. The gyroscope sensor 180B may be configured to perform image stabilization during photographing. For example, when a shutter is pressed, the gyroscope sensor 180B detects an angle at which the electronic device 100 jitters, obtains, through calculation based on the angle, a distance for which a lens module needs to compensate, and allows the lens to cancel the jitter of the electronic device 100 through reverse motion, to implement image stabilization. The gyroscope sensor 180B may be further used in a navigation scenario and a motion-sensing game scenario.

The barometric pressure sensor 180C is configured to measure barometric pressure. In some embodiments, the electronic device 100 calculates an altitude based on a barometric pressure value measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a clamshell by using the magnetic sensor 180D. Further, a feature such as automatic unlocking of the flip cover is set based on a detected opening or closing state of the leather case or a detected opening or closing state of the flip cover.

The acceleration sensor 180E may detect values of accelerations in various directions (usually on three axes) of the electronic device 100, and may detect magnitude and a direction of gravity when the electronic device 100 is still. The acceleration sensor 180E may be further configured to identify a posture of the electronic device, and is applied to an application such as switching between a landscape mode and a portrait mode or a pedometer.

The distance sensor 180F is configured to measure a distance. The electronic device 100 may measure the distance in an infrared or a laser manner. In some embodiments, in a photographing scenario, the electronic device 100 may measure a distance by using the distance sensor 180F to implement quick focusing.

The optical proximity sensor 180G may include an LED and an optical detector, for example, a photodiode. The light-emitting diode may be an infrared light-emitting diode. The electronic device 100 emits infrared light by using the light-emitting diode. The electronic device 100 detects infrared reflected light from a nearby object by using the photodiode. When detecting sufficient reflected light, the electronic device 100 may determine that there is an object near the electronic device 100. When detecting insufficient reflected light, the electronic device 100 may determine that there is no object near the electronic device 100. The electronic device 100 may detect, by using the optical proximity sensor 180G, that the user holds the electronic device 100 close to an ear to make a call, to automatically perform screen-off for power saving. The optical proximity sensor 180G may also be used in a smart cover mode or a pocket mode to automatically perform screen unlocking or locking.

The ambient light sensor 180L is configured to sense ambient light luminance. The electronic device 100 may adaptively adjust brightness of the display 194 based on the sensed ambient light brightness. The ambient light sensor 180L may be further configured to automatically adjust a white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may implement fingerprint-based unlocking, application lock access, fingerprint-based photographing, fingerprint-based call answering, and the like by using a feature of the collected fingerprint.

The temperature sensor 180J is configured to detect a temperature. In some embodiments, the electronic device 100 executes a temperature processing policy by using the temperature detected by the temperature sensor 180J. For example, when the temperature reported by the temperature sensor 180J exceeds a threshold, the electronic device 100 degrades performance of a processor near the temperature sensor 180J, to reduce power consumption for thermal protection. In some other embodiments, when the temperature is lower than another threshold, the electronic device 100 heats up the battery 142, to avoid abnormal shutdown of the electronic device 100 caused by a low temperature. In some other embodiments, when the temperature is less than still another threshold, the electronic device 100 boosts an output voltage of the battery 142, to prevent abnormal power-off caused by a low temperature.

The touch sensor 180K is also referred to as a "touch panel". The touch sensor 180K may be disposed on the display 194, and the touch sensor 180K and the display 194 constitute a touchscreen, which is also referred to as a "touch screen". The touch sensor 180K is configured to detect a touch operation acting on or near the touch sensor 180K. The touch sensor may transfer a detected touch operation to the application processor, to determine a type of a touch event. The display 194 may provide a visual output related to the touch operation. In some other embodiments, the touch sensor 180K may alternatively be disposed on a surface of the electronic device 100 at a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, and receive a blood pressure beating signal. In some embodiments, the bone conduction sensor 180M may alternatively be disposed in a headset, to obtain a bone conduction headset. The audio module 170 may obtain a voice signal through parsing based on the vibration signal that is of the vibration bone of the vocal part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a button signal input related to a user setting and function control of the electronic device 100.

The motor 191 may generate a vibration prompt. The motor 191 may be configured to provide an incoming call vibration prompt or a touch vibration feedback. For example, touch operations performed on different applications (for example, a photographing application and an audio playing application) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may alternatively be customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted in a same SIM card interface 195. The plurality of cards may be of a same type or of different types. The SIM card interface 195 may be compatible with different types of SIM cards. The SIM card interface 195 may also be compatible with an external storage card. The electronic device 100 interacts with a network by using the SIM card, to implement a call function, a data communication function, and the like. In some embodiments, the electronic device 100 uses an embedded SIM (eSIM) card. The eSIM card may be embedded in the electronic device 100, and cannot be separated from the electronic device 100.

A software system of the electronic device 100 may use a layered architecture, an event-driven architecture, a microkernel architecture, a micro service architecture, or a cloud architecture. In the embodiments of the present disclosure, an ANDROID system of a layered architecture is used as an example to illustrate a software structure of the electronic device 100.

Figure 3:
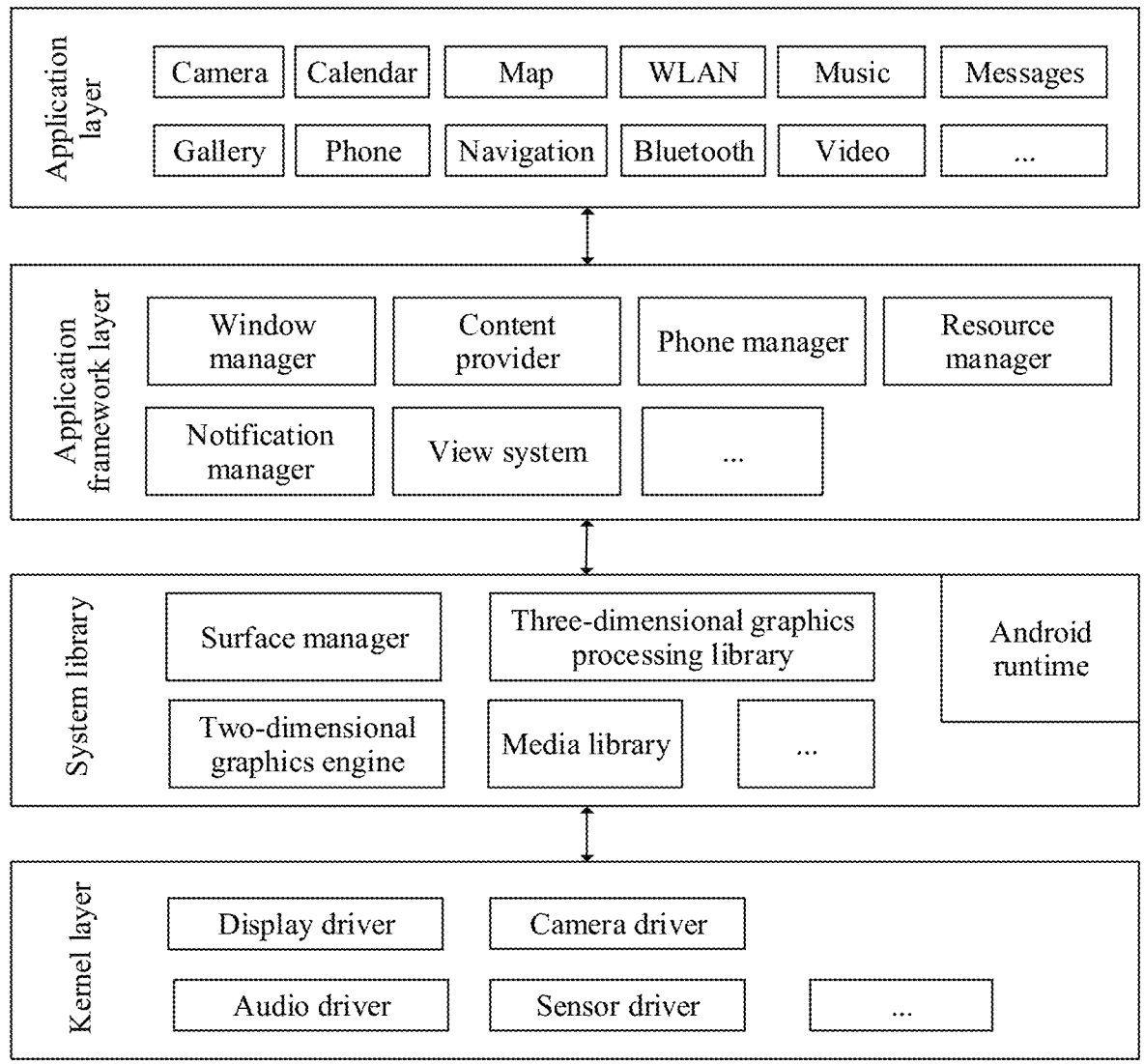
FIG. 3 is a block diagram of a software structure of an electronic device according to an embodiment of this application.

FIG. 3 is a block diagram of the software structure of the electronic device 100 according to an embodiment of this application.

In the layered architecture, software is divided into several layers, and each layer has a clear role and task. The layers communicate with each other through a software interface. In some embodiments, the ANDROID system is divided into four layers: an application layer, an application framework layer, an ANDROID runtime and system library, and a kernel layer from top to bottom.

The application layer may include a series of application packages.

As shown in FIG. 3, the application packages may include applications such as camera, gallery, calendar, phone, map, navigation, WLAN, BLUETOOTH, music, videos, and messages.

The application framework layer provides an application programming interface (API) and a programming framework for an application at the application layer. The application framework layer includes some predefined functions.

As shown in FIG. 3, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to store and obtain data, and enable the data to be accessed by an application. The data may include a video, an image, audio, calls that are made and received, a browsing history and a bookmark, an address book, and the like.

The view system includes visual controls such as a control for displaying a text and a control for displaying a picture. The view system may be configured to construct an application. A display interface may include one or more views. For example, a display interface including a notification icon of Messages may include a text display view and a picture display view.

The phone manager is configured to provide a communication function of the electronic device 100, for example, management of a call status (including answering or declining).

The resource manager provides various resources for an application, for example, a localized character string, an icon, a picture, a layout file, and a video file.

The notification manager enables an application to display notification information in a status bar, and may be configured to convey a notification message. The notification manager may automatically disappear after a short pause without requiring user interaction. For example, the notification manager is configured to notify download completion, provide a message notification, and the like. The notification manager may alternatively be a notification that appears in a top status bar of the system in a form of a graph or a scroll bar text, for example, a notification of an application running on a background or a notification that appears on the interface in a form of a dialog window. For example, text information is prompted in the status bar, a prompt tone is produced, the electronic device vibrates, or an indicator light blinks.

The ANDROID runtime includes a core library and a virtual machine. The ANDROID runtime is responsible for scheduling and management of the ANDROID system.

The kernel library includes two parts: a function that needs to be called in Java language, and a kernel library of ANDROID.

The application layer and the application framework layer run on the virtual machine. The virtual machine executes Java files of the application layer and the application framework layer as binary files. The virtual machine is configured to perform functions such as object lifecycle management, stack management, thread management, security and exception management, and garbage collection.

The system library may include a plurality of function modules, for example, a surface manager, a media library, a three-dimensional (3D) graphics processing library (for example, OPENGL for Embedded Systems (ES)), and a two-dimensional (2D) graphics engine (for example, simplest graphics library (SGL)).

The surface manager is configured to manage a display subsystem and provide fusion of 2D and 3D image layers for a plurality of applications.

The media library supports playing and recording in a plurality of commonly used audio and video formats, static image files, and the like. The media library may support a plurality of audio and video coding formats such as MPEG-4, H.264, MP3, Advanced Audio Coding (AAC), adaptive multi-rate (AMR), Joint Photographic Experts Group (JPG), and portable network graphics (PNG).

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

Figure 4:
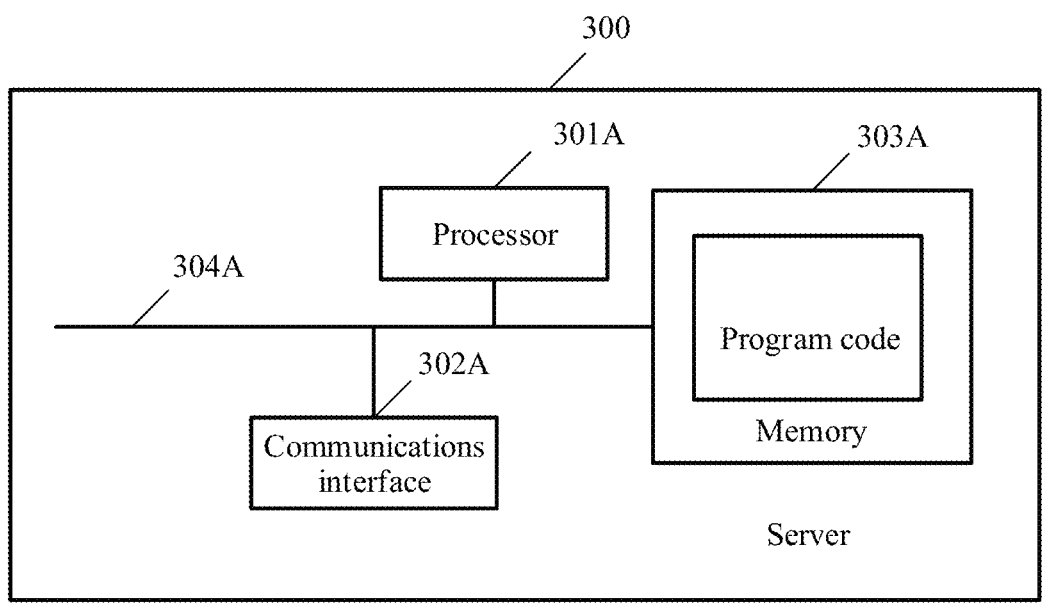
FIG. 4 is a schematic diagram of a structure of a server according to an embodiment of this application.

The following describes schematic diagrams of structures of the account server 200 and the device server 300 in the embodiments of this application. FIG. 4 is a schematic diagram of a structure of a server according to an embodiment of this application. The server is applied to a smart home system. The smart home system may be the smart home system described in FIG. 1. The server may be the account server 200 or the device server 300. As shown in FIG. 4, the server includes one or more processors 301A, a communications interface 302A, and a memory 303A. The processor 301A, the communications interface 302A, and the memory 303A may be connected through a bus or in another manner. In the embodiments of this application, an example in which the processor 301A, the communications interface 302A, and the memory 303A are connected through a bus 304 is described.

The processor 301A may include one or more general-purpose processors, for example, CPUs. The processor 301A may be configured to run program code related to a device control method.

The communications interface 302A may be a wired interface (for example, an Ethernet interface) or a wireless interface (for example, a cellular network interface or a wireless local area network interface), and is configured to communicate with another node. In the embodiments of this application, the communications interface 302A may be configured to communicate with the electronic device 100. If the server is the account server 200, the communications interface 302A may be further used by the account server 200 to communicate with the device server 300, and may be further used by the account server 200 to communicate with the electronic device 100. If the server is the device server 300, the communications interface 302A may be further used by the device server 300 to communicate with the account server 200, may be further used by the device server 300 to communicate with the smart home device 400, and may be further used by the device server 300 to communicate with the electronic device 100.

The memory 303A may include a volatile memory, for example, a RAM. The memory may further include a non-volatile memory, for example, a read-only memory (ROM), a flash memory, an hard disk drive (HDD), or a solid-state drive (SSD). Alternatively, the memory 303A may include a combination of the foregoing types of memories. The memory 303A may be configured to store a group of program code, so that the processor 301A invokes the program code stored in the memory 303A, to implement the implementation method on the server in the embodiments of this application.

It should be noted that the server shown in FIG. 4 is merely an implementation in the embodiments of this application. During actual application, the server may alternatively include more or fewer components. This is not limited herein.

In the embodiments of this application, a smart home device may also include a processor, a communications interface, a memory, and a bus. For specific descriptions of the processor, the communications interface, the memory, and the bus, refer to the server in the embodiment shown in FIG. 4. Details are not described herein. In addition, different smart home devices may include more or fewer components. For example, a smart speaker may further include a speaker and a microphone. A smart TV may further include a display. A smart light may further include a luminous filament. A smart air conditioner may further include a temperature regulation module, a humidity regulation module, and the like.

The following describes an example of a process in which a first user authorizes a second user to use a smart home device (for example, the smart speaker 401).

A speaker application (APP) corresponding to the smart speaker may be installed on the electronic device 100. The first user corresponds to the electronic device 100, and the speaker application on the electronic device 100 may be logged in by using a first account. The second user corresponds to an electronic device 500, and a speaker application on the electronic device 500 may be logged in by using a second account.

In the embodiments of this application, the process in which the first user authorizes the second user to use the smart speaker 401 may include the following process: (1) a process in which the first user performs authorization by using the electronic device 100, and (2) a process in which the second user enters an authorization code by using the electronic device 500, performs authorization verification by using the smart speaker 401, and uses the smart speaker 401. For a schematic diagram of a structure of the electronic device 500 and a block diagram of a software structure of the electronic device 500, refer to descriptions of the electronic device 100, that is, FIG. 2 and FIG. 3.

In the process in which the first user performs authorization by using the electronic device 100, in response to an operation of the first user, the electronic device 100 may request the device server 300 to generate an authorization code for one or more smart speakers (for example, the smart speaker 401). The device server 300 generates an authorization code and sends the authorization code to the smart speaker 401 and the electronic device 100. The first user may learn of the authorization code by using the electronic device 100, and notify the second user of the authorization code.

In a process in which the second user enters an authorization code by using the electronic device 500 and performs authorization verification by using the smart speaker 401, the electronic device 500 held by the second user may establish a short-distance wireless connection such as a BLUETOOTH connection, a ZIGBEE connection, or a HILINK connection to the smart speaker 401. The electronic device 500 sends, to the smart speaker 401 for verification, the authorization code entered by the second user. If the verification succeeds, the smart speaker 401 stores an account token of the second account. Because the device server 300 stores personal information corresponding to the second account, the account token of the second account stored on the smart speaker 401 may be used to request, in response to a voice signal of the second user, the device server 300 to provide a service by using the personal information corresponding to the second account. For example, in response to a voice signal "call Xiao Ming" of the second user, the smart speaker 401 may request the device server 300 to dial based on an address book corresponding to the second account.

In a management scenario in a hotel, the first user is, for example, a hotel administrator, and the second user is, for example, a guest. The hotel administrator may authorize the guest to use the smart speaker 401 in a hotel room for a period of time (for example, a rental period). In the foregoing authorization process and authorization verification process, the guest may connect the smart speaker 401 in the hotel and the electronic device 500 over WI-FI or in another short-distance wireless communication manner. Then, the guest enters a second authorization code in an application interface of a speaker application. If verification succeeds, the account token of the second account can be stored on the smart speaker 401. The smart speaker 401 may request, based on the account token of the second account, to provide a service by using the personal information corresponding to the second account. The guest neither needs to configure a network for the smart speaker 401 in an AI speaker application interface 20 on the electronic device 500, nor needs to set personal information such as an address book and a VIP account by using the AI speaker application interface, so that user operations are reduced, and the guest uses the smart speaker 401 conveniently.

In a scenario at home, the first user is, for example, a family member 1, and the second user is, for example, another family member. The family member 1 may authorize the other family member to use the smart speaker 401. The smart speaker 401 is short-distance connected to a mobile phone held by only one family member at a moment. In this case, the smart speaker 401 may respond to a voice signal made by the family member, and request the device server 300 to dial or play VIP audio based on personal information corresponding to a login account on a speaker application on the connected mobile phone. In this way, different family members may share one smart speaker, and each family member may use, on the smart speaker 401, personal information corresponding to a login account on a speaker application on an electronic device of the family member. Therefore, convenience of using the smart speaker can be improved.

The first user may perform authorization by using an application that corresponds to an artificial intelligence (AI) speaker and that is installed on the electronic device 100. The following describes an application interface of the application corresponding to the AI speaker.

Figure 5A:
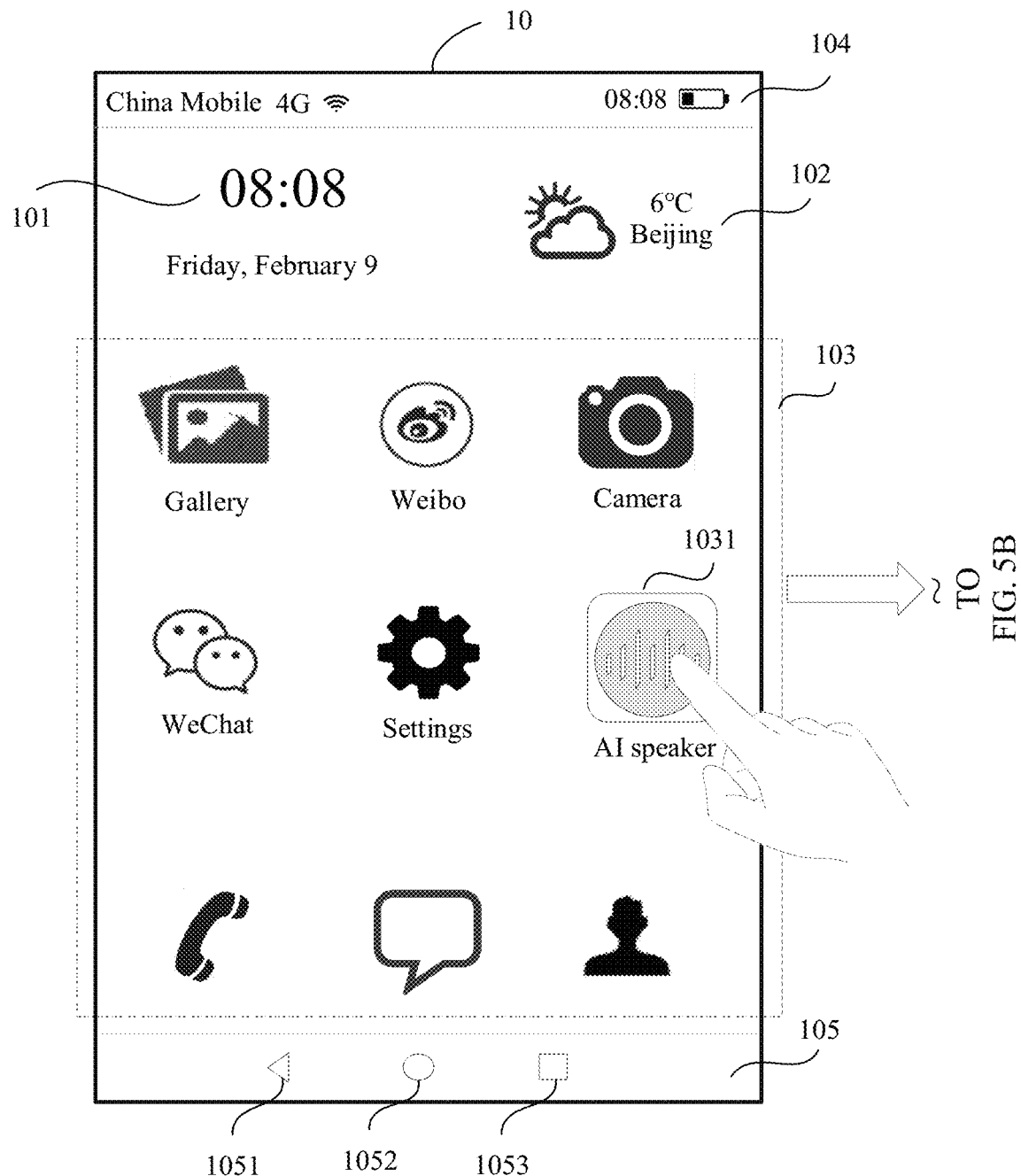
FIG. 5A and FIG. 5B are schematic diagrams of application interfaces according to an embodiment of this application.
Figure 5B:
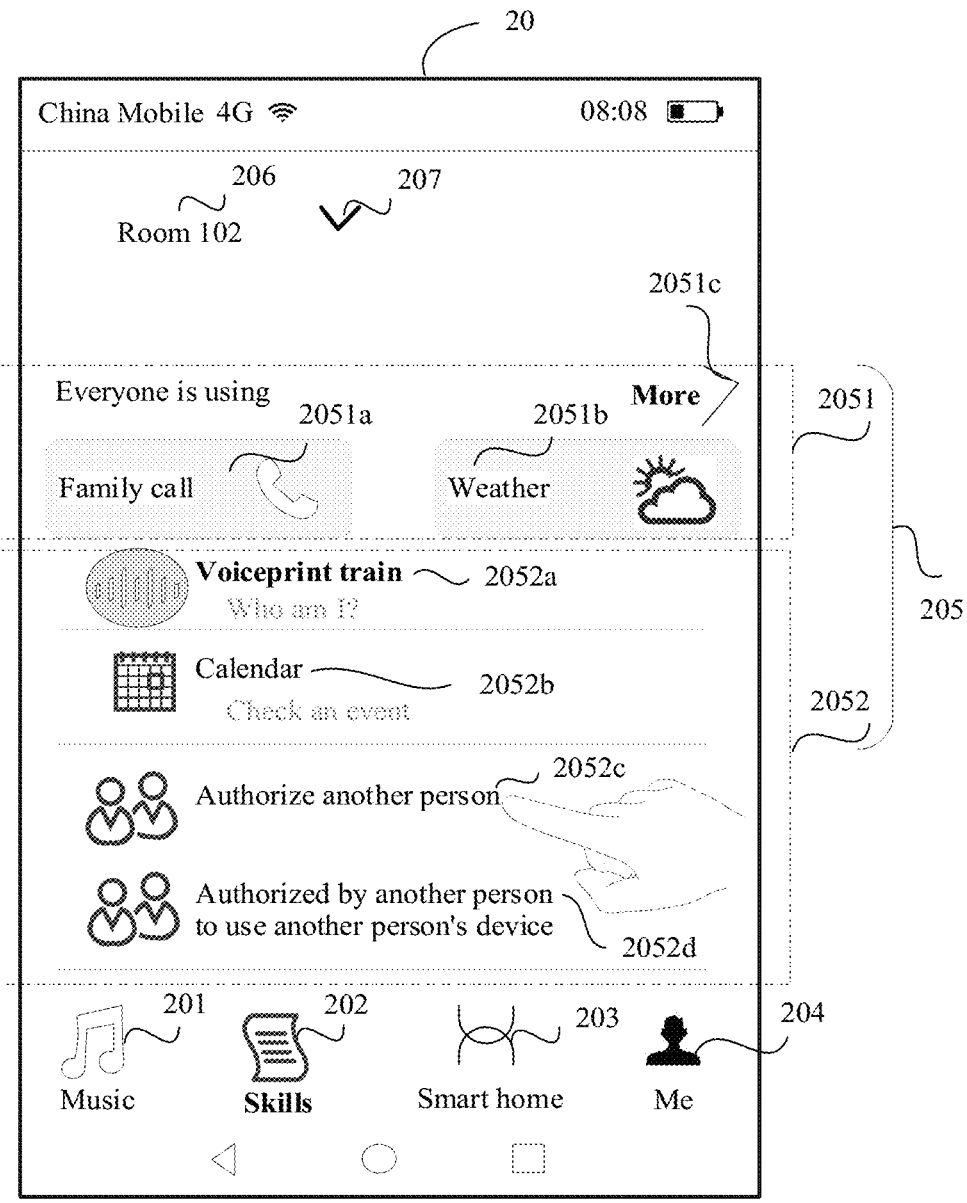

FIG. 5A and FIG. 5B are schematic diagrams of application interfaces according to an embodiment of this application. As shown in FIG. 5A, a screen of the electronic device 100 displays a home screen 10. A speaker application is installed on the electronic device 100. An application icon 1031 corresponding to the speaker application is displayed on the home screen 10, and may be displayed as an AI speaker app icon 1031. As shown in FIG. 5A, the home screen 10 includes a calendar indicator 101, a weather indicator 102, application icons 103, a status bar 104, and a navigation bar 105.

The calendar indicator 101 may be used to indicate current time, for example, a date, a day of a week, and hour and minute information.

The weather indicator 102 may be used to indicate a weather type, for example, cloudy to clear or light rain, may be used to indicate information such as a temperature, or may be used to indicate a location.

The application icons 103 may include, for example, a camera icon, a WEIBO icon, an ALIPAY icon, a WECHAT icon, a settings icon, a phone icon, a messages icon, and a contacts icon. The application icon 103 further includes the AI speaker app icon 1031.

The status bar 104 may include an operator name (for example, China Mobile), time, a WI-FI icon, signal strength, and a current battery level.

The navigation bar 105 may include system navigation buttons such as a back button 1051, a home (home screen) button 1052, and a recent apps button 1053. The home screen 10 is an interface displayed by the electronic device 100 after a user operation performed on the home button 1052 is detected in any user interface. When detecting that a user taps the back button 1051, the electronic device 100 may display a previous user interface of a current user interface. When detecting that a user taps the home button 1052, the electronic device 100 may display the home screen 10. When detecting that a user taps the recent apps button 1053, the electronic device 100 may display a task last opened by the first user. The navigation buttons may alternatively have other names. For example, 1051 may be referred to as a back button, 1052 may be referred to as a home button, and 1053 may be referred to as a menu button. This is not limited in this application. The navigation buttons in the navigation bar 105 are not limited to virtual buttons, and may alternatively be implemented as physical buttons.

As shown in FIG. 5B, in response to an operation such as a touch operation that is performed by the first user on the AI speaker app icon 1031, a screen of the electronic device displays an AI speaker application interface 20. As shown in FIG. 5B, the AI speaker application interface 20 includes menu controls (a music control 201, a skills control 202, a smart home control 203, a me control 204), a content display area 205, a speaker indicator 206, and a speaker indicator selection control 207. Content displayed in the content display area varies with the menu controls.

A currently selected menu type shown in FIG. 5B is the skills control 202. That is, the content displayed in the content display area 205 is content under a menu of the skills control 202.

A content display area corresponding to the Me control 204 may include a login account on the speaker application. The login account is, for example, 1369XXXXXXX.

The content display area 205 may display a function list. The function list includes a popular function list 2051 and another function list 2052.

The popular function list 2051 may include a plurality of function options. For example, the popular function list 2051 shown in FIG. 5B includes a family call option 2051a and a weather option 2051b. The popular function list 2051 may also include a more option 2051c.

In response to an operation of the first user, for example, a touch operation on the family call option 2051a, the family call option 2051a may set user information used to make a call on the smart speaker. The user information is, for example, a user name, a number, and a role. For example, in response to an operation such as a touch operation performed by the first user on the family call option 2051a, the electronic device 100 displays a user interface. The user interface is used to set user information.

In response to an operation of the first user, the weather option 2051b may be set information used to check weather on the smart speaker. The information used to check weather is, for example, a location and a time point of automatic weather announcement. For example, in response to an operation such as a touch operation performed by the first user on the weather option 2051b, the electronic device 100 displays a weather setting interface. The weather setting interface is used to set the information used to check weather.

The More option 2051c is used to display more popular function options in response to an operation of the first user. For example, in response to an operation such as a touch operation performed by the first user on the More option 2051c, the electronic device 100 displays a popular function interface. The popular function interface includes popular function options. The popular function options may include the family call option 2051a and the weather option 2051b, and may further include another option, such as a speaker control option.

The other function list 2052 may include a plurality of function options. For example, the other function list 2052 shown in FIG. 5B includes a voiceprint training option 2052a, a calendar option 2052b, an "authorize another person" option 2052c, and an "authorized by another person" option 2052d. It may be understood that the foregoing function options are not limited in this application, and another function option may be further included.

The voiceprint training option 2052a is used to, in response to an operation of the first user, receive a voice entered by the user, and perform voiceprint training, to distinguish between different users. The calendar option 2052b may be used to enable a calendar function in response to an operation of the first user, to remind or check a schedule.

The "authorize another person" option 2052c may be used to set that one of the smart speakers 400 may be used by another user (for example, the second user). For a specific authorization process, refer to the example described in FIG. 7.

The "authorized by another person" option 2052d may be used to perform authorization verification to use a device of another person. For a specific authorization verification process, refer to the description in FIG. 11A and FIG. 11B.

Optionally, in response to a swipe operation performed by the user on the other function list 2052, the electronic device 100 may display more function options, for example, an alarm clock option that may be used to set alarm clock information such as an alarm clock time, in response to an operation of the first user.

In this embodiment of this application, the "authorize another person" option 2052c and the "authorized by another person" option 2052d may alternatively be set in another interface of the AI speaker app. This is not limited in the embodiments of this application.

The speaker indicator 206 may be used to indicate a name of the smart speaker. For example, a name of the smart speaker shown in FIG. 5B is "room 102". The speaker indicator 206 "room 102" may correspond to a smart speaker in a room 102. The speaker indicator selection control 207 may be used to view a speaker indicator list of a smart speaker that has been configured with a network on the electronic device 100, and further used to add a new smart speaker.

Figure 6A:
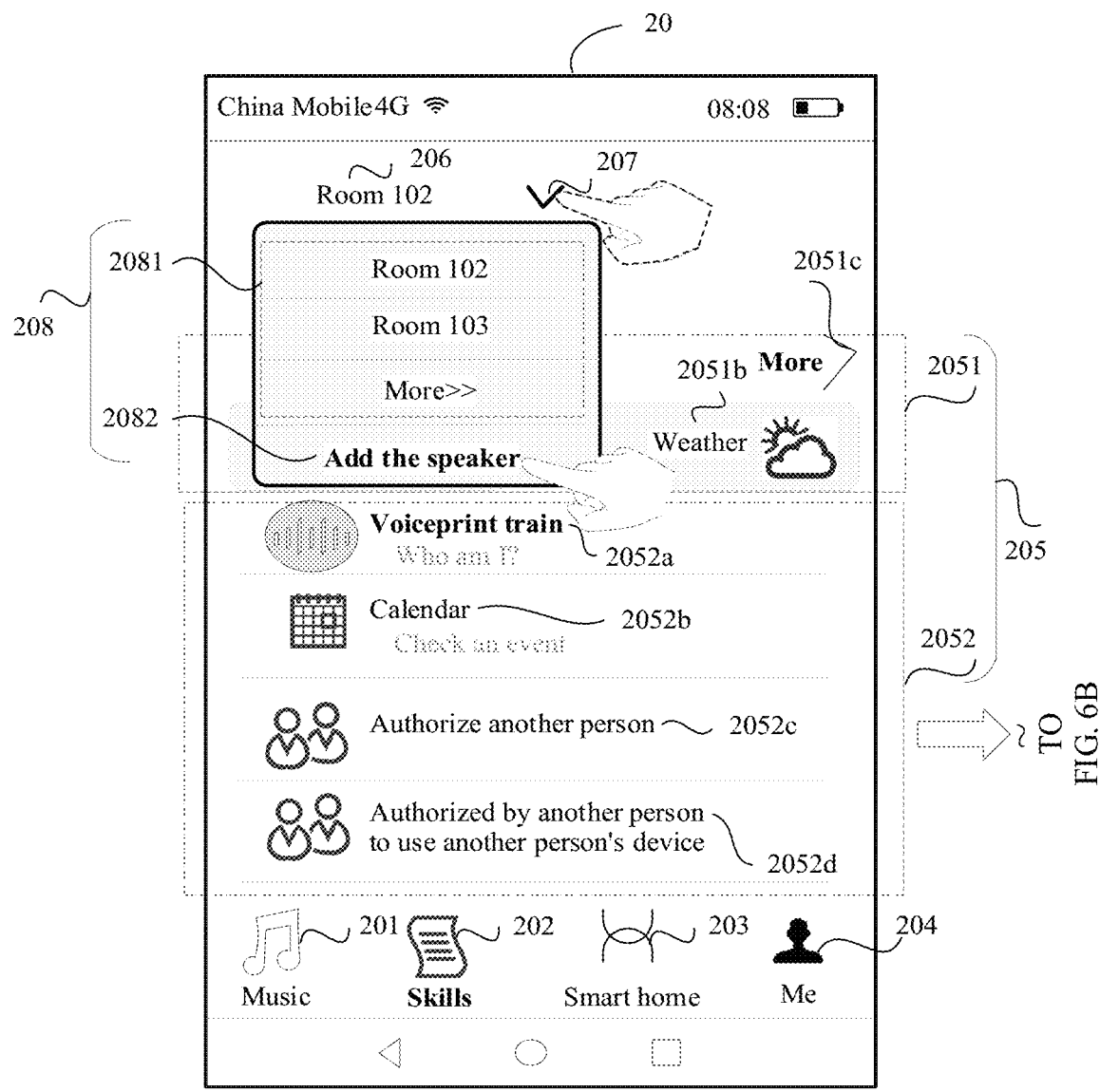
FIG. 6A, FIG. 6B, and FIG. 6C are schematic diagrams of user interfaces according to an embodiment of this application.
Figure 6B:
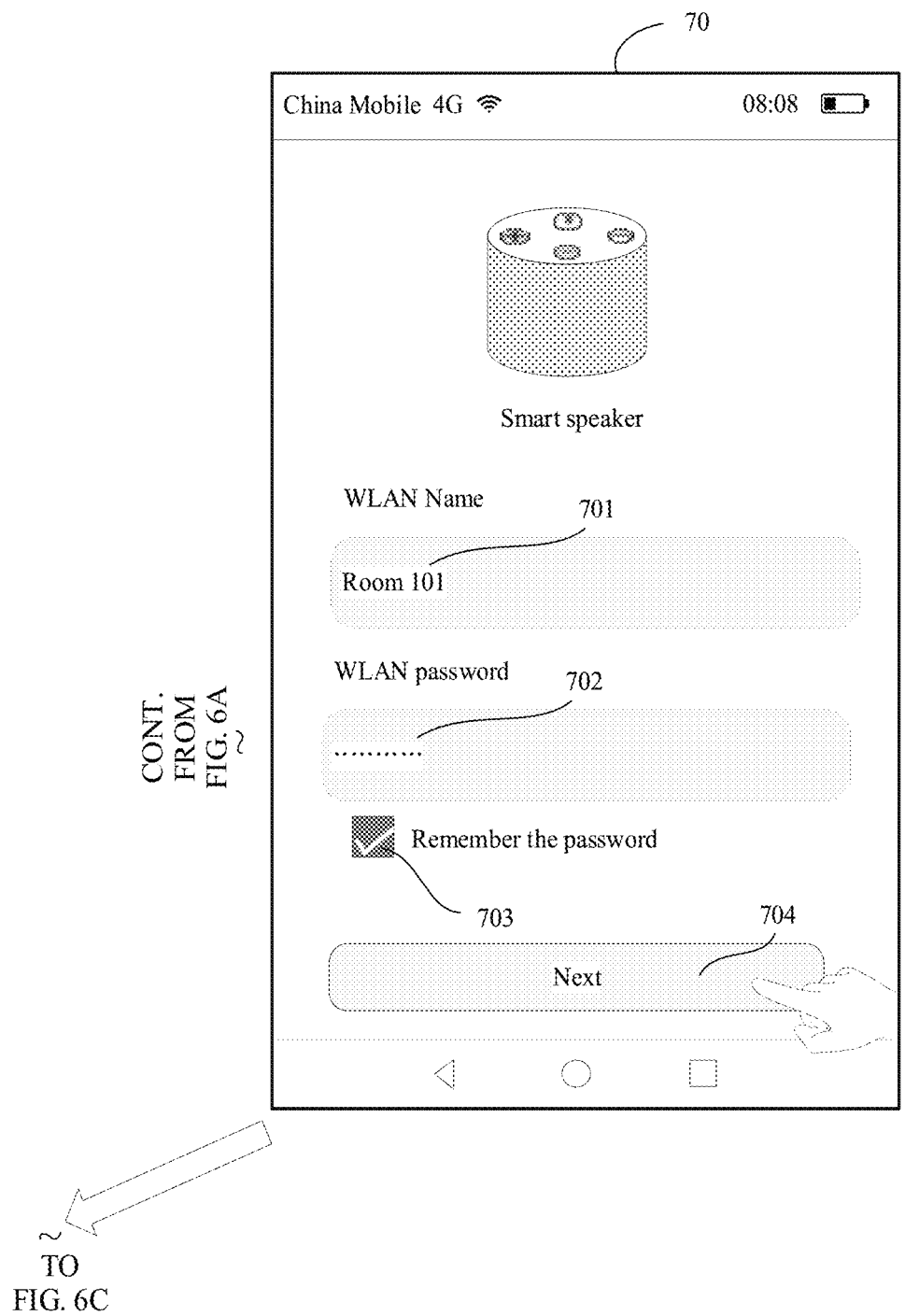
Figure 6C:
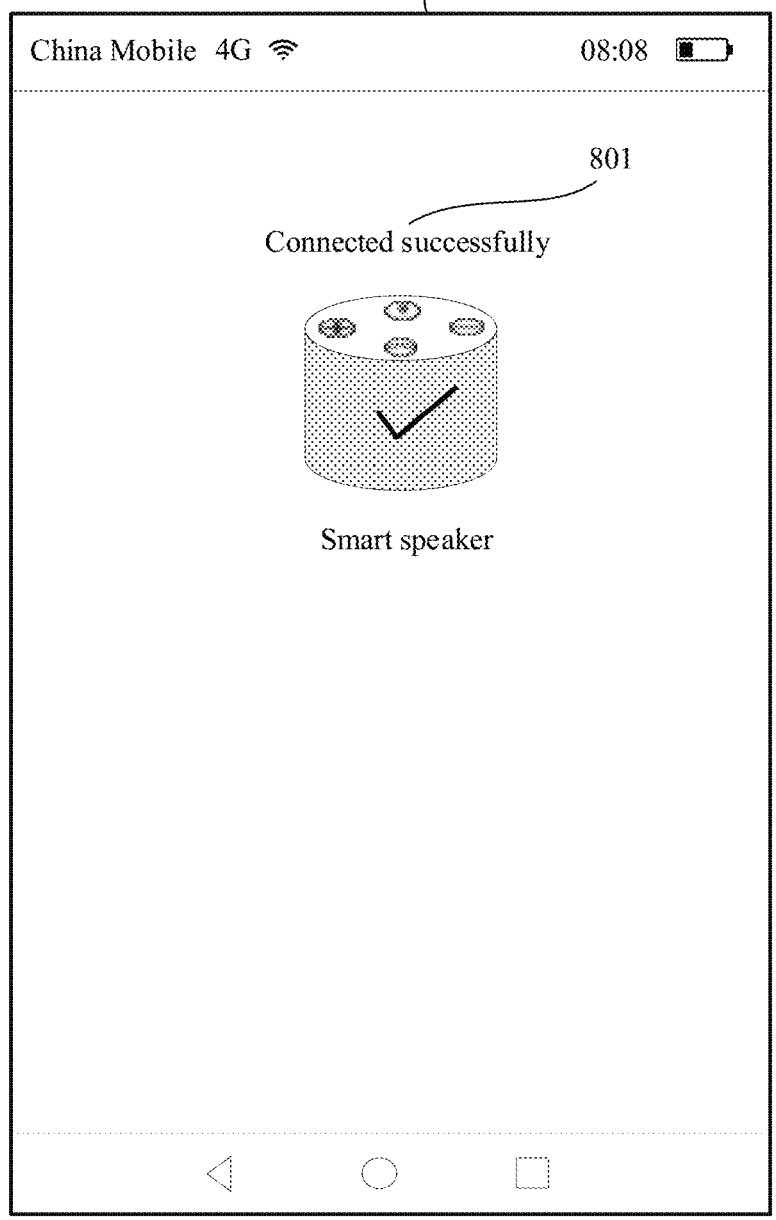

The following describes a method for configuring a network for a smart speaker 401 in a room 101 by using a speaker application on the electronic device 100. The speaker application on the electronic device 100 may be logged in by using a first account. First, the electronic device 100 is connected to a WI-FI network named "room 101". Then, the smart speaker 401 is configured on the electronic device 100 to be also connected to the WI-FI network named "room 101". For details, refer to FIG. 6A to FIG. 6C. FIG. 6A to FIG. 6C are schematic diagrams of user interfaces according to an embodiment of this application. As shown in FIG. 6A, a speaker indicator 206 may indicate a name "room 102" of a smart speaker. In response to an operation such as a touch operation performed by the first user on a speaker indicator selection control 207, the electronic device 100 displays a drop-down menu 208 on an AI speaker application interface 20. The drop-down menu 208 may include a speaker indicator list 2081 and a speaker add option 2082.

The speaker indicator list 2081 includes an indicator corresponding to a smart speaker that has established a short-distance wireless connection to the electronic device 100, for example, includes an indicator "room 102" corresponding to the smart speaker in the room 102, and an indicator "room 103" corresponding to a smart speaker in a room 103. The speaker indicator list 2081 further includes a More option used to display all speaker indicators in response to a touch operation of the first user.

The speaker add option 2082 is used to add a new smart speaker. Further, in response to an operation such as a touch operation performed by the first user on the speaker add option 2082, the electronic device 100 may scan the smart speaker 401, for example, use a BLUETOOTH scanning function to scan. Further, the electronic device 100 may scan, over BLUETOOTH, a signal broadcast by the smart speaker 401. After finding the smart speaker 401 through scanning, the electronic device 100 displays a speaker network configuration interface 70. The speaker network configuration interface 70 may include a WLAN name input box 701, a WLAN password input box 702, a remember password option 703, and a next control 704.

The first user may enter a WI-FI name "room 101" in the WLAN name input box 701 and a corresponding password in the WLAN password input box 702.

In response to an operation such as a touch operation performed by the user on the remember password option 703, the remember password option 703 is displayed in a selected state. When subsequently using the WI-FI network named "room 101", the electronic device may obtain a corresponding password without entering by the first user.

In response to an operation such as a touch operation performed by the user on the next control 704, the electronic device 100 sends network configuration information to the smart speaker 401. The network configuration information includes, for example, the WI-FI name and the corresponding password. The smart speaker 401 may be connected to the WI-FI network named "room 101" based on the foregoing distribution network information, to establish a WI-FI connection between the electronic device 100 and the smart speaker 401. As shown in FIG. 6C, after the WI-FI connection between the electronic device 100 and the smart speaker 401 is established, the electronic device 100 may display a network access success interface 80. The network access success interface 80 includes a network access success prompt 801. Then, the speaker indicator list 2081 of the drop-down menu 208 shown in FIG. 6A may include the indicator "room 101" corresponding to the smart speaker 401.

The foregoing WI-FI connection is not limited. Network configuration between the electronic device 100 and the smart speaker 401 may alternatively be performed through another short-distance wireless connection, for example, a BLUETOOTH connection, a ZIGBEE connection, or a HILINK connection. This is not limited in the embodiments of this application.

The following further describes a process in which the first user authorizes the second user to use the smart speaker. In the embodiments of this application, the AI speaker application interface 20 is used as an example to describe a process of authorizing another person to use the smart speaker. However, the authorization process is not limited to the authorization process in the AI speaker application interface 20, and may also be the authorization process in application interfaces of a plurality of types of smart home devices (for example, a smart speaker, a smart TV, and a smart air conditioner).

(1) A process in which the first user performs authorization by using the electronic device 100.

Figure 7:
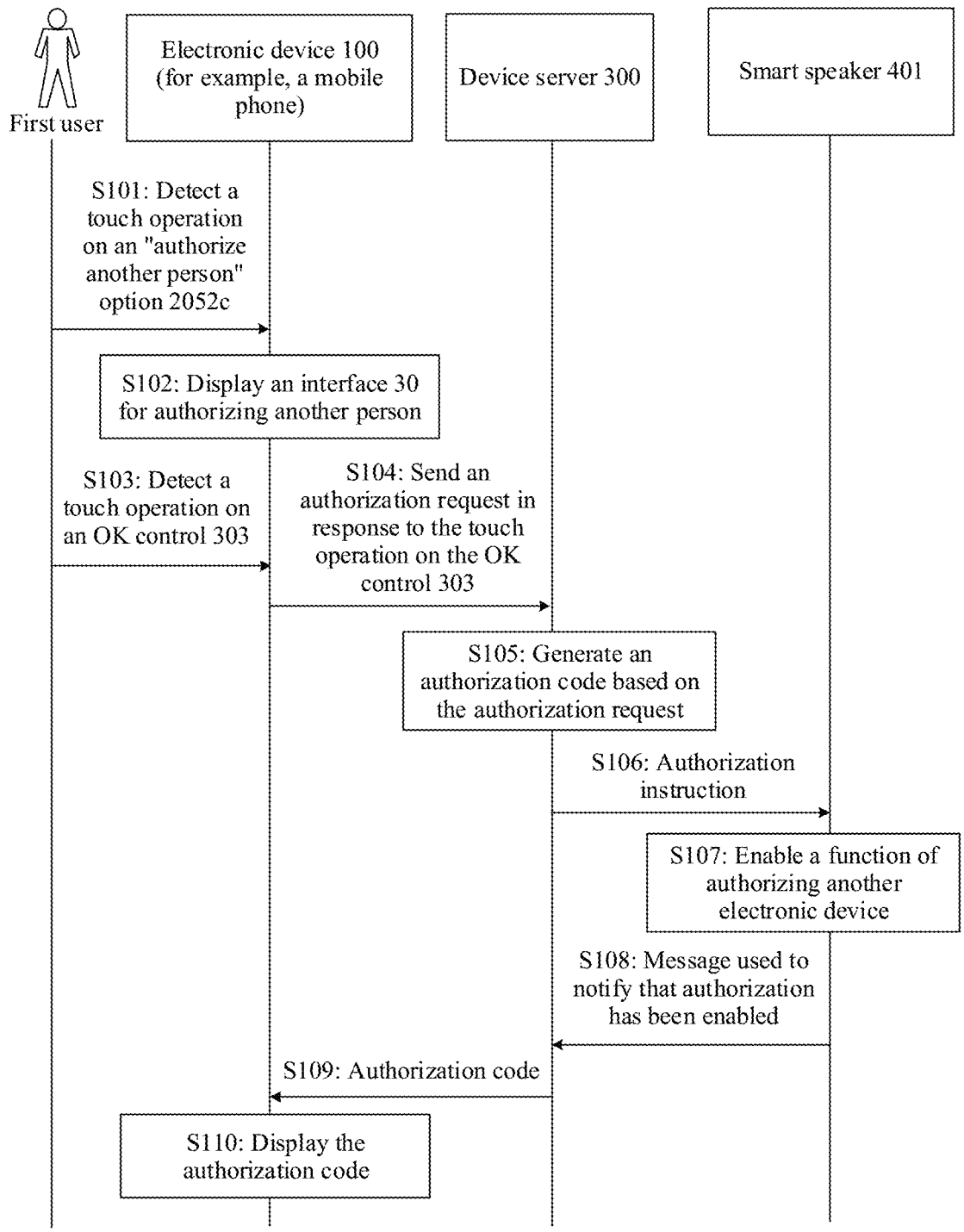
FIG. 7 is a schematic flowchart of a device control method according to an embodiment of this application.

The first user may start an authorization process by using the "authorize another person" option 2052c in the AI speaker application interface 20. FIG. 7 is a schematic flowchart of a device control method according to an embodiment of this application. As shown in FIG. 7, the device control method includes steps S101 to S110.

S101: The electronic device 100 detects a touch operation on the "authorize another person" option 2052c.

S102: In response to the touch operation performed by the second user on the "authorize another person" option 2052c, the electronic device 100 displays an interface 30 for authorizing another person.

Figure 8A:
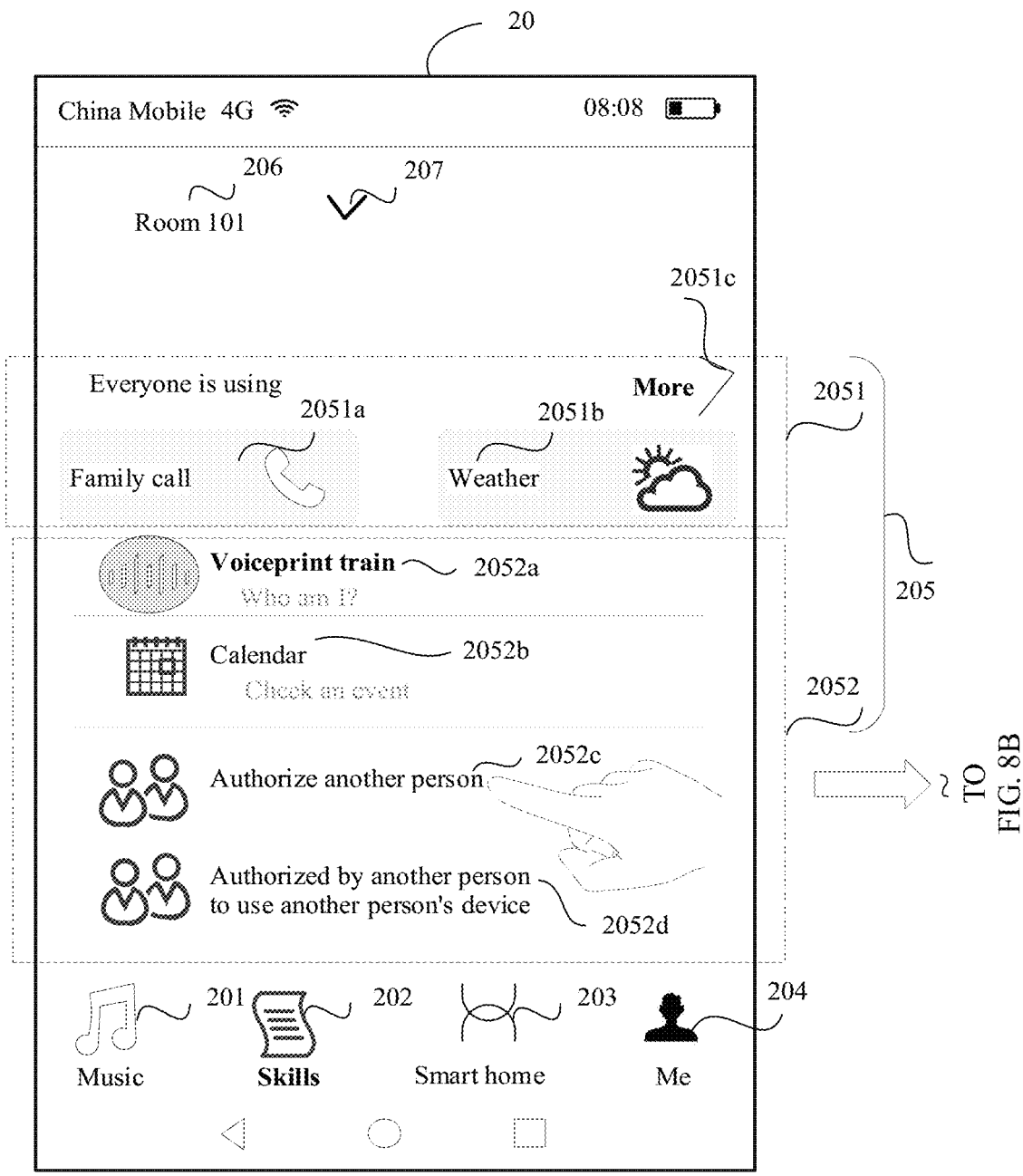
FIG. 8A and FIG. 8B are schematic diagrams of user interfaces according to an embodiment of this application.
Figure 8B:
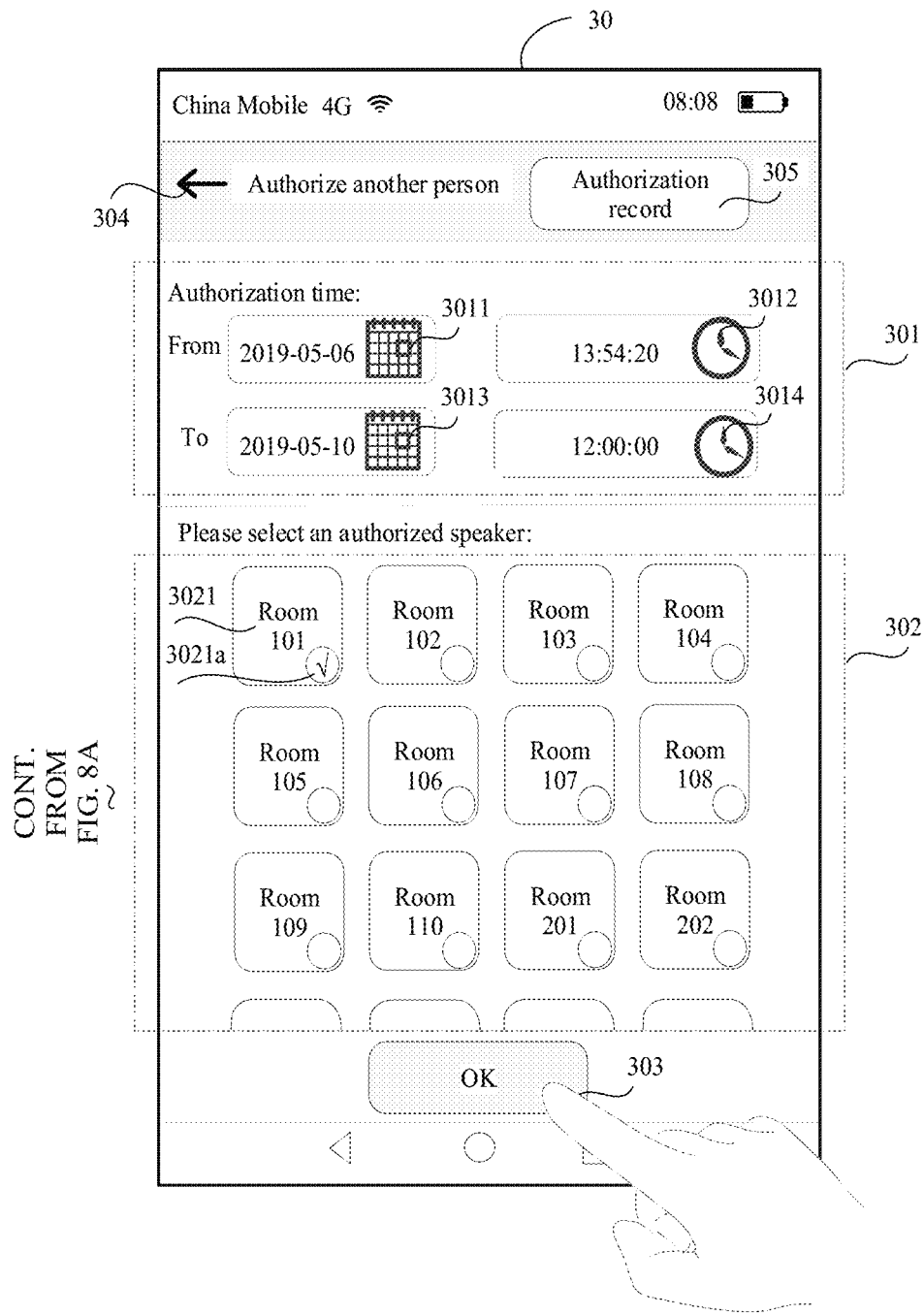

For example, FIG. 8A and FIG. 8B are schematic diagrams of user interfaces according to an embodiment of this application. As shown in FIG. 8A and FIG. 8B, in response to an operation such as a touch operation performed by the first user on the "authorize another person" option 2052c, the electronic device 100 displays the interface 30 for authorizing another person. The interface 30 for authorizing another person may include an authorization time setting area 301, an authorization device selection area 302, an OK control 303, a return control 304, and an authorization record control 305.

The authorization time setting area 301 may include a start date setting box 3011, a start moment setting box 3012, an end date setting box 3013, and an end moment setting box 3014.

In a possible implementation, in response to an operation such as a touch operation performed by the first user on the start date setting box 3011, the electronic device 100 may display a date tapping selection area, and the date tapping selection area may receive a tapping selection operation performed by the first user to set a start date. For example, the start date is set to May 6, 2019. In response to the tapping selection operation performed by the first user on the date tapping selection area, 2019-05-06 may be displayed in the start date setting box 3011. In response to an operation such as a touch operation performed by the first user on the start moment setting box 3012, the electronic device 100 may display a moment tapping selection area, and the moment tapping selection area may receive a tapping selection operation performed by the first user to set a start moment. For example, the start moment is set to 13:54:20 (Beijing time). In response to the tapping selection operation by the first user on the moment tapping selection area, 13:54:20 may be displayed in the start moment setting box 3012. After the start time is set, authorization start time is 13:54:20 on May 6, 2019 (Beijing time).

Similarly, the end date setting box 3013 and the end moment setting box 3014 may be described by analogy to the descriptions of the start date setting box 3011 and the start moment setting box 3012. For example, authorization end time may be set to 12:00:00 on May 10, 2019 (Beijing time) by using the end date setting box 3013 and the end moment setting box 3014.

It may be understood that a specific design of the authorization time setting area 301 is not limited in this embodiment of this application, and there may be another design. For example, a start date and a start moment may be set by using a same setting box.

The authorization device selection area 302 may include an indicator corresponding to each smart speaker setting area. For example, in the example shown in FIG. 1, the speaker 401 is placed in the room 101, and the authorization device selection area 302 includes an indicator 3021 corresponding to the room 101 in which the speaker 401 is placed. The indicator 3021 may include an option 3021a. The first user may select, by using the option 3021a, the indicator 3021 corresponding to the room 101, to select to authorize another person to use the speaker 401 placed in the room 101. Then, the option 3021a is displayed in a selected state. That is, the indicator 3021 of the speaker 401 is in a selected state.

For an indicator corresponding to another room in the authorization device selection area 302, refer to the description of the indicator 3021. Details are not described herein again.

The return control 304 is used to return to an upper-level interface of the interface 30 for authorizing another person. In response to a touch operation performed by the first user on the return control 304, the electronic device 100 displays the AI speaker application interface 20.

The authorization record control 305 is used to display a historical record for authorizing another person. In response to a touch operation performed by the first user on the authorization record control 305, the electronic device 100 may display a historical authorization record. For details, refer to the example described in FIG. 10A and FIG. 10B.

For example, refer to the description of FIG. 8B. The first user sets, in the authorization time setting area 301, the authorization start time to 13:54:20 on May 6, 2019 (Beijing time). The first user sets the authorization end time to 12:00:00 on May 10, 2019 (Beijing time). As shown in FIG. 8B, 2019-05-06 may be displayed in the start date setting box 3011, and 13:54:20 may be displayed in the start moment setting box 3012. 2019-0 5-10 may be displayed in the end date setting box 3013, and 12:00:00 may be displayed in the end moment setting box 3014.

If the first user has tapped and selected the option 3021a in the authorization device selection area 302, the option 3021a is displayed in a selected state.

After the first user sets the authorization time in the authorization time setting area 301, and selects the option 3021a in the authorization device selection area 302, the first user may tap the OK control 303, so that step S102 is performed.

Optionally, the electronic device 100 may detect a swipe operation on the authorization device selection area 302, and in response to the swipe operation, the electronic device 100 may display indicators corresponding to more smart speaker setting areas.

S103: The electronic device 100 detects a touch operation on the OK control 303.

S104: In response to the touch operation on the OK control 303, the electronic device 100 sends an authorization request to the device server 300.

In a possible implementation, the electronic device 100 may store identity information (for example, a device identifier) of the smart speaker 401, and the identity information may one-to-one correspond to the smart speakers 401. The authorization request may carry the identity information. The device server 300 may find the smart speaker 401 based on the identity information, to perform step S106.

S105: The device server 300 generates an authorization code according to the authorization request.

In a possible implementation, the device server 300 may generate an authorization code, and the authorization code may be a random number. In other words, there is no relationship between different authorization codes generated sequentially in time. For example, the authorization code is generated by using a random number generator. A quantity of characters of the authorization code may be constant, for example, may be seven.

The authorization code generated by the device server 300 may be a first authorization code.

S106: The device server 300 sends an authorization instruction to the smart speaker 401.

The authorization instruction may include the authorization code. The smart speaker 401 may further obtain the authorization time from the electronic device 100, and the authorization time may include the authorization start time 2019-05-06 13:54:20 and the authorization end time 2019-05-10 12:00:00. For example, the authorization time may be carried in the authorization request sent to the device server 300, and the authorization time is sent by the device server 300 to the smart speaker 401. Optionally, the device server 300 may use the authorization instruction to carry the authorization code and the authorization time, and send the authorization instruction to the smart speaker 401.

The smart speaker 401 may store the authorization code between the authorization start time and the authorization end time, and after the authorization end time, the device server 300 deletes the authorization code. For example, the authorization start time is 13:54:20 on May 6, 2019 (Beijing time), the authorization end time is 12:00:00 on May 10, 2019 (Beijing time), and the authorization code is 1003585. The smart speaker 401 may store the authorization code between 13:54:20 on May 6, 2019 (Beijing time) and 12:00:00 on May 10, 2019 (Beijing time), and delete the authorization code after 12:00:00 on May 10, 2019.

S107: The smart speaker 401 enables a function of authorizing another electronic device.

After enabling the function, the smart speaker 401 may store the first authorization code, and may receive an authorization code (namely, a second authorization code) from another electronic device (for example, the electronic device 500). The smart speaker 401 determines, through comparison, whether the local authorization code (namely, the first authorization code) is the same as the second authorization code. For details, refer to the description of the example shown in FIG. 11A and FIG. 11B. The authorization code from the device server 300 is the first authorization code.

S108: The smart speaker 401 sends, to the device server 300, a message used to notify that authorization has been enabled.

S109: The device server 300 sends the authorization code to the electronic device 100.

Step S108 is performed only after the device server 300 receives, by using step S107, the message used to notify that authorization has been enabled. If the device server 300 does not receive, within specified duration (for example, 60 seconds) after S105 is performed, the message used to notify that authorization has been enabled, the device server may perform steps S105 to S110 again. Alternatively, if the message used to notify that authorization has been enabled is not received within the specified duration, a message used to indicate an authorization exception is sent to the electronic device 100, so that the electronic device 100 displays the message used to indicate an exception.

S110: The electronic device 100 displays the authorization code.

Figure 9:
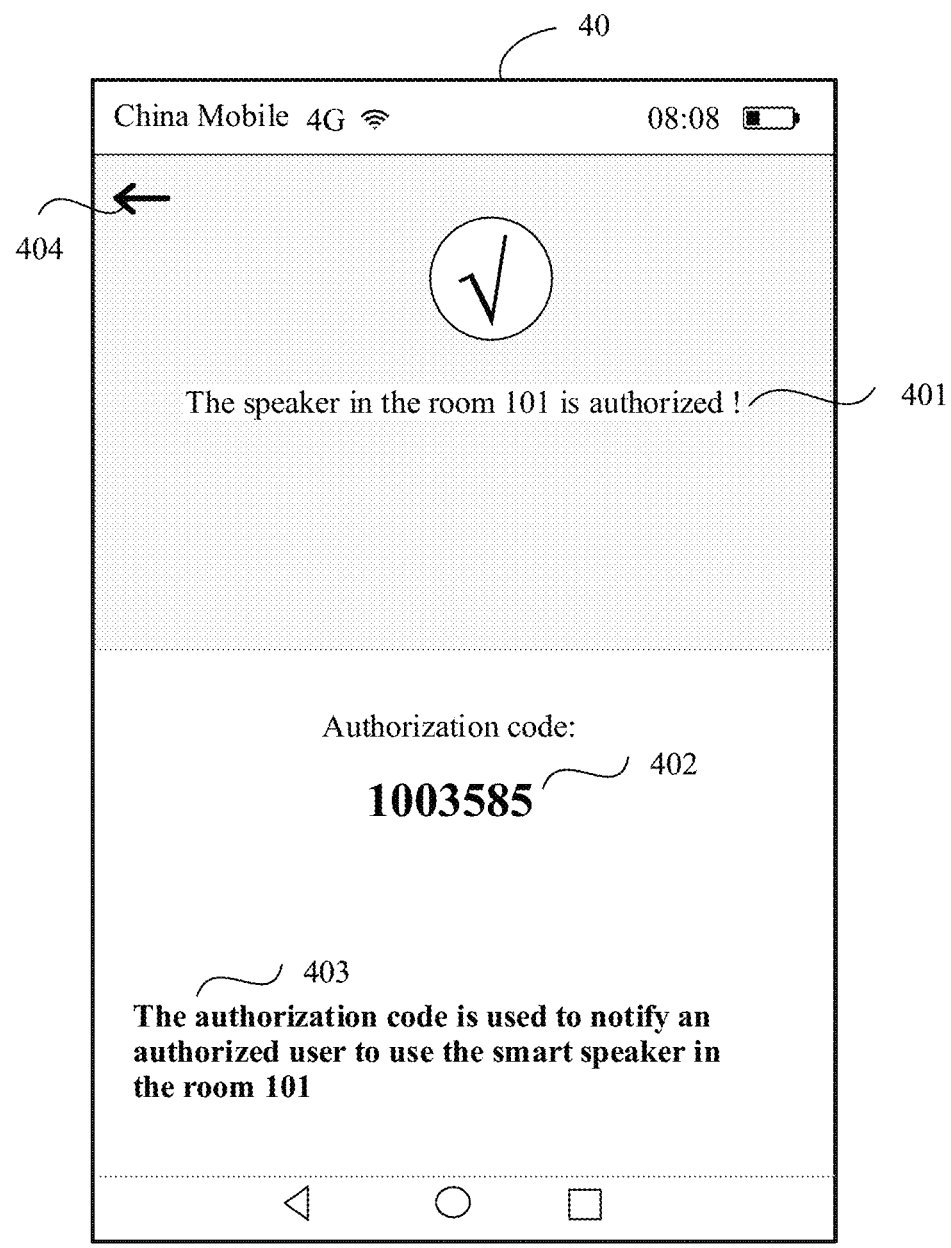
FIG. 9 is a schematic diagram of a user interface according to an embodiment of this application.

For example, FIG. 9 is a schematic diagram of a user interface according to an embodiment of this application. After receiving the authorization code, the electronic device 100 may display an authorization success interface 40 in an AI speaker application interface. As shown in FIG. 9, the authorization success interface 40 may include an authorization success prompt 401, an authorization code prompt 402, an authorization code function prompt 403, and a return control 404.

The authorization success prompt 401 may prompt: A speaker in a room 101 is authorized!

The authorization code prompt 402 is used to prompt the received authorization code, where the authorization code is the same as the authorization code stored on the smart speaker 401. For example, as shown in FIG. 9, the authorization code prompt 402 prompts 1003585.

The authorization code function prompt 403 may prompt that the authorization code is used to notify an authorized user to use the smart speaker in the room 101.

The return control 404 is used to return to an upper-level interface. For example, in response to an operation such as a touch operation on the return control 404, the electronic device 100 may display the AI speaker application interface 20.

Figure 10A:
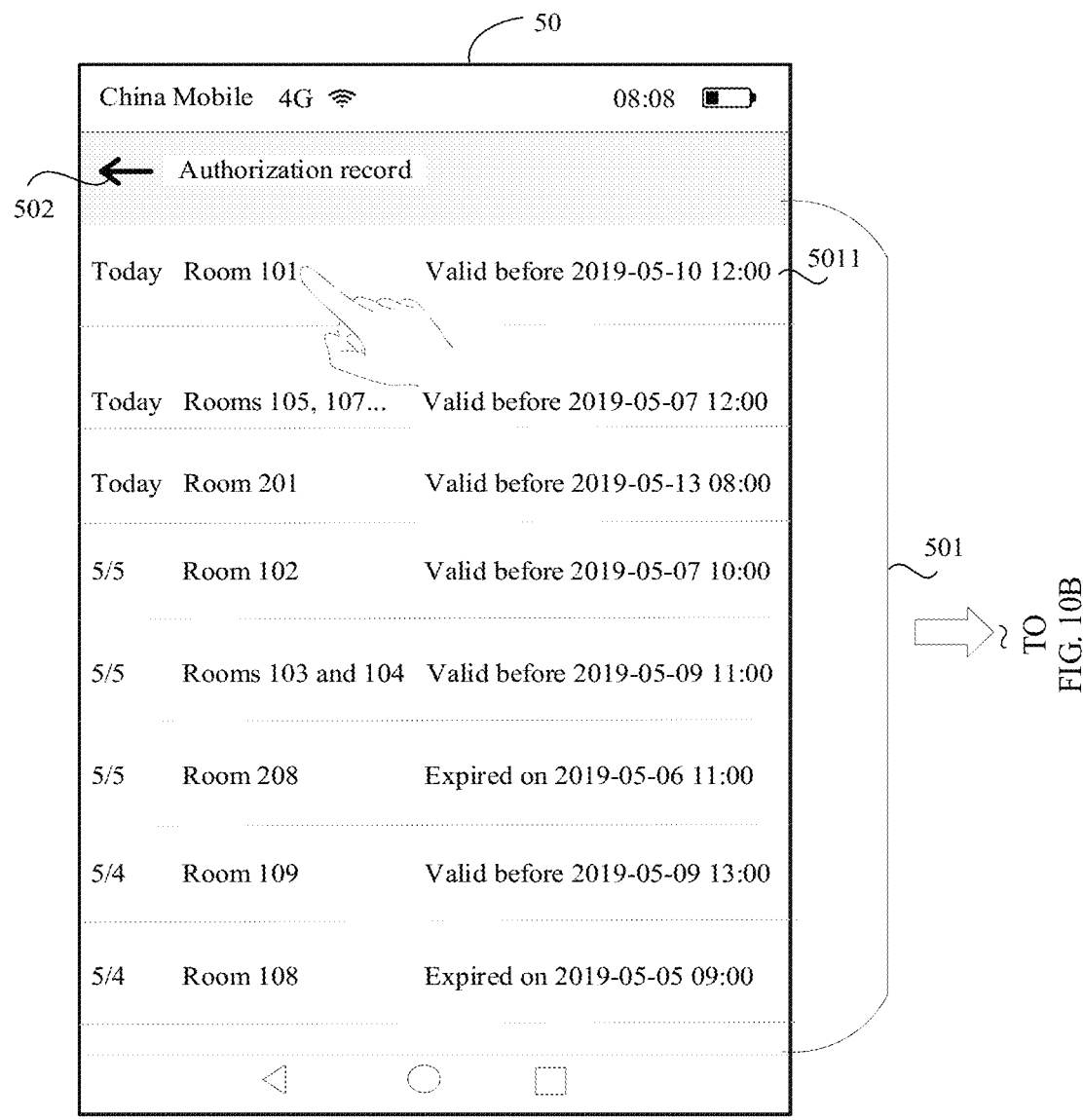
FIG. 10A and FIG. 10B are schematic diagrams of user interfaces according to an embodiment of this application.
Figure 10B:
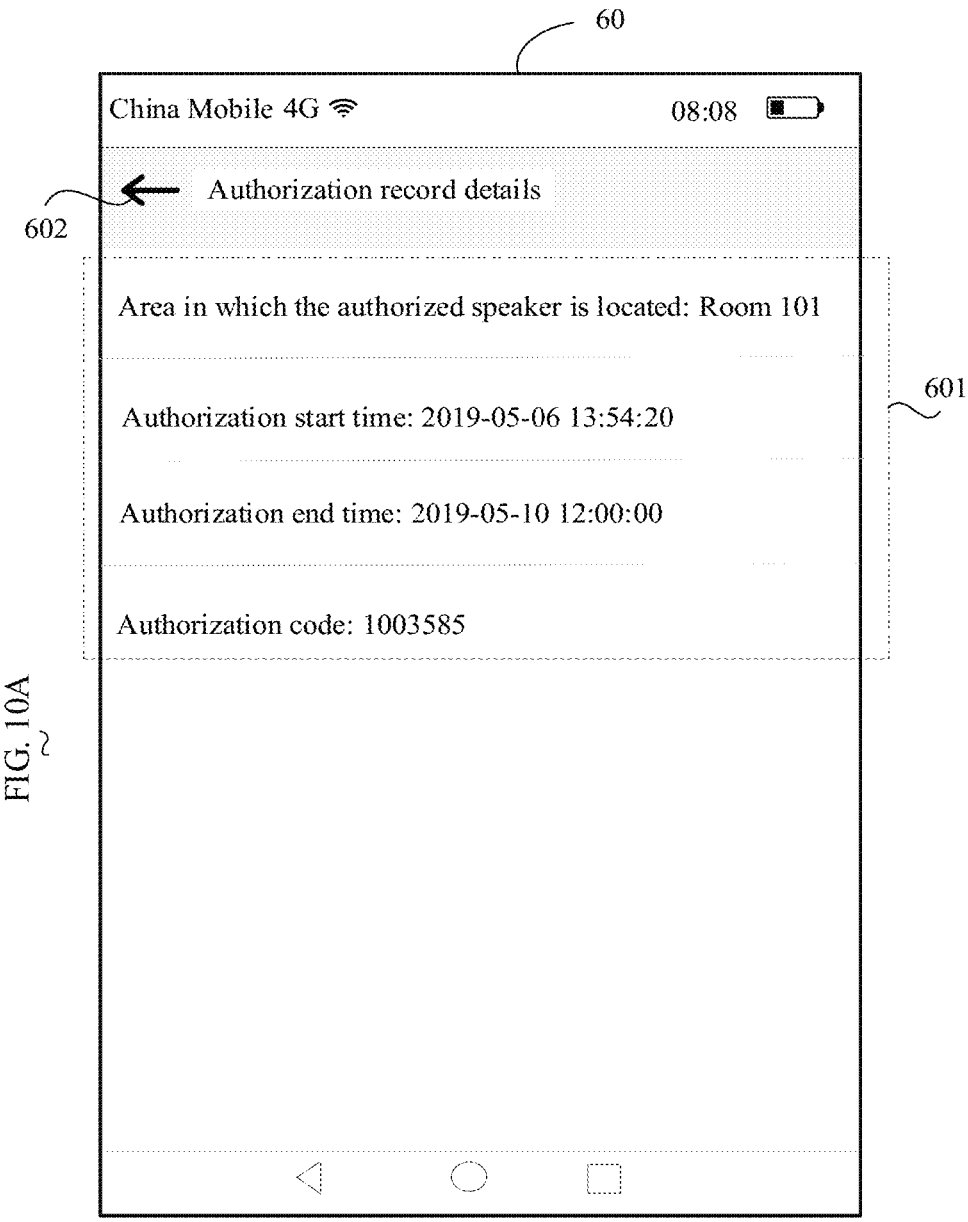

After step S109 is performed, the first user may touch the authorization record control 305 in the interface 30 for authorizing another person to view a historical record of authorizing another person corresponding to steps S101 to S110. For details, refer to FIG. 10A and FIG. 10B. FIG. 10A and FIG. 10B are schematic diagrams of user interfaces according to an embodiment of this application. As shown in FIG. 8A, FIG. 8B, and FIG. 10A, in response to an operation such as a touch operation performed by the first user on the authorization record control 305, the electronic device 100 may display an authorization record interface 50. The authorization record interface 50 may include an authorization record entry 501 and a return control 502. The return control 502 is used to return to an upper-level interface of the authorization record interface 50. In response to an operation such as a touch operation performed by the first user on the return control 502, the electronic device 100 displays the interface 30 for authorizing another person.

The authorization record entry 501 may include a plurality of authorization records. For example, the authorization record entry 501 includes an authorization record 5011. The authorization record 5011 may indicate a historical record of authorizing another person corresponding to steps S101 to S110. The authorization record 5011 may include that the authorization time is today (2019-05-10), the authorization device setting area is the room 101, and the authorization end time is 12:00 on May 10, 2019.

For example, content included in the authorization record is merely used to explain in this embodiment of this application, and should not constitute a limitation.

In a possible implementation, the first user may view detailed information about the authorization record by touching the authorization record, for example, authorization start time, authorization end time, and an authorization code. For example, as shown in FIG. 10A and FIG. 10B, in response to an operation such as a touch operation performed by the first user on the authorization record 5011, the electronic device 100 may display an authorization record details interface 60. The authorization record details interface 60 may include detailed information 601 corresponding to the authorization record 5011 and a return control 602.

The return control 602 is used to return to an upper-level interface of the authorization record details interface 60. In response to an operation such as a touch operation performed by the first user on the return control 602, the electronic device 100 may display the authorization record interface 50.

If the user forgets the authorization record, the user may view authorization record details by using the authorization record details interface 60.

The detailed information 601 may include the following information:

Area in which the authorized speaker is located: Room 101

Authorization start time: 2019-05-06 13:54:20

Authorization end time: 2019-05-10 12:00:00

Authorization code: 1003585

(2) A process in which the second user enters an authorization code by using the electronic device 500, performs authorization verification by using the smart speaker 401, and uses the smart speaker 401.

Figure 11A:
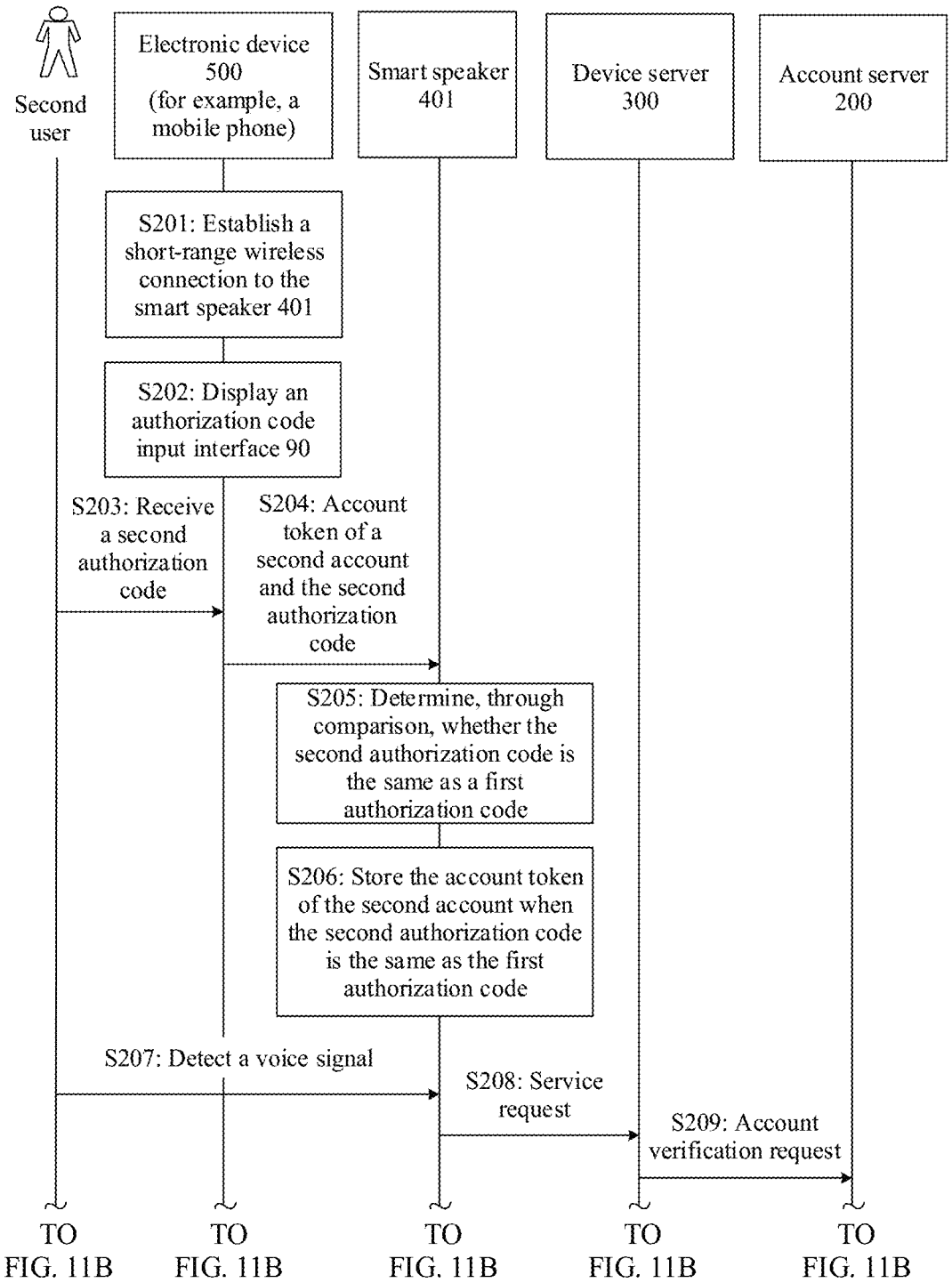
FIG. 11A and FIG. 11B are a schematic flowchart of a device control method according to an embodiment of this application.
Figure 11B:
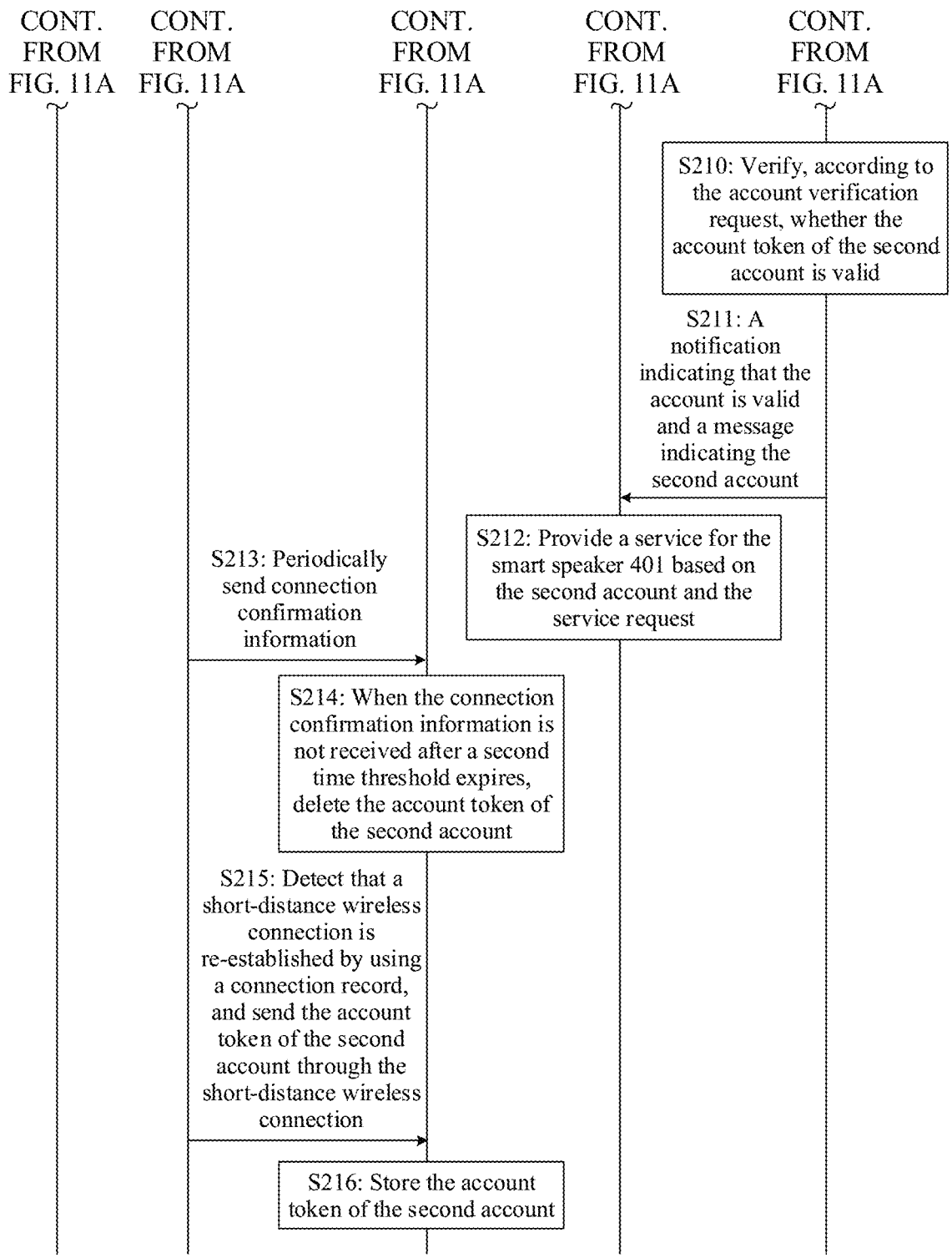

After learning of the authorization code by using the electronic device 100, the first user may notify the second user of the authorization code. The second user may enter an authorization code by using the electronic device 500, to complete authorization. For details, refer to FIG. 11A and FIG. 11B. FIG. 11A and FIG. 11B are a schematic flowchart of a device control method according to an embodiment of this application. As shown in FIG. 11A and FIG. 11B, the method includes steps S201 to S212.

An AI speaker app may be installed on the electronic device 500, and the speaker application on the electronic device 500 may be logged in by using a second account. The device server 300 stores personal information corresponding to the second account. The personal information corresponding to the second account may be set by the user in an AI speaker application interface 20. A smart speaker in the second user's home may store an account token of the second account. The account token of the second account may be used by the smart speaker in the second user's home to request the device server 300 to provide a service by using the personal information corresponding to the second account, for example, to provide a dialing service for the smart speaker. By using the following steps, the second user may request, on the smart speaker 401 in the hotel based on the account token of the second account, the device server 300 to provide a service by using personal information of the second account, for example, a voice dialing service.

After the second user enters the room 101 with the electronic device 500, a short-distance wireless connection between the electronic device 500 and the smart speaker 401 may be established.

S201: In response to an operation of the second user, the electronic device 500 establishes a short-distance wireless connection to the smart speaker 401.

The following describes a process of establishing a connection between the electronic device 500 and the smart speaker by using an example in which the short-distance wireless connection is a WI-FI connection. The smart speaker 401 is connected to the WI-FI network named "room 101". After entering the room 101, the user may connect the electronic device 500 to the WI-FI network named "room 101", to establish the WI-FI connection between the electronic device 500 and the smart speaker 401. For a process of connecting the electronic device 500 to the WI-FI network named "room 101", refer to descriptions in FIG. 13C and FIG. 13D. After the electronic device 500 establishes the WI-FI connection to the smart speaker 401, the electronic device 500 may perform step S202.

S202: The electronic device 500 displays an authorization code input interface 90.

In this embodiment of this application, when detecting that the WI-FI connection to the smart speaker 401 is established, the electronic device 500 may display the authorization code input interface 90. For example, after running the AI speaker application, the electronic device 500 detects that the electronic device 500 has established the WI-FI connection to the smart speaker 401, and displays the authorization code input interface 90.

The authorization code input interface 90 may further be displayed in response to a touch operation performed by the second user on an "authorized by another person" option 2052d in the AI speaker application interface 20. For the "authorized by another person" option 2052d, refer to the example described in FIG. 5B.

Figure 12:
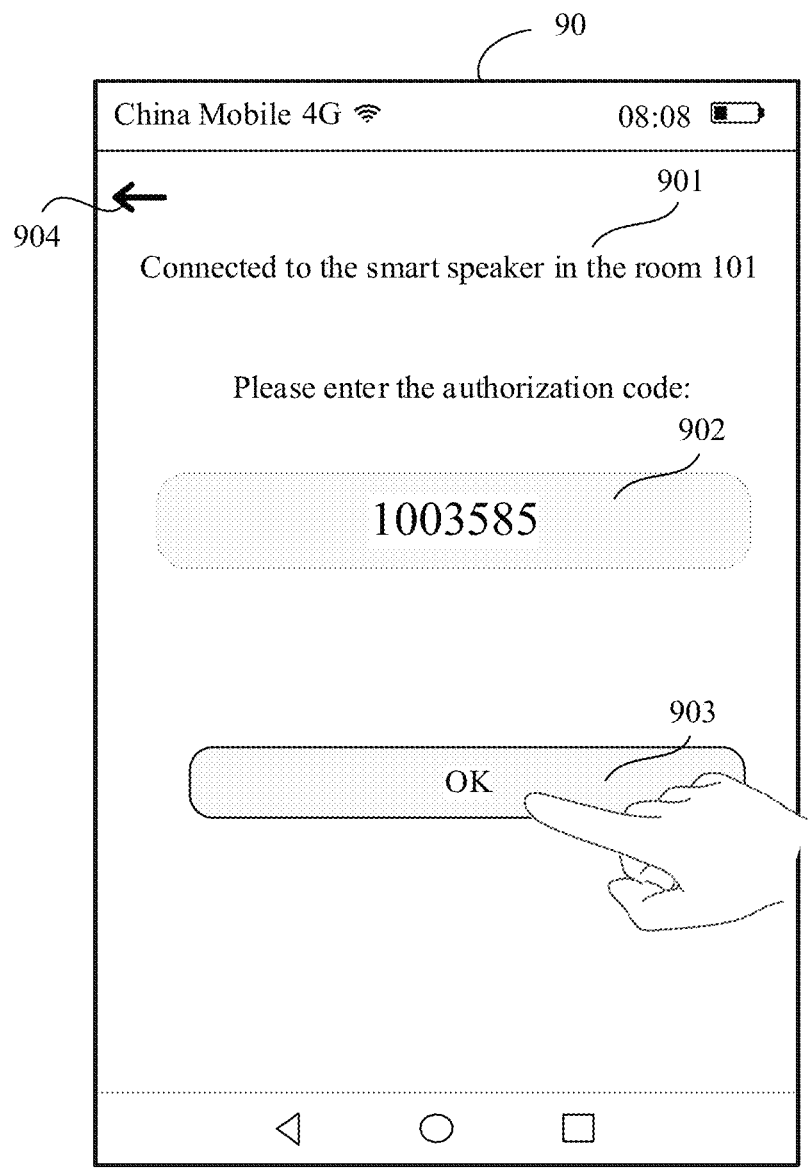
FIG. 12 is a schematic diagram of a user interface according to an embodiment of this application.

FIG. 12 is a schematic diagram of a user interface according to an embodiment of this application. As shown in FIG. 12, the authorization code input interface 90 may include a speaker connected prompt 901, an authorization code input box 902, an OK control 903, and a return control 904.

The speaker connected prompt 901 is used to prompt that a connection to the smart speaker 401 is currently established, and may prompt that "the smart speaker in the room 101 is connected".

The authorization code input box 902 is used to input and display an authorization code in response to an operation of the second user.

The OK control 903 is used to submit the authorization code entered in the authorization code input box 902 to the electronic device 500.

S203: The electronic device 500 receives a second authorization code entered by the second user.

For example, as shown in FIG. 12, if the second user enters "1003585" in the authorization code input box 902, the authorization code input box 902 displays "1003585". In response to a touch operation performed by the user on the OK control 903, step S203 is performed. The electronic device 500 uses "1003585" as the authorization code entered by the second user.

The return control 904 is used to return to an upper-level interface of the authorization code input interface 90. In response to a touch operation performed by the first user on the return control 904, the electronic device 100 displays the AI speaker application interface 20.

Figure 13A:
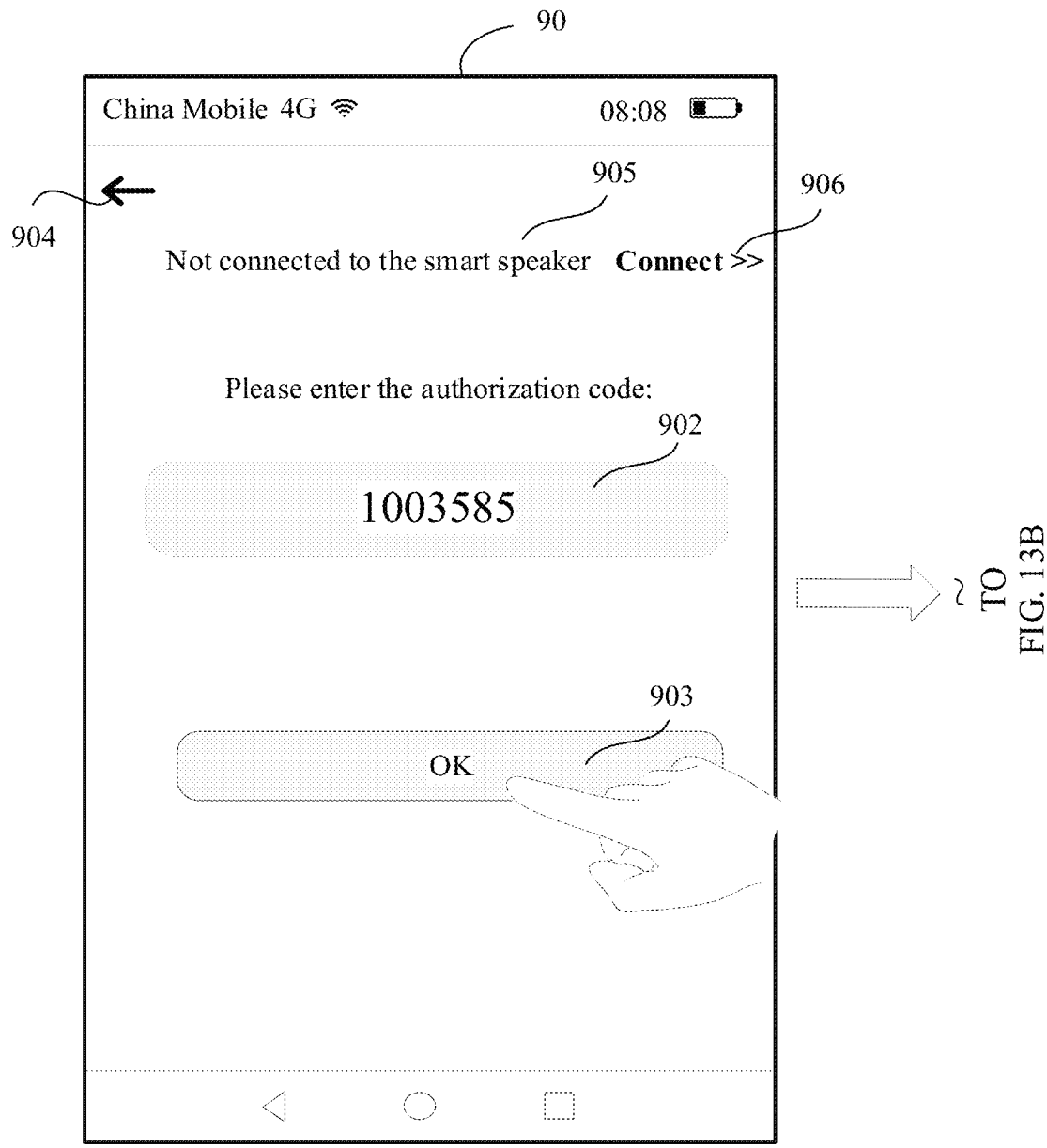
FIG. 13A, FIG. 13B, FIG. 13C, and FIG. 13D are schematic diagrams of user interfaces according to an embodiment of this application.
Figure 13B:
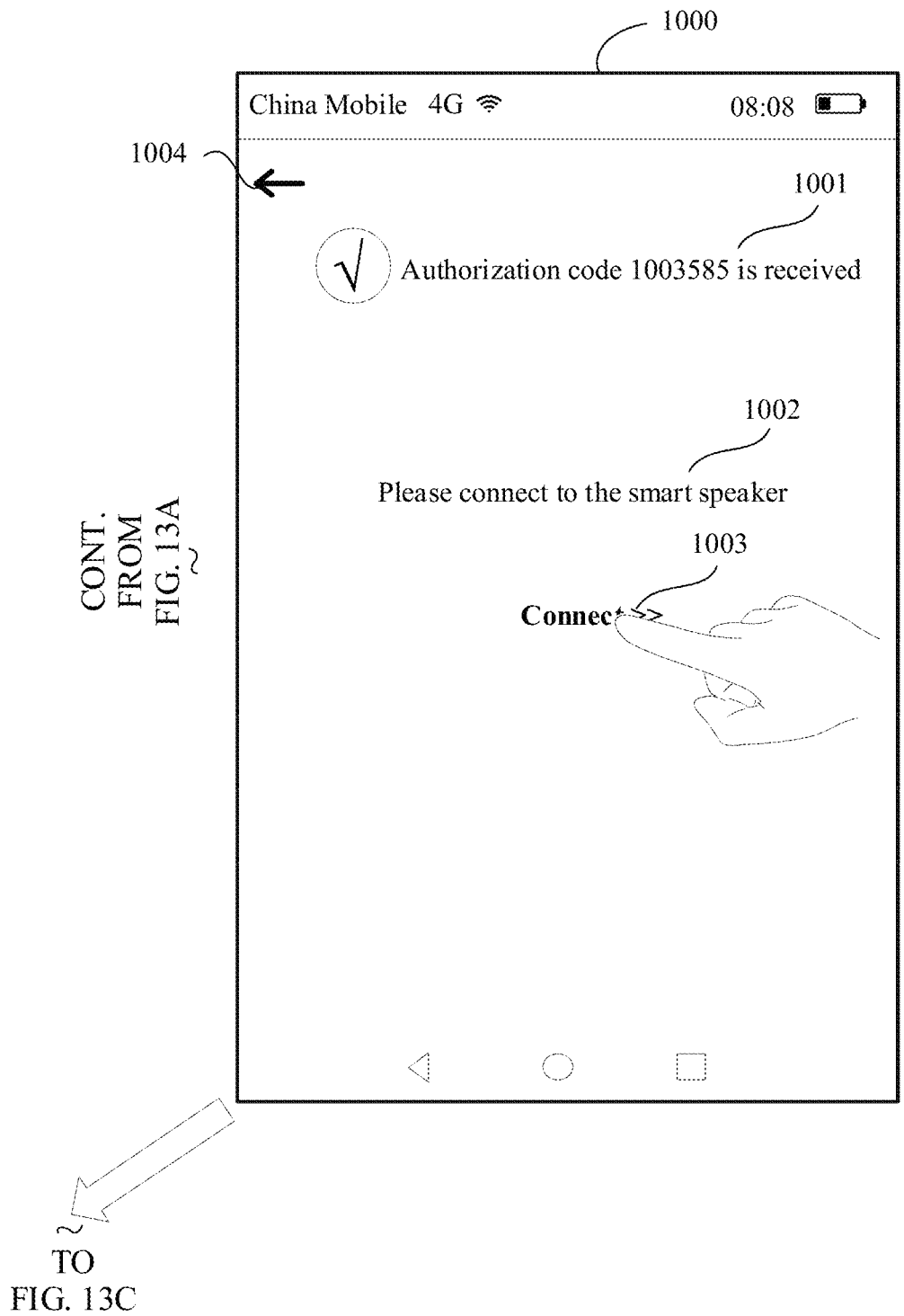

Optionally, if the electronic device 500 has not established the short-distance wireless connection to the smart speaker 401, the electronic device 500 may also display the authorization code input interface 90 in response to a touch operation performed by the user on the "authorized by another person" option 2052d. FIG. 13A to FIG. 13D are schematic diagrams of user interfaces according to an embodiment of this application. As shown in FIG. 13A, the authorization code input interface 90 no longer includes the speaker connected prompt 901, but includes a speaker unconnected prompt 905 and a connect portal 906.

Figure 13C:
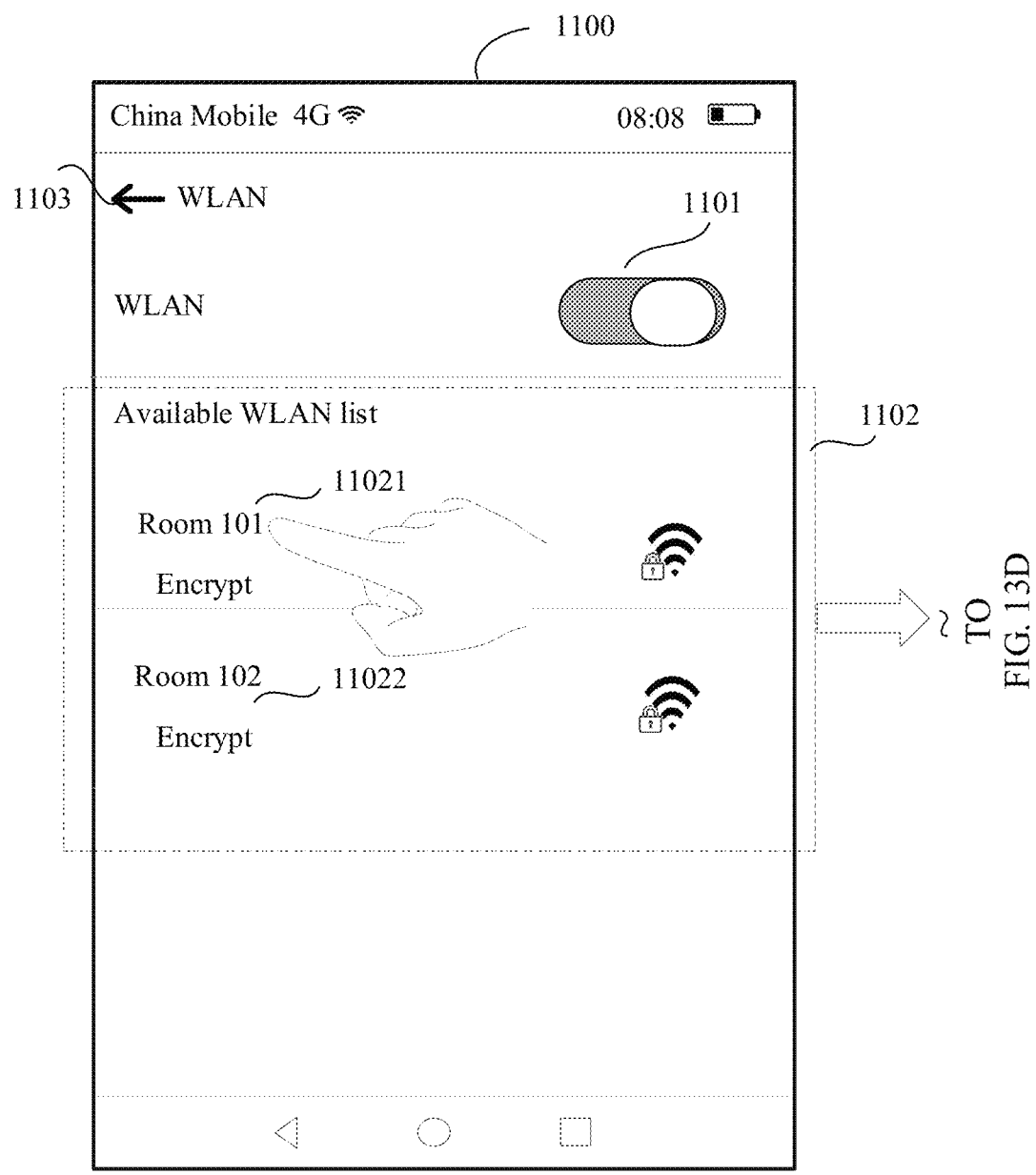

The speaker unconnected prompt 905 may prompt that "no smart speaker is connected". In response to an operation such as a touch operation performed by the user on the connect portal 906, the electronic device 500 may display a WI-FI connection interface 1100, as shown in FIG. 13C.

The user may select a WI-FI name in the WI-FI connection interface 1100 and enter a corresponding password, to perform step S201.

As shown in FIG. 13A, the second user may still submit the authorization code in the authorization code input interface 90. The authorization code input box 902 displays "1003585". In response to a touch operation performed by the second user on the OK control 903, the electronic device 500 may display a connection prompt interface 1000. The connection prompt interface 1000 includes an authorization code prompt 1001, a speaker connect prompt 1002, a connect portal 1003, and a return control 1004.

The authorization code prompt 1001 may prompt that "the authorization code 1003585 has been received".

The speaker connect prompt 1002 may prompt that "please connect the smart speaker".

As shown in FIG. 13C, in response to an operation such as a touch operation performed by the user on the connect portal 1003, the electronic device 500 may display the WI-FI connection interface 1100. In response to an operation performed by the second user on the WI-FI connection interface 1100, the WI-FI connection between the electronic device 500 and the smart speaker 401 is established. After the WI-FI connection is established successfully, step S204 is performed.

The WI-FI connection interface 1100 may include a WLAN switch 1101, a WLAN list 1102, and a return control 1103.

The WLAN switch 1101 is used to enable or disable WLAN scanning in response to a touch operation of the second user.

The WLAN list 1102 includes a name of a found WI-FI network. As shown in FIG. 13C, a WI-FI name "room 101" 11021 and a WI-FI name "room 102" 11022 may be included. The second user may touch a WI-FI name to connect to a corresponding WI-FI network.

The return control 1103 is used to return to an upper-level interface of the WI-FI connection interface 1100. In response to a touch operation performed by the second user on the return control 1103, the electronic device 500 displays the connection prompt interface 1000.

Figure 13D:
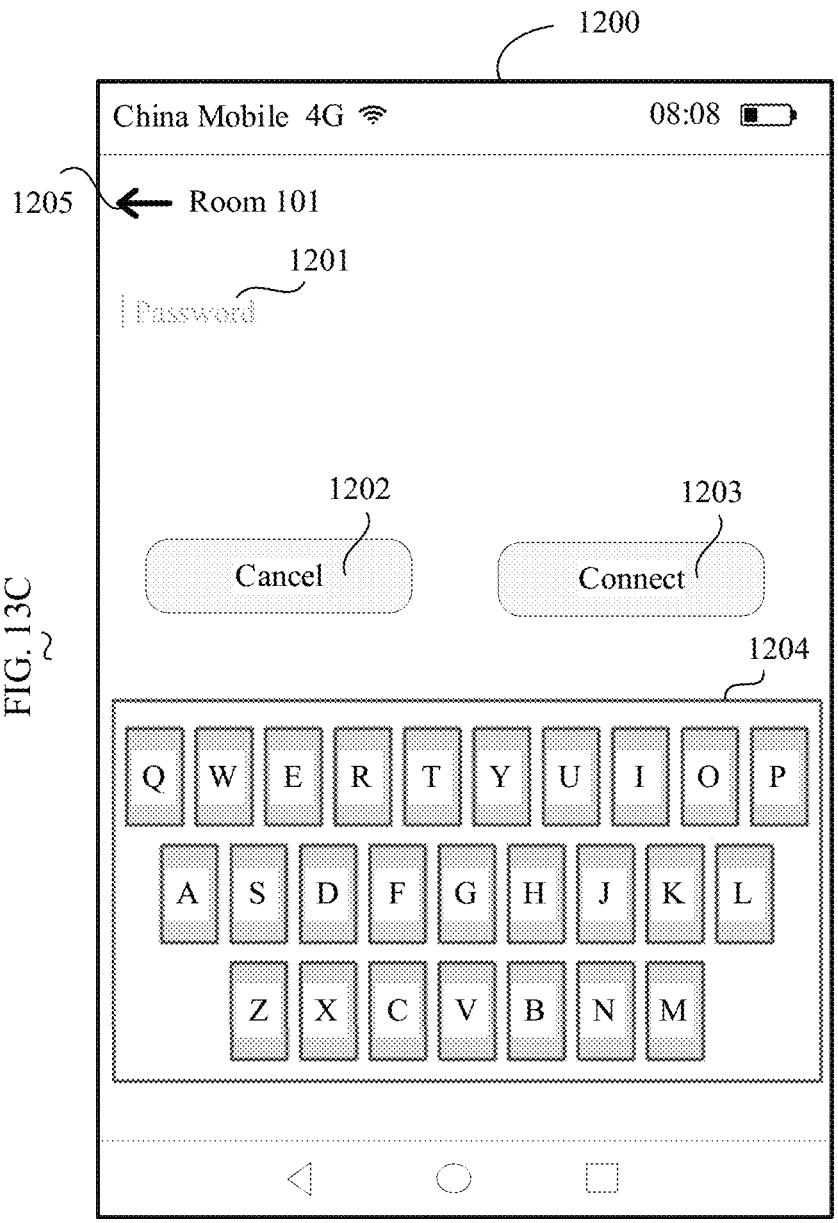

In response to a touch operation performed by the second user on the WI-FI name "room 101" 11021, the electronic device 500 may display a room 101 WI-FI interface 1200. As shown in FIG. 13D, the room 101 WI-FI interface 1200 may include a password input box 1201, a cancel control 1202, a connect control 1203, a virtual keyboard control 1204, and a return control 1205.

The password input box 1201 is used to display, in response to a touch operation performed by the second user on the virtual keyboard control 1204, a password entered by the user.

The cancel control 1202 is used to return to an upper-level interface of the room 101 WI-FI interface 1200.

The connect control 1203 is used to submit the password displayed in the password input box 1201.

The return control 1205 is used to return to an upper-level interface of the room 101 WI-FI interface 1200. In response to a touch operation performed by the second user on the return control 1205, the electronic device 500 displays the WI-FI connection interface 1100.

In response to a touch operation performed by the second user on the connect control 1203, the electronic device 500 may perform verification on the submitted WI-FI name and the corresponding password. If the verification succeeds, the electronic device 500 may be connected to the WI-FI network named "room 101", and perform step S204 based on the authorization code submitted in FIG. 13A.

S204: The electronic device 500 sends the account token of the second account and the second authorization code to the smart speaker 401.

In this embodiment of this application, the account token of the second account is used as an example for description. However, account information of the second account is not limited to the account token of the second account, and may alternatively be other account information. The account token of the second account is a token for a verification success on the second account. The electronic device 500 may obtain the account token of the second account from the account server 200. The server may periodically update the account token of the second account, and then send an updated account token to the electronic device 500. The electronic device 500 stores the updated account token and deletes the old account token.

S205: The smart speaker 401 determines, through comparison, whether the second authorization code is the same as the first authorization code.

After step S106, the smart speaker 401 stores the first authorization code, for example, 1003585, from the device server 300. The smart speaker may perform verification on the second authorization code by using the first authorization code. Further, if the second authorization code entered by the second user is 1003585, the smart speaker 401 determines, through comparison, that the second authorization code is the same as the first authorization code, that is, the verification succeeds.

S206: When detecting that the second authorization code is the same as the first authorization code, the smart speaker 401 stores the account token of the second account.

When detecting that the second authorization code is different from the first authorization code, the smart speaker 401 does not respond to a voice signal.

In a possible implementation, the account server 200 may periodically update the account token of the second account, and send an updated account token of the second account to the electronic device 500. For example, the account server 200 may update the account token of the second account every 2 hours. The electronic device 500 may send the updated account token of the second account to the smart speaker 401. The smart speaker 401 may update the account token of the second account, that is, delete the old account token, and store the updated account token. The updated account token of the second account may be sent through the short-distance connection between the electronic device 500 and the smart speaker 401. The account server 200 periodically updates the account token of the second account, and sends the account token to the smart speaker 401 by using the electronic device 500, so that security can be improved, and a risk of account information leakage can be reduced.

In a possible implementation, the smart speaker 401 may further obtain the authorization time from the electronic device 100, and the authorization time may include the authorization start time 2019-05-06-13:54:20 and the authorization end time 2019-05-10 12:00:00. The smart speaker 401 may store the account token of the second account between the authorization start time and the authorization end time. After the authorization end time, the device server 300 deletes the account token of the second account. For example, the authorization start time is 13:54:20 on May 6, 2019 (Beijing time), and the authorization end time is 12:00:00 on May 10, 2019 (Beijing time). The smart speaker 401 may store the account token of the second account between 13:54:20 on May 6, 2019 (Beijing time) and 12:00:00 on May 10, 2019 (Beijing time), and delete the account token of the second account after 12:00:00 on May 10, 2019.

In the foregoing solution in which the account token of the second account is stored only within the authorization time, the smart speaker 401 is allowed to store the account token of the second account only within the authorization time set by the first user, and the account token of the second account is used by the second user to use the smart speaker 401. For example, in a smart home device scenario in a hotel, the smart speaker 401 can be used only in a rental period of the second user, to avoid leakage of personal information of the user.

In addition, in the smart home device scenario in the hotel, after an authorization end time set by a hotel administrator arrives, the smart speaker 401 may delete the account token of the second account, and the hotel administrator does not need to manually clear the account token, to improve convenience.

The smart speaker 401 may request, based on the account token of the second account, the device server 300 to provide a service by using the personal information corresponding to the second account. For example, in response to a voice request of the second user for dialing, the smart speaker 401 may request the device server 300 to dial by using an address book corresponding to the second account. For details, refer to descriptions of steps S207 to S212.

After the second user leaves the room 101, the WI-FI connection between the electronic device 500 and the smart speaker 401 is disconnected, and the smart speaker 401 may delete the account token of the second account, to avoid a case in which another person requests a service based on the account token of the second account by using the smart speaker 401. Therefore, security of the second account is improved.

S207: The smart speaker 401 receives a voice signal.

The smart speaker 401 may collect the voice signal, and perform processing, for example, analog-to-digital conversion and filtering, on the voice signal, to obtain audio data.

S208: The smart speaker 401 sends a service request to the device server 300.

The service request may carry the account token of the second account. The service request may further carry related information of the voice signal, for example, carry the audio data obtained through signal processing.

S209: The device server 300 sends an account verification request to the account server 200.

The account verification request may carry the account token of the second account. The account token of the second account is from the smart speaker 401 and is stored in step S206.

S210: The account server 200 verifies, according to the account verification request, whether the account token of the second account is valid.

For example, the account server 200 may detect whether the account token of the second account is locally stored on the account server 200. If the account token of the second account has been stored locally on the account server 200, it indicates that the verification on the account token succeeds. If the account token of the second account is not locally stored on the server 200, it indicates that the verification on the account token fails.

The account server 200 may store an account and an account token corresponding to the account. Each account corresponds to a token.

S211: When the account token of the second account is valid, the account server 200 sends, to the device server 300, a notification indicating that the account verification succeeds, and sends a message indicating the second account.

S212: When receiving the notification and the second account from the account server 200, the device server 300 provides a service for the smart speaker 401 based on the second account and the service request.

In the device control method provided in FIG. 11A and FIG. 11B, the second user may connect the smart speaker 401 to the electronic device 500 held by the second user over WI-FI or in another short-distance wireless communication manner. The second user may enter the second authorization code in the AI speaker application interface 20 on the electronic device 500. If the verification succeeds, the account token of the second account can be stored on the smart speaker 401. The smart speaker 401 may request, based on the account token of the second account, to provide a service by using the personal information corresponding to the second account. The second user neither needs to configure a network for the smart speaker 401 in the AI speaker application interface 20 on the electronic device 500, nor needs to set the personal information such as an address book and a VIP account by using the AI speaker application interface, so that user operations are reduced, and the second user uses the smart speaker 401 conveniently.

In this embodiment of this application, the device server 300 may store the second account and the personal information corresponding to the second account. The personal information corresponding to the second account may include the address book, a music play VIP account, a song favorite list, and the like. The device server 300 may obtain the audio data carried in the service request, and then recognize the audio data. The device server 300 may further provide a service for the smart speaker 401 based on a recognition result of the voice data and the personal information corresponding to the second account.

For example, if the recognition result of the audio data is "call Xiao Ming", the device server 300 may find a phone number corresponding to Xiao Ming from the address book corresponding to the second account, and then provide, for the smart speaker, a function of dialing the phone number corresponding to Xiao Ming.

For another example, the recognition result of the audio data is "play 'My heart will go on'". If the song "My heart will go on" is a VIP song (that is, only a music play VIP account has the permission to play the song), the device server 300 obtains the music play VIP account corresponding to the second account. Then, the device server 300 sends audio data corresponding to the song "My heart will go on" to the smart speaker 401 based on the music play VIP account, so that the smart speaker 401 plays the song.

For another example, when the smart speaker 401 plays the song "My heart will go on", the device server 300 receives the audio data from the smart speaker 401, and a recognition result of the audio data is "add the song to the song favorite list". In this case, the device server 300 may add an indicator of the song "My heart will go on" to the song favorite list. The song favorite list is also included in the personal information corresponding to the second account, and is stored on the device server 300.

It may be understood that the foregoing example is described by using adding the song to the song favorite list as an example, but is not limited to an operation record of adding the song to the song favorite list. Other operations of the second user, for example, operation records of adding a new contact or dialing, may be stored in the personal information corresponding to the second account. Compared with storing the operation record of the second user in the smart speaker 401, storing the operation record of the second user in the device server 300 can avoid leakage of user information, and improve information security.

In another possible implementation, the device server 300 stores the account token of the second account and the personal information corresponding to the account token. In step S211, the account server 200 sends, to the device server 300, a notification indicating that the account verification succeeds. The device server 300 may provide a service for the smart speaker 401 based on the account token of the second account and the service request.

In this embodiment of this application, after the example of the authorization verification process described in FIG. 11A and FIG. 11B is completed, the smart speaker 401 may still store an account token of the first account. In addition, the first user may still perform an operation on the smart speaker 401 by using the AI speaker application interface 20 on the electronic device 100, for example, deleting or authorizing another person. After the authorization verification succeeds in the example described in FIG. 11A and FIG. 11B, if the first user requests a new authorization code from the device server 300 by using the electronic device 100 within the authorization time, the device server 300 sends the new authorization code to the smart speaker 401, and the smart speaker 401 may delete the first authorization code and delete the account token of the second account. After deleting the account token of the second account, the smart speaker 401 cannot provide a service in response to a voice signal of the second user. The second user needs to enter a new authorization code by using the electronic device 500 and perform authorization verification by using the smart speaker 401 again. The account token of the second account may be stored on the smart speaker 401 only after the verification succeeds again.

In a possible implementation, after the authorization verification succeeds in the example described in FIG. 11A and FIG. 11B, the second user may further control the smart speaker 401 by using an application (for example, a speaker application or a smart home application) that is installed on the electronic device 500 and that corresponds to the smart speaker 401. That is, in response to an instruction received from the electronic device 500, the smart speaker 401 may request to provide a service by using the personal information corresponding to the second account. The instruction from the electronic device 500 may be a user operation performed by the second user in the application on the electronic device 500. For example, the second user may touch a play control in the smart speaker application on the electronic device 500, to control the smart speaker 401 to play music by using the VIP account corresponding to the second account, or may touch a dial control, to request, by using the smart speaker 401, to make a call by using the address book of the second account.

After the authorization verification in steps S201 to S206 succeeds, the electronic device 500 may also periodically send connection confirmation information through the short-distance connection to the smart speaker 401.

S213: The electronic device 500 periodically sends the connection confirmation information to the smart speaker 401.

S214: When the smart speaker 401 does not receive the connection confirmation information after a second time threshold expires, the smart speaker 401 deletes the account token of the second account.

When the smart speaker 401 does not receive the connection confirmation information after specified time expires, the smart speaker 401 may delete the account token of the second account. The specified time is referred to as the second time threshold. The second electronic device sends the connection confirmation information through the short-distance wireless connection in a periodicity of a first time threshold. For example, the electronic device 500 may send the connection confirmation information to the smart speaker 401 through the WI-FI connection between the electronic device 500 and the smart speaker 401 every 1 minute. When the smart speaker 401 does not receive the connection confirmation information more than 2 minutes after the smart speaker 401 receives the connection confirmation information last time, the smart speaker 401 deletes the account token of the second account. 2 minutes is an example of the second time threshold, and 1 minute is an example of the first time threshold.

After step S206, the smart speaker 401 may generate first information, for example, a character string, and the character string one-to-one corresponds to the account token of the second account. The smart speaker 401 sends the character string to the electronic device 500. The electronic device 500 periodically sends the character string to the smart speaker 401 as the connection confirmation information, to ensure that when the second user is in the room 101 (the electronic device 500 is short-distance connected to the smart speaker 401), the smart speaker 401 stores the account token of the second account, and can provide a service for the second user. When the second user leaves the room 101 (the electronic device 500 is disconnected from the smart speaker 401), the smart speaker 401 deletes the account token of the second account, to avoid the personal information corresponding to the second account being used by another person, and ensure security of the second account.

For example, when the second user is in the room 101, the electronic device 500 held by the second user is connected to the smart speaker 401 over WI-FI. The electronic device 500 may send the connection confirmation information to the smart speaker 401 through the WI-FI connection every 1 minute. When the second user leaves the room 101, the WI-FI connection between the electronic device 500 held by the second user and the smart speaker 401 is disconnected. When the smart speaker 401 detects that the smart speaker 401 does not receive the connection confirmation information more than 2 minutes after the smart speaker 401 receives the connection confirmation information last time, the smart speaker 401 deletes the account token of the second account. When the smart speaker 401 receives a voice signal after deleting the account token of the second account, the smart speaker 401 cannot access, by using the device server 300, the personal information corresponding to the second account. The smart speaker 401 deletes the account token of the second account, to ensure that another person cannot use the personal information of the second user after the second user leaves the room 101. This can avoid leakage of the personal information of the second user, and ensure security of the second account.

In a possible implementation, the connection confirmation information may be the account token of the second account. The account token of the second account may not only be used to update the account token of the second account on the smart speaker 401, but also be used to ensure security of the personal information of the second user. That is, when the connection between the electronic device 500 and the smart speaker 401 is abnormal, the account token of the second account is deleted. Optionally, if an account token is in the smart speaker 401 for more than preset duration (for example, 30 minutes), the token is invalid and cleared. The electronic device 500 may send the account token of the second account to the smart speaker 401 through the WI-FI connection every 1 minute. After the second user leaves the room 101, the WI-FI connection between the electronic device 500 and the smart speaker 401 is disconnected. After detecting that the WI-FI connection between the smart speaker 401 and the electronic device 500 is disconnected, the smart speaker 401 clears the account token of the second account. If the clearing fails, the account token of the second account is invalid and cleared after the preset duration (for example, 30 minutes) expires. Through the foregoing process, security of the account information of the second account may be further ensured.

Optionally, this embodiment may further include steps S215 and S216.

S215: When detecting that the smart speaker 401 re-establishes a short-distance wireless connection to the electronic device 500 by using a connection record, the electronic device 500 sends the account token of the second account to the smart speaker 401 through the short-distance wireless connection.

S216: The smart speaker 401 stores the account token of the second account.

Further, after the WI-FI connection between the electronic device 500 and the smart speaker 401 is disconnected, the smart speaker 401 may still store a record of the WI-FI connection between the electronic device 500 and the smart speaker 401. The WI-FI connection record may correspond to an authorization code verification record, and the authorization code verification record indicates that the verification succeeds. When the electronic device 500 is reconnected to the WI-FI network named "room 101", the smart speaker 401 may re-establish the WI-FI connection to the electronic device 500 based on the WI-FI connection record. When the smart speaker 401 re-establishes the WI-FI connection to the electronic device 500, the smart speaker 401 detects the authorization code verification record, and the electronic device 500 may send the account token of the second account to the smart speaker 401. Authorization code verification does not need to be performed again by using the smart speaker 401. Therefore, after restoring the WI-FI connection to the electronic device 500, the smart speaker 401 may initiate a service request in response to a voice signal of the second user.

After restoring the WI-FI connection to the electronic device 500, the smart speaker 401 does not need to perform verification on the authorization code again, and this provides operation convenience for the second user.

The smart speaker 401 may clear the authorization code verification record after the authorization time expires.

In this embodiment of this application, steps S213 to S216 are not limited to being performed after step S207, or may be performed before step S207. This is not limited in this embodiment of this application.

Figure 14:
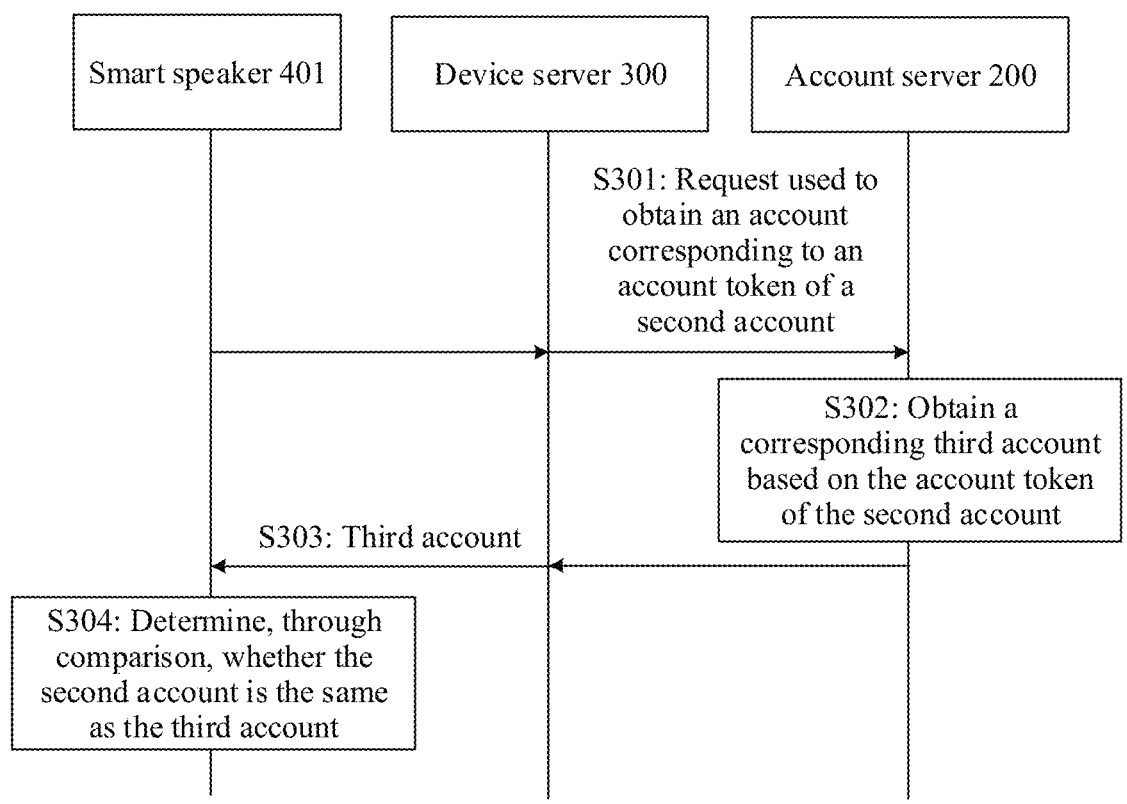
FIG. 14 is a schematic flowchart of an account verification method for a smart speaker 401 according to an embodiment of this application.

In a possible implementation, in the process in which the first user performs authorization by using the electronic device 100, the first user may set an authorized account, so that a service is provided by using the smart speaker 401 only by using personal information corresponding to the specified authorized account. Further, the first user may enter the authorized account, for example, the second account, in the interface 30 for authorizing another person. The interface 30 for authorizing another person may include an authorized account input box. In response to an operation of the first user, the authorized account input box may display the second account entered by the first user. The authorization request in step S104 may carry the second account. In step S106, the device server 300 may send the second account to the smart speaker 401. When the smart speaker 401 performs authorization code verification, account verification may also be performed based on an account token (referred to as the account token of the second account in the following) from the electronic device 500 and the stored second account. The following further describes a process in which the smart speaker 401 performs account verification. FIG. 14 is a schematic flowchart of an account verification method for the smart speaker 401 according to an embodiment of this application. As shown in FIG. 14, the account verification method may include steps S301 to S304.

S301: The smart speaker 401 sends, to the account server 200 by using the device server 300, a request used to obtain an account corresponding to the account token of the second account.

S302: The account server 200 obtains a corresponding third account based on the account token of the second account.

The account server 200 may store each account and a corresponding account token.

The account server 200 may obtain, based on a correspondence between an account and an account token, the third account corresponding to the account token of the second account.

S303: The account server 200 sends the third account to the smart speaker 401 by using the device server 300.

S304: The smart speaker 401 determines, through comparison, whether the second account is the same as the third account, and when a comparison result is that the second account is the same as the third account, account verification succeeds.

Step S206 is performed only after the authorization code verification in step S205 succeeds and the account verification in FIG. 14 succeeds.

In the process in which the first user performs authorization by using the electronic device 100, the first user may set the authorized account, and the authorized account may be stored on the smart speaker 401. In this case, in the process in which the second user performs authorization verification by using the electronic device 500, in addition to verification on the authorization code, the smart speaker may further perform verification on the authorized account. In this way, a service can be provided by using the smart speaker 401 only by using the personal information corresponding to the specified authorization account. Therefore, security in the authorization process and the authorization verification process can be improved.

After the authorization end time set by the first user arrives, the smart speaker 401 may clear the authorized account, to avoid leakage of the personal information of the second user. In addition, the first user does not need to manually clear the authorized account, to improve convenience.

In a possible implementation, the first user may select a plurality of smart home devices in the interface 30 for authorizing another person, and request, by using the OK control 303, the account server 200 to generate an authorization code for the plurality of smart home devices, so that the second user is authorized to perform authorization verification on the plurality of smart home devices by using the authorization code, and use the plurality of smart home devices. The plurality of smart home devices may include different types of smart home devices, for example, a smart speaker, a smart TV, and a smart air conditioner. Authorization verification may be performed on each of the plurality of smart home devices. The following describes an example.

Figure 15:
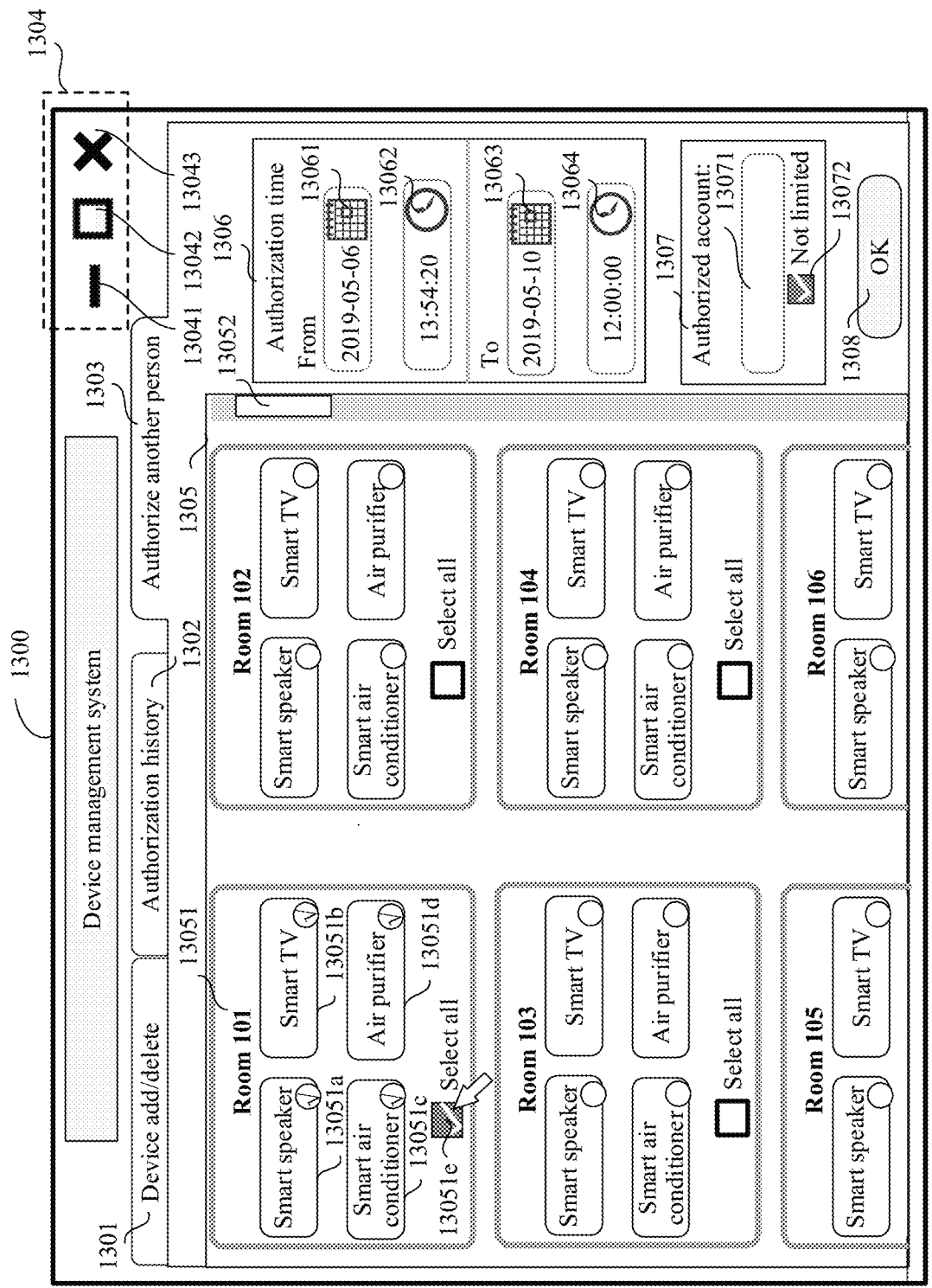
FIG. 15 is a schematic diagram of a user interface according to an embodiment of this application.

FIG. 15 is a schematic diagram of a user interface according to an embodiment of this application. The user interface may be used to manage different types of smart home devices. As shown in FIG. 15, the first user may authorize, in a device management system interface 1300, the second user to use a plurality of smart home devices. The authorization management system interface 1300 includes menu controls: a device add/delete control 1301, an authorization history control 1302, and an "authorize another person" control 1303. The authorization management system interface 1300 further includes an interface operation area 1304. The interface operation area 1304 includes a minimize control 13041, a maximize control 13042, and a close control 13043.

The minimize control 13041 is used to minimize the device management system interface 1300 on a taskbar. The maximize control 13042 is used to maximize the device management system interface 1300. The close control 13043 is used to close the device management system interface 1300.

Content displayed in a content display area of each menu control is different. The device add/delete control 1301 is used to view a speaker indicator list (refer to the speaker indicator list 2081 in the user interface in FIG. 6A), and add a new speaker (refer to the speaker add option 2082 in the user interface in FIG. 6A). The device add/delete control 1301 may be further used to delete a speaker indicator from the speaker indicator list 2081. The authorization history control 1302 is used to view an authorization record, and a content display area of the authorization history control 1302 may be used to display an authorization record.

A currently selected menu control shown in FIG. 15 is the "authorize another person" control 1303. That is, content displayed in the content display area is the content displayed under the "authorize another person" control 1303. As shown in FIG. 15, the content display area of the "authorize another person" control 1303 includes a device selection area 1305, an authorization time setting area 1306, an authorized account setting area 1307, and an OK control 1308.

The device selection area 1305 includes indicators of different types of smart home devices. For example, as shown in FIG. 15, the device selection area 1305 may include a device selection area 13051 corresponding to the room 101, and may further include a device selection area corresponding to a room 102 and a device selection area corresponding to another room. In this embodiment of this application, the device selection area 13051 is used as an example for description. A device selection area corresponding to another room is similar.

The device selection area 13051 corresponding to the room 101 includes a smart speaker indicator 13051a, a smart TV indicator 13051b, a smart air conditioner indicator 13051c, an air purifier indicator 13051d, and a select all option 13051e. The smart speaker indicator 13051a, the smart TV indicator 13051b, the smart air conditioner indicator 13051c, and the air purifier indicator 13051d respectively indicate a smart speaker (for example, the smart speaker 401 in the example described in FIG. 7), a smart TV, a smart air conditioner, and an air purifier placed in the room 101.

The smart speaker indicator 13051a may be displayed in an unselected state, and the electronic device 500 may detect a selection operation on the smart speaker indicator 13051a. The selection operation may be a mouse operation (for example, a mouse click operation) on the smart speaker indicator 13051a, or may be a touch operation on the smart speaker indicator 13051a, or the like. In response to the selection operation, the smart speaker indicator 13051a may be displayed in a selected state. The smart TV indicator 13051b, the smart air conditioner indicator 13051c, and the air purifier indicator 13051d are similar.

The select all option 13051e may be displayed in an unselected state, and the electronic device 500 may detect a selection operation on the select all option 13051e. In response to the selection operation, the smart speaker indicator 13051a, the smart TV indicator 13051b, the smart air conditioner indicator 13051c, and the air purifier indicator 13051d are all displayed in a selected state, and the select all option 13051e is also displayed in a selected state.

The device selection area 1305 further includes a scroll bar 13052. The electronic device 500 may detect a drag operation on the scroll bar 13052, for example, an operation of dragging the scroll bar 13052 by a mouse. In response to the drag operation, the electronic device 500 may display device selection areas corresponding to more rooms.

A device indicator in a selected state in the device selection area 1305 may indicate that a device corresponding to the device indicator is authorized to be used by another person in the authorization process.

For description of the authorization time setting area 1306, refer to the description of the authorization time setting area 301 described in FIG. 8B. Details are not described herein again.

The authorized account setting area 1307 includes an authorized account input box 13071 and an account unlimited option 13072. The authorized account input box 13071 is used to receive an authorized account entered by the first user, for example, the second account. The second account is used for account verification by using the smart speaker 401. For an account verification process, refer to the example described in FIG. 14.

Alternatively, in response to a touch operation performed by the user on the account unlimited option 13072, the account unlimited option 13072 is displayed in a selected state. In this case, account verification does not need to be performed in the authorization verification process by using the smart speaker 401.

The OK control 1308 is used by the electronic device 100 to generate an authorization request based on a selected device indicator, the specified authorization time, and the authorization account, to request the device server 300 to generate an authorization code. For a function of the OK control 1308, refer to the OK control 303 in the example described in FIG. 8. As shown in FIG. 15, selected device indicators may include the smart speaker indicator 13051a, the smart TV indicator 13051b, the smart air conditioner indicator 13051c, and the air purifier indicator 13051d. Authorization start time is 2019-05-06 13:54:20 and authorization end time is 2019-05-10 12:00:00. The authorized account is not limited. In this case, in response to a touch operation performed by the first user on the OK control 1308, the electronic device 100 may generate an authorization request, and send the authorization request to the device server 300. For details, refer to the description of step S103.

After generating the authorization code, the device server 300 may separately send the authorization code to devices corresponding to the smart speaker indicator 13051a, the smart TV indicator 13051b, the smart air conditioner indicator 13051c, and the air purifier indicator 13051d. That is, the authorization code may be separately sent to the smart speaker, the smart TV, the smart air conditioner, and the air purifier in the room 101. Each of the smart speaker, the smart TV, the smart air conditioner, and the air purifier in the room 101 performs steps S106 and S107.

In the authorization verification process, with reference to the example described in FIG. 11A and FIG. 11B, the electronic device 401 may separately establish a short-distance wireless connection, for example, a WI-FI connection, to the smart speaker, the smart TV, the smart air conditioner, and the air purifier in the room 101. In step S204, the account token of the second account and the second authorization code may be sent to the smart speaker, the smart TV, the smart air conditioner, and the air purifier in the room 101. Then, each device may perform steps S205 and S206. After the authorization verification succeeds, the smart speaker, the smart TV, the smart air conditioner, and the air purifier may provide services in response to a voice instruction of the second user. For details, refer to steps S207 to S212.

It may be understood that the user interface shown in FIG. 15 is merely used to explain this embodiment of this application, and should not constitute a limitation. The device management system may also have other interface designs.

In the embodiments of this application, the device control methods described in FIG. 7 and FIG. 11A and FIG. 11B may be further applied to a smart home device scenario at home. For example, an account token of a HUAWEI account of a family member 1 is stored on the smart speaker. Through a user operation, the family member 1 may generate an authorization code for a family member 2 and notify the family member 2 of the authorization code, and generate an authorization code for a family member 3 and notify the family member 3 of the authorization code. For details, refer to the embodiment described in FIG. 7. The family member 2 and the family member 3 separately operate their respective electronic devices to store account tokens of respective HUAWEI accounts on the smart speaker. For details, refer to steps S201 to S206 in the example described in FIG. 11A and FIG. 11B. The smart speaker stores the account token of the HUAWEI account of the family member 1, the account token of the HUAWEI account of the family member 2, and the account token of the HUAWEI account of the family member 3. The smart speaker can establish a WI-FI connection to only one electronic device at a moment. Then, an account token of a HUAWEI account by using which a speaker application on the electronic device is logged in may be carried in the service request in step S208. In this way, each of the family member 1, the family member 2, and the family member 3 may request a service on the smart speaker by using personal information corresponding to the HUAWEI account of each family member, for example, make a call by using an address book corresponding to the HUAWEI account of each family member. Therefore, convenience of sharing the smart speaker by a plurality of users can be improved.

A speaker application on the electronic device of each of the family member 1, the family member 2, and the family member 3 is logged in by using the HUAWEI account of each family member. In addition, the device server 300 stores the personal information corresponding to the HUAWEI account of each user.

In the embodiments of this application, an example in which the account is a HUAWEI account is used. However, an account in the embodiments of this application is not limited to the HUAWEI account, or may be another account.

It may be understood that the foregoing examples of scenarios to which the device control methods described in FIG. 7 and FIG. 11A and FIG. 11B are applied are merely used to explain the embodiments of this application, and should not constitute a limitation, and may be further applied to another scenario. This is not limited in the embodiments of this application.

In the embodiments of this application, the first electronic device is the electronic device 100, the second electronic device is the electronic device 500, and the home device may include the smart speaker 401. The account information of the second account is, for example, the account token of the second account. A first home application is an application, for example, the speaker application, installed on the electronic device 100 to control a home device. A second home application is the speaker application installed on the second electronic device. Second personal information is the personal information that corresponds to the second account and that is stored on the device server.

A first user interface may be the interface 30 for authorizing another person, or may be the device management system interface 1300. A second user interface may be the authorization code input interface 90. A third user interface may be the WI-FI connection interface 1100. A fourth user interface may be the connection prompt interface 1000.

A first user operation may be a touch operation on the OK control 303, or may be a touch operation on the OK control 1308 in the example described in FIG. 15. A second user operation may be a selection operation on the home device indicator 3021 shown in FIG. 8B, or may be a selection operation on the home device indicator 13051a shown in FIG. 15. A third user operation may be an operation of entering authorization time by using the authorization time setting area 301 in the example shown in FIG. 8B, or may be an operation of entering authorization time by using the authorization time setting area 13061 in the example shown in FIG. 15. A fourth user operation may be an operation of entering an authorized account in the authorized account input box 13071 in the example shown in FIG. 15. A fifth user operation may be an operation of entering a password in a second input box (the input box 901) in the example described in FIG. 13A.

In the foregoing embodiments, all or some of the functions may be implemented by using software, hardware, or a combination of software and hardware. When software is used to implement the embodiments, all or some of the embodiments may be implemented in a form of a computer program product. The computer program product includes one or more computer instructions. When the computer program instructions are loaded and executed on a computer, all or some of the procedure or functions according to the embodiments of this application are generated. The computer may be a general-purpose computer, a dedicated computer, a computer network, or other programmable apparatuses. The computer instructions may be stored in a computer-readable storage medium. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DIGITAL VERSATILE DISC (DVD)), a semiconductor medium (for example, an SSD), or the like.

A person of ordinary skill in the art may understand that all or some of the procedures in the methods in the foregoing embodiments may be implemented by a computer program instructing related hardware. The program may be stored in a computer-readable storage medium. When the program is run, the procedures of the methods in the foregoing embodiments are executed. The foregoing storage medium includes any medium that can store program code, such as a ROM, a RAM, a magnetic disk, or an optical disk.

What is claimed is:

1. A method comprising:
configuring, by a first electronic device, a network for a home device using a first home application configured to control the home device and installed on the first electronic device, wherein the first home application is logged into using a first account;
receiving, by the first electronic device, a user operation;
sending, in response to the user operation and by the first electronic device, an authorization request to a device server to request to generate a first authorization code of the home device;
receiving, by the first electronic device and from the device server, the first authorization code;
receiving, by the home device, the first authorization code from the device server;
outputting, by the first electronic device, the first authorization code;
receiving, by a second electronic device, a second authorization code from a user;
sending, by the second electronic device, account information of a second account and the second authorization code to the home device, wherein a second home application is installed on the second electronic device, wherein the second home application is logged into using the second account, and wherein the device server stores personal information corresponding toof the second account;
performing, by the home device, verification on the second authorization code based on the first authorization code;
storing, by the home device when the verification succeeds, the account information for the home device to request, using the account information, the personal information of the second account;
requesting, by the home device, from the device server, and using the account information, the personal information of the second account;
receiving, by the home device and from the device server, the personal information of the second account;
performing, by the home device, a service using the personal information of the second account; and
deleting, by the home device, the account information when an authorization expires.

2. The method of claim 1, wherein deleting the account information comprises:
receiving, by the first electronic device before receiving the user operation, an authorization time from the user, wherein the authorization request further comprises the authorization time; and
receiving, by the home device from the device server, the authorization time, wherein the account information is deleted when the authorization time expires.

3. The method of claim 1, wherein before receiving the user operation, the method further comprises:
receiving, by the first electronic device, an authorized account from the user;
receiving, by the home device from the device server the authorized account;
performing, by the home device, verification on the authorized account based on the account information; and
further storing, by the home device, the account information when the second authorization code is verified and the authorized account is verified.

4. The method of claim 1, wherein the account information and the second authorization code are sent through a short-distance wireless connection between the second electronic device and the home device.

5. The method of claim 1, wherein after storing the account information, the method further comprises periodically sending, by the second electronic device, connection confirmation information to the home device through a short-distance wireless connection in a periodicity of a first time threshold, wherein deleting the account information comprises deleting the account information when the connection confirmation information is not received after a second time threshold expires, and wherein the second time threshold is greater than or equal to the first time threshold.

6. The method of claim 5, wherein after deleting the account information, the method further comprises:
detecting, by the second electronic device, that the home device re-establishes the short-distance wireless connection to the second electronic device using a connection record of the short-distance wireless connection;
further sending, by the second electronic device in response to detecting that the home device re-establishes the short-distance wireless connection to the second electronic device, the account information to the home device through the short-distance wireless connection; and
re-storing, by the home device, the account information.

7. The method of claim 5, wherein the connection confirmation information is the account information.

8. The method of claim 5, wherein after storing the account information and before periodically sending the connection confirmation information, the method further comprises:
generating, by the home device and based on the account information, the connection confirmation information corresponding to the account information; and
sending, by the home device, the connection confirmation information to the second electronic device.

9. The method of claim 1, wherein after sending the account information and the second authorization code, the method further comprises:
receiving, by the second electronic device, updated account information of the second account from an account server;
sending, by the second electronic device, the updated account information to the home device; and
storing, by the home device, the updated account information.

10. A method comprising:
receiving, from a device server, an authorization instruction comprising a first authorization code;
receiving, from an electronic device, a second authorization code and account information of an account that is used for login on the electronic device;
verifying whether the second authorization code is the same as the first authorization code;
storing the account information when the second authorization code is the same as the first authorization code for requesting, using the account information, personal information of the account;
requesting, from the device server and using the account information, the personal information of the account;

receiving, from the device server, the personal information of the account;

performing a service using the personal information of the account; and deleting the account information when an authorization expires.

11. The method of claim 10, wherein after storing the account information, the method further comprises:

receiving a voice signal comprising voice data; and sending, to the device server, a service request carrying the account information and the voice data, wherein the account information is for the device server to provide a second service based on the personal information and the voice data.

12. The method of claim 10, wherein the authorization instruction further comprises an authorization time, and wherein deleting the account information comprises deleting the account information after the authorization time has expired.

13. The method of claim 10, wherein after storing the account information, the method further comprises periodically receiving connection confirmation information from the electronic device through a short-distance wireless connection in a periodicity of a first time threshold, wherein deleting the account information comprises deleting the account information when the connection confirmation information is not received after a second time threshold expires, and wherein the second time threshold is greater than or equal to the first time threshold.

14. The method of claim 13, wherein the connection confirmation information is the account information.

15. The method of claim 13, wherein after storing the account information and before receiving the connection confirmation information, the method further comprises:

generating the connection confirmation information based on the account information, wherein the connection confirmation information corresponds to the account information in a one-to-one manner; and sending the connection confirmation information to the electronic device.

16. The method of claim 13, wherein after deleting the account information, the method further comprises:

storing a connection record of the short-distance wireless connection to the electronic device to re-establish the short-distance wireless connection to the electronic device;

re-establishing the short-distance wireless connection to the electronic device using the connection record;

receiving the account information from the electronic device through the short-distance wireless connection; and storing the account information.

17. The method of claim 10, wherein the authorization instruction further comprises an authorized account, and wherein after verifying whether the second authorization code is the same as the first authorization code, the method further comprises:

performing verification on the authorized account based on the account information;

identifying that the first authorization code is the same as the second authorization code and the authorized account is verified; and further storing, in response to identifying, the account information.

18. An apparatus comprising:

one or more processors; and a memory coupled to the one or more processors and configured to store computer instructions, wherein when executed by the one or more processors, the computer instructions cause the apparatus to:

receive, from a device server, an authorization instruction comprising a first authorization code;

receive a second authorization code and account information of an account from an electronic device;

verify whether the second authorization code is the same as the first authorization code;

store the account information when the second authorization code is the same as the first authorization code for the apparatus to request, using the account information, personal information of the account;

request from the device server and using the account information, the personal information of the account;

receive, from the device server, the personal information of the account;

perform a service using the personal information of the account; and delete the account information when an authorization expires.

19. The apparatus of claim 18, wherein after storing the account information, when executed by the one or more processors, the computer instructions further cause the apparatus to:

receive a voice signal comprising voice data; and send, to the device server, a service request carrying the account information and the voice data, wherein the account information is for the device server to provide a second service for the apparatus based on the personal information and the voice data.

20. The apparatus of claim 18, wherein the authorization instruction further comprises an authorization time, and wherein deleting the account information comprises deleting the account information when the authorization time expires.

* * * * *

UNITED STATES PATENT AND TRADEMARK OFFICE
CERTIFICATE OF CORRECTION

| | | |
|---|---|---|
| PATENT NO. | : 12,058,145 B2 | Page 1 of 1 |
| APPLICATION NO. | : 17/563565 | |
| DATED | : August 6, 2024 | |
| INVENTOR(S) | : Yixuan Yang | |

It is certified that error appears in the above-identified patent and that said Letters Patent is hereby corrected as shown below:

On the Title Page

Page 2, FOREIGN PATENT DOCUMENTS: "IN 109584879 A 4/2019" should read "CN 109584879 A 4/2019"

In the Claims

Claim 1, Column 51, Line 32: "server stores personal information corresponding toof" should read "server stores personal information of"

Signed and Sealed this
First Day of October, 2024

Katherine Kelly Vidal
*Director of the United States Patent and Trademark Office*